US005430873A

United States Patent [19]
Abe et al.

[11] Patent Number: 5,430,873
[45] Date of Patent: Jul. 4, 1995

[54] SOFTWARE DESIGN SUPPORT APPARATUS

[75] Inventors: Hiroaki Abe; Itaru Fukao, both of Sapporo; Harumi Taneda, Kawasaki; Yuji Kubota, Sapporo; Yasuhiko Arima, Sapporo; Naoshi Nakagawa, Sapporo; Takeo Konno, Sapporo; Yoshinori Arihara, Sapporo; Yuriko Suzuki, Sapporo, all of Japan

[73] Assignee: Fujitsu Limited, Kawasaki, Japan

[21] Appl. No.: 944,849

[22] Filed: Sep. 14, 1992

[30] Foreign Application Priority Data

Sep. 12, 1991 [JP] Japan .................................. 3-233466

[51] Int. Cl.⁶ ............................................ G06F 17/50
[52] U.S. Cl. ....................................................... 395/650
[58] Field of Search ................................. 395/650, 700

[56] References Cited

U.S. PATENT DOCUMENTS

| 4,809,170 | 2/1989 | Leblang et al. | 364/DIG. 1 |
|---|---|---|---|
| 5,075,847 | 12/1991 | Fromme | 395/700 |
| 5,187,788 | 2/1993 | Marmelstein | 395/700 |
| 5,212,792 | 5/1993 | Gerety et al. | 395/650 |
| 5,295,222 | 3/1994 | Wadhwa et al. | 395/700 |

Primary Examiner—Thomas M. Heckler
Attorney, Agent, or Firm—Staas & Halsey

[57] ABSTRACT

During a software designing operation, a designer accesses a level prescribing unit through an interaction managing control unit. The level prescribing unit provides the guidance to specification information and design parts, etc. at a desired design level. If the designer selects and inputs specification information or design parts, the design editor corresponding to the design specification information in a design editor unit is activated, so that the designer is guided and aided through a display to produce a desired software. At this time, the information about the state of the editing operation "completed" or "not completed" is stored with the directory. The designed document satisfying a specific condition, for example, a document determined to be "design completed", is stored as a data base by a design data base storing unit. To update the information stored in the design data base, a design information inconsistency correction support unit presents the designer with the part of the information affected by the update, thereby supporting the correction.

36 Claims, 50 Drawing Sheets

SOFTWARE DESIGN SUPPORT APPARATUS

BACKGROUND OF THE INVENTION

The present invention relates to a software development support device capable of guiding a software designing operation, managing and checking the information about designed documents and designed parts or elements, etc., and smoothly aiding software development and a designing operation based on a structured design method.

Recent high-level diversified demands for information and communication systems have largely affected the involved software, thereby resulting in a large-scale complicated software, extending a development period, requiring the increasing number of persons involved in the development, and covering increased costs. As a result, new effective technologies are required to efficiently design and realize the optimum software.

In the conventional software design technologies, designing restrictions are determined by each unit in a developing organization, and each design is described manually or with a word-processor according to the designing restrictions, precedents, or customs. The restrictions are observed depending on the conscience and personality of each of the members in the organization. The description and the representation of a designed document also depends on the personality of an author.

On the other hand, a computer aided software engineering (CASE) is proposed as the technique of supporting software development through computers with the increasing number of programmers involved. Some conventional CASE tools contain programs for supporting design description through an editing unit, and have a predetermined representation format for preparing a designed document. According to the representation format, a software designer prepares his design and writes the software in step units. At this time, the tool provides the original design and the relationship information used in detailing the document.

In maintaining designed documents, they are stored in DASDs or floppy discs of word-processors and computers, and each segment of the design is managed by its author although there is a general administrator. Besides, a designer in the downstream (a designer who designs the more detailed parts) can update a designed document written by a designer in the upstream.

In designing software manually or with a word-processor according to predetermined restrictions, or in designing software through a conventional CASE tool as described above, there are some problems which deteriorate the quality of the software and prevents the efficiency in operations.

In the conventional methods, there can be problems caused by that specifications to be described, levels of the contents, or procedures of the specifications are not uniquely prescribed. That is, no unique prescription causes recognition gaps in a designing process among developers (designers and administrators) or among processes (designing methods and realizing methods according to the original design). The recognition gaps may lead to oversights or misunderstandings of specification segments as they grow when the steps proceed to the manufacturing and testing processes, thereby reducing the operation efficiency.

That is, when a system development is performed at a customer's request, there are several development procedures such as what type of a CPU is used to develop a system, how to execute a parallel process, how to segment a parallel process, how to compose a final program statement, etc. In the conventional methods, there are no prescriptions on such development levels. This is why the recognition gaps arise among development processes (designing methods and realizing methods according to the original design).

Additionally, when a designed document is prepared, it is written manually or with a word-processor in the conventional method according to development restrictions, precedents, or customs. However, differences or mis-description often arise in the contents and representation of description. Besides, since the prescription on designed parts and the relationships among them can be determined by each designer in the conventional method using an existing CASE tool, a graphic symbol written by a designer during an editing process can be interpreted differently by readers, thereby causing a misunderstanding between a writer and a reader. This may deteriorate the quality of software or reduce the efficiency in operations.

There are also problems in the storage and management of designed documents. Conventionally, each designer stores and manages the documents in DASDs or floppy disks. However, if a large volume of designed documents for a large-scale software are stored in the above described conventional method, only a designer knows the location of his segment of the whole designed document. Therefore, there arises a problem that the following processes of referring to or maintaining the designed documents may not be performed smoothly. To prevent such a disorder, the location of each level of designed documents is described in writing, or orally notified to each developing member. However, this is not sufficient and incurs the reduction of efficiency in operations.

There arise problems also in taking over a job from a designer in the upstream to a plurality of designers in the downstream. Since a designer in the downstream can update a designed document written by a designer in the upstream in the conventional method, errors may arise in the designed document referred to by a plurality of designers in the downstream. Additionally, in detailing a document from the upstream to the downstream, the same designed parts are duplicated or described by a copy function. During these operations, errors can be made by mistake. If a document is written in detail with these mistakes contained therein, an enormous effort must be made to correct them in the later process, thereby reducing the development efficiency and deteriorating the quality of the resultant product.

Simple mistakes are often made in a writing operation performed manually or with a word-processor, such as missing a letter in a description, missing a connection between symbols in a drawing, etc. However, in the case of a manual writing, errors must be detected only by manually checking the designed document. Since even a word-processor cannot identify graphic symbols, errors in them also must be detected manually by checking an edition screen of a document or a printed result. The problem is that all these mistaken errors cannot be detected automatically.

SUMMARY OF THE INVENTION

The present invention aims at improving the development efficiency and the quality of software by removing a recognition gap between a designer and readers of a design document, totally managing the information about a design document, design parts, and the relationships among design parts, and automatically checking the design parts and the relationships among them, etc.

The present invention relates to a software design support device comprising an interaction management control unit for controlling an interaction with a designer, and a design document file for storing a design document which is a result of a designing operation.

Furthermore, the software design support device comprises an abstract level prescribing unit for dividing, and then managing, the procedure for a software designing operation into a plurality of abstract levels in association with the thinking processes of human beings. The abstract level prescribing unit presents design guidance for designer-selected abstract levels. The abstract level prescribing unit also prescribes specification information and design parts to be described at each abstract level by a designer, and the dependence relationship in the information about the relationships. It provides guidance as to how to describe specification data and design parts when a designer describes them, and provides guidance by presenting specification data for a low-order abstract level when the designer details specific design parts.

Next, the software design support device comprises a design editor for aiding a designing operation and checking a designed software.

First, the abstract level prescribing unit divides the detailed procedure for software designing operation into a plurality of abstract levels in association with the thinking processes of human beings, and provides designing guidance to designer-selected abstract levels.

For example, a procedure for designing software is divided to abstract levels. They are a conception level, a processor configuration level, a task configuration level, a module configuration level, and a module level.

The abstract-level prescribing unit prescribes for each abstract level of the specification information group to be described by a designer, the design parts group to be defined by the designer, the relationships among design parts, each specification information and design parts, and the dependence relationship in the information about the relationships. For example, the specification information about task configuration level which is the third abstract level contains the specification information such as the sequence of tasks, the outline of tasks, the transition of the state in a processor, the common data formats, etc., and the design parts group such as tasks, common data, mailboxes, etc. When a designer describes specification information or design parts, he is guided as to how to describe the data and the design parts. Furthermore, the specification information at a low-order abstract level is presented for guidance when a designer details specific design parts based on the specification information, the design parts, the relationships among the design parts, and the dependence relationship in the information about the relationships.

Next, a design editor unit supports a designing operation and checks a resultant software.

The design editor is available for specification information prescribed at each abstract level. The design editor unit activates a design editor for the designer-selected specification information, supports an editing operation, lists design editors for defining design parts for the designer-selected design parts, activates the design editor after having the designer select the name of a design editor, and thus supports the designing operation.

The design editor unit checks whether of not a design result or an entry by a designer is consistent or missing when an editing operation is completed by the design editor, when the designer enters a specific attribute or instruction restrictions, or when the designer requests for a check.

A program parts editor processes program parts described by a design editor, and supports a program parts designing operation by activating the program parts editor at a request of the designer for detailed description of program parts.

Third, a linked-detailing support unit supports the detailing process in designing software based on the transition of abstract levels when a designer describes a design product in detail during a designing operation in the above described design editor unit according to the transition of the abstract level prescribed by the above described abstract level prescribing unit. This is attained by presenting a designer with items to be described in detail, activating the design editor unit for describing these items, checking whether or not the conditions exist for activating the design editor, and presenting information required for describing a designed product in detail.

Fourth, a design document managing unit stores a design document and program parts as a result of the design by the design editor unit after automatically generating and managing in a design document file in a DASD a hierarchical directory based on abstract levels. At this time, a review state is also stored to indicate whether the stored design document or program parts are being designed or edited, the editing operation is completed. The review state can be indicated if necessary.

Fifth, a design data base storage unit registers and updates parts meeting specific conditions, for example, limiting the review state to "edition completed" among design parts and program parts stored in a designed document file.

Last, a design information inconsistency correction support unit controls to keep consistency between the design information about a design document file managed by the design document managing unit and the design information stored by the design data base storage.

According to the configuration described above, since the software designing operation is divided into hierarchical abstract levels based on a procedure, guidance can be given for a designer at each abstract level. Besides, since specification information, design parts and accessory attributes, the association between design parts, and their pertaining attributes are prescribed at each abstract level, guidance can be given with the specification information and the design parts to be described by the designer in detail for each abstract level. Additionally, since the detailing process for each group of design parts is prescribed, the recognition gap attributable to the level of the abstract of a designer's specification can be minimized, thereby continuously supporting the detailing process. As a result, the software design uniform in abstract level without missing portions can be realized.

In the designing and editing processes, design parts to be described in each specification information, types of relationships and their representation are prescribed. Therefore, the description can be represented in the same format although each of the designers is not familiar with development restrictions, precedents, or customs, thereby reducing the difference among designers.

Since the design editor is provided with a checking function, mistaken design which can be often made by a designer and may arise a serious logical mistake in the following manufacturing and testing processes such as connection mistakes between designed parts during or on completion of an editing process, duplicate parts, attributes missing in description, etc. can be prevented. Besides, during an editing operation, a character string for an attribute can be checked for validity when entered, thereby reducing mistakes in character attributes during an editing operation.

In managing design documents, the hierarchical structure at each abstract level can be automatically configured and managed. Accordingly, a number of design document segments at various abstract levels can be easily managed and located even though a large scale software is developed by a large number of designers. A design document can be easily referred to by any person other than the administrator or the designers of the software based on the hierarchy of the abstract levels.

Furthermore, since a review state determining method is incorporated, the current review state can be obtained for each document, and the state as to whether the design information is agreed only personally, agreed among the persons involved, or the whole project is agreed can be easily determined. Thus, the process of design can be determined, which is required in designing software by a plurality of designers. Therefore, in case a designing operation is executed by referring to document sections prepared by other designers, disorders and mistakes caused by wrong design information according to a misunderstanding when the document is detailed can be prevented.

Since a design data base stores a list of the design documents containing the registered design parts and the relationship entity, the name of a design document containing specified design parts and the relationship entity can be automatically extracted to identify affected design documents when the document information once defined in a design document is updated. Additionally, a design editor for the design document can be easily activated to reduce the affection, and design parts objects, etc. to be corrected can also be presented. Thus, the designing operation can be performed efficiently with the inconsistency minimized.

If the design is described in detail from a high-order abstract level to a low-order abstract level, a linked-detailing support method is used. Therefore, specification information to be described in detail for each group of design parts can be prescribed, and the attribute of design parts described in the upstream level can be taken over in the design editor activated for the specification information in the downstream in the detailing process. Thus, an attribute can be prevented from being duplicated in a document. Since a detailing condition check method is used, a missing attitude can be automatically checked the designed parts objects in the upstream to be described in detail, thereby reducing the inconsistency in a designing operation.

Since guidance can be presented for a designing operation at the request of a designer, the designer can obtain an appropriate operation image.

As is described above the present invention is summarized as follows. An abstract level is defined in accordance with a demand of a client and a designing procedure is guided in accordance with the conception level, the processor configuration level, the task configuration level, the module configuration level and the module level. With regard to respective abstract levels, the specification information and the design parts are defined in the table and are guided. The detailing linked table between the specification information and the design parts is also provided so that they are connected by pointers. For example, parts such as a task are described in several places such as the specification information or the design parts, but, the same task is controlled to open the same module configuration level. A design editor is provided for the specification information on one-by-one basis, for example, such that such guidance of opening the same module configuration level is performed.

BRIEF DESCRIPTION OF THE DRAWINGS

Other objects and featured of the present invention can be easily recognized by referring to the attached drawings and preferred embodiments.

DESCRIPTION OF THE PREFERRED EMBODIMENTS

Explanation of the Principle

Figure 1:
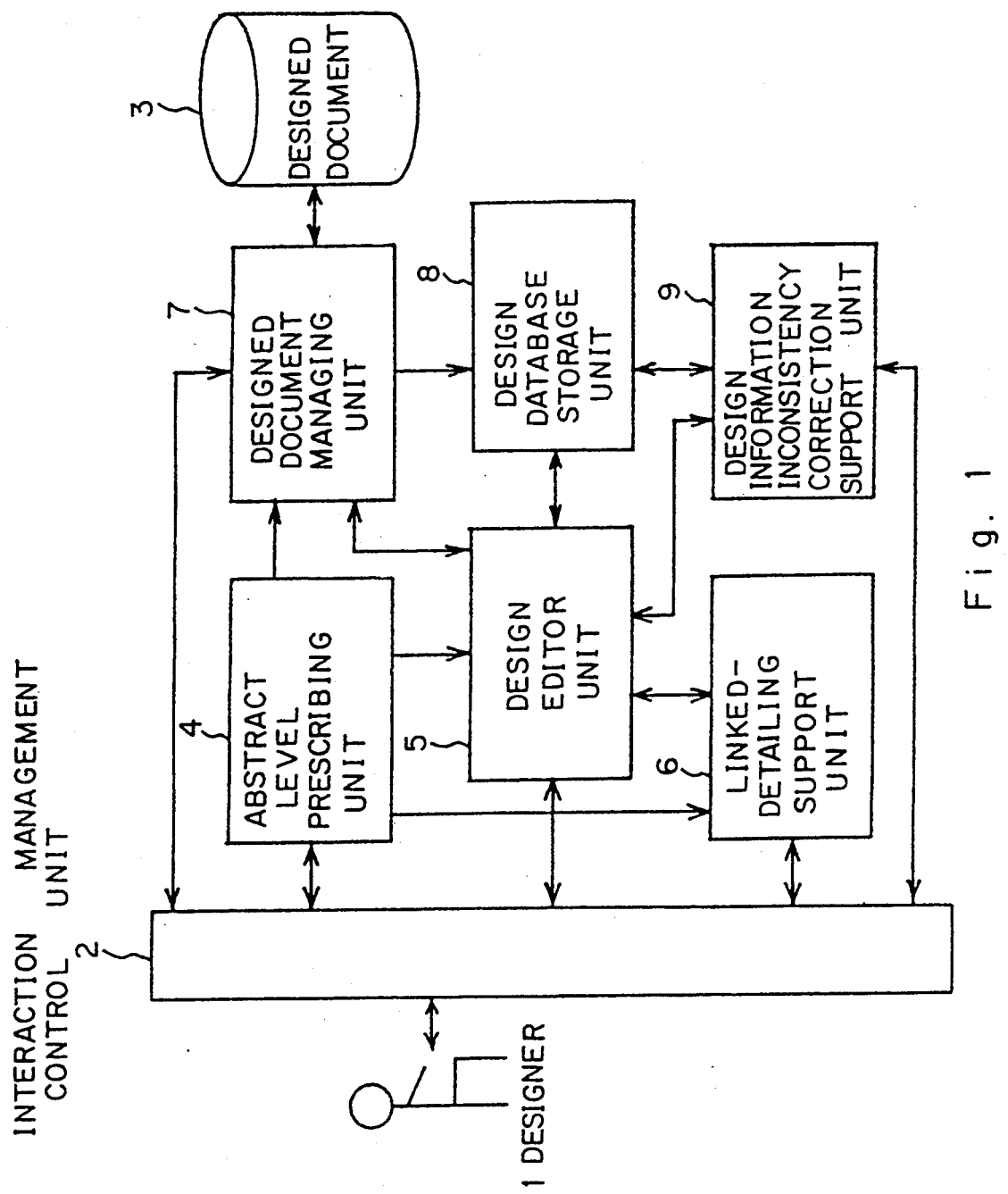
FIG. 1 is a block diagram showing the principle of the present invention.

FIG. 1 is a block diagram for explaining the principle of the present invention.

The present invention comprises an interaction management control unit 2 for controlling the interaction with a designer 1, and a designed document file 3 for storing a designed document as a result of a designing operation. The designer 1 inputs and outputs data for designing software through the interaction management control unit 2 in the software designing device.

First, the abstract level prescribing unit 4 divides, and then manages, the detailed procedure for software designing operation into a plurality of abstract levels in association with the thinking processes of human beings, and provides designing guidance to abstract levels selected by the designer 1 during the designing operation. For example, a procedure for designing software is divided to abstract levels. They are a conception level, a processor configuration level, a task configuration level, a module configuration level, and a module level. The conception level means the demand of a client, for example a kind of services which a banker wishes to perform. The processor configuration level means how the processors should be combined as a hardware configuration or a network structure in order to perform such services. The task configuration level configures the task. The task means process units which are performed in parallel under control of an OS in a CPU. An interface of a physical hardware is defined. A synchronization control and an exclusive control, a communication between tasks and priority of the task operation, for example, are defined in this task configuration level. The module configuration level provides a configuration of the module which is a unit of a compile within a task, namely, a minimum unit of a program. The module configuration level also defines the data shared by respective modules, for example. The module level defines a processing logic within respective modules, namely, a loop, a branch, a value to which a program returns, and a local valuable. The module level may depend on a language of the program.

The abstract level prescribing unit 4 prescribes for each abstract level the specification information group to be described by the designer 1, the designed parts group to be defined by the designer, the. relationships among designed parts, each specification information and designed parts, and the dependence relationship in the information about the relationships. For example, the specification information about task configuration level which is the third abstract level contains the specification information such as the sequence of tasks, the outline of tasks, the transition of the state in a processor, the common data formats, etc., and the designed parts group such as tasks, common data, mailboxes, etc.

When a designer 1 describes specification information or designed parts, he is guided as to how to describe the data and the designed parts. Furthermore, the specification information at a low-order abstract level is presented for guidance when a designer details specific designed parts based on the specification, the designed parts, the relationships among the designed parts, and the dependence relationship in the information about the relationships.

Next, in a design editor unit 5, a design editor is provided corresponding to each specification information at each abstract level. The design editor unit 5 supports an editing operation by activating a design editor for prescribing designer-selected specification information, and supports a designing operation by listing design editors for defining designed parts selected by the designer 1 and activating the design editor selected by the designer 1. A program parts editor 5 is provided with a program parts editor for processing program parts described by a design editor. It supports a program parts designing operation by activating the program parts editor at a request of the designer for detailing program parts.

The design editor unit 5 also checks the software designed by the designer 1. That is, when a design editor completes an editing operation, the design editor unit 5 automatically checks the consistency in the relationships among designed parts or attributes missing in the description during an exiting operation of the design editor at the request of the designer 1. It automatically checks the types and instruction restrictions of designed parts and relationship attributes during an inputting operation of the designer 1. The unit automatically checks the consistency when the relationship between two specific designed parts is connected by an arrow.

When a designer details a document according to the transition of the abstract levels prescribed by the abstract level prescribing unit 4 in a designing operation of the design editor 5, a linked-detailing support unit 6 supports a detailing operation in designing software according to the transition of an abstract level by presenting the designer with items to be described, activating a design editor for describing the items, checking whether or not the condition exists to activate the design editor, and presenting the information about how to detail a document.

That is, when the designer 1 details a mail box which is designed parts at the task configuration level, the linked-detailing support unit 6 presents the designer 1 with a plurality of design editor names corresponding to each of the specification information groups used for detailing the mail box according to lower-order detailing specification information managed by the abstract level prescribing unit 4. It can directly activate the design editor. Additionally, for example, it inserts from a design editor which supports a mail box (at a task configuration level) designing operation to a detailing design editor the designed parts attribute information to be taken over. Also, it checks whether or not the designed parts attribute information sufficient to activate the detailing design editor is already described by a high-order design editor. If the information is insufficient, it notifies the designer 1 that the design editor cannot be activated.

A designed document managing unit 7 stores in the designed document file 3 in the DASD a designed document and program parts obtained as a result of the designing operation of the design editor unit 5. At this time, the designed document managing unit 7 automatically generates a hierarchical directory according to the abstract level prescribed by the abstract level prescribing unit 4, stores the designed document and program parts together with the review states indicating that they are being processed in the design editing operation or they are through with the operation, and outputs the review states if necessary.

The designed document managing unit 7 specifies the review state for a self-review, a mutual review, or a total review. The self-review indicates the state of the design editing operation of each designed document by each designer. The mutual review indicates the state of the designing operation among a plurality of designers. The total review indicates the state of the total designing operation at each abstract level including the administrator.

A design data base storage unit 8 registers as data the parts meeting a specific condition from among the designed parts and program parts stored in the designed document file 3. For example, it specifies the parts having the review state of "edited." The data are updated if necessary.

Finally, a design information inconsistency correction support unit 9 controls to keep the consistency between the design information in the designed document file 3 managed by the designed document managing unit 7 and the design information stored by the design data base storage unit 8. That is, when the designed document already registered in the design data base is corrected by the design editor, the designed parts and program parts in the design data base must be the same as those in the designed document file 3. To attain this, all the names of designed documents related to the correction are extracted, notification is made that the correction must be made to all the related parts, or the design editor associated with the designed document to be corrected is activated directly, a graphic symbol of designed parts to be designed in a designed document to be corrected is identified by high intensity, inverted display color, etc., or the correction of replacing characters is automatically made after approved by the designer 1.

The operation of the above described principle is described below.

When the designer 1 designs software, he informs the interaction management control unit 2 of his request for designing software. On receiving the request, the interaction management control unit 2 activates the abstract level prescribing unit 4.

The abstract level prescribing unit 4 first presents hierarchically divided abstract levels through the interaction management control unit 2. Thus, for example, the abstract levels such as the concept level, the processor configuration level, the task configuration level, the module configuration level, the module level, etc. are displayed as a directory. At a displayed abstract level, the designer 1 inputs a desired level through the interaction management control unit 2.

Next, the abstract level prescribing unit 4 presents the guidance for the specification information and designed parts to be described by the designer 1 at the abstract level selected by the designer 1. For example, when the designer 1 selects the task configuration level as an abstract level, it indicates that the specification information to be described at the task configuration level contains, for example, the sequence of tasks, the outline of tasks, the state transition in the processor, and the common data format. Then, the designer 1 can selects from the items listed above the specification information to be described by him.

When the designer 1 requests to detail the already described designed parts, the unit gives the guidance for the specification information and the designed parts information at the abstract level lower than the abstract level of the already described designed parts.

To attain this, the abstract level prescribing unit 4 prescribes and manages the specification information group, the designed parts group, the relationships among the designed parts, each specification information and designed parts, and the dependence relationship in the information about the relationships.

When the designer 1 selects specification information and designed parts to be described, the design editor unit 5 is activated. The design editor is assigned one to one to the specification information prescribed at each abstract level, and normally activates a design editor corresponding to the specification information selected by the designer. A design editor supports a designing operation of a designer. If the designer 1 selects designed parts, a design editor group required to define the designed parts is listed so that the designer 1 can select a desired design editor name and activates it.

An operation of checking the contents described by the designer 1 is supported by a designing operation. For example, when an editing operation is completed by the designer 1 with the design editor closed, the checking operation automatically checks whether or not inconsistency exists in the relationships among the designed parts, or whether or not there is an attribute missing in the description. When the designer 1 requests a checking operation during the designing operation, a check is made as described above. Furthermore, if the designer 1 describes the designed parts and the relationship attributes, the description must meet the predetermined type and instruction restrictions. Therefore, in entering these attributes, they are automatically checked for consistency.

In the designing process, the designer 1 issues a request for detailing according to the transition of the abstract levels the designed parts and the specification information already described at an abstract level. For example, the designer 1 may request to detail a mail box, which is designed parts at the task configuration level, at the module configuration level, a lower order abstract level. In this case, the abstract level prescribing unit 3 presents the relationship information between the abstract levels of the specification information and the design information, etc. managed by the abstract level prescribing unit 3 to give the guidance as to how to detail and what to describe. Then, the linked-detailing support unit 6 can be activated.

The linked-detailing support unit 6 presents a design editor group associated with the specification information to be described in the detailing process. According to this, the designer 1 selects a desired item, or automatically activates a specific design editor. At this time, determination should be made as to whether or not the attributes at a high-order abstract level is described sufficiently, and as to whether or not the design editor for the detailing operation is ready to be activated. If there is an entry missing in the description, it must be notified and the designer 1 must be requested to cover the missing item. Furthermore, the information about the designed parts attributes, etc. described by a high order design editor is inserted to the design editor activated in the low order so that the linkage from the high order to the low order can be performed smoothly.

When the designer 1 completes or suspends a designing operation using a design editor, he requests to store the designed document designed to far in designed document file in the DASD. At this time, the designed document managing unit 7 is activated.

The designed document managing unit 7 generates a hierarchical directory in the designed document file 3 in the DASD according to the hierarchy of abstract levels. In response to the request for storage issued by the designer 1, the designed document managing unit 7 determines where in the designed document file 3 the designed document should be stored. Then, it stores the designed document in position together with the review state indicating that the document is through with the editing operation or it is still being processed.

The designed document managing unit 7 specifies the review state for a self-review, a mutual review, or a total review. The self-review indicates the state of the design editing operation of each designed document by each designer. The mutual review indicates the state of the designing operation among a plurality of designers. The total review indicates the state of the total designing operation at each abstract level including the administrator. The designer 1 is requested to enter the current review state, and the state information is stored together with the designed document. When the contents of the designed document file 3 are referred to, the designed document managing unit 7 indicates the design review together with the directory of the stored designed document.

In the designed parts and the program parts of the designed documents stored in the designed document file 3, those newly completed are registered as design data bases so that they can be used in the following designing operation. When the designer 1 requests to register the parts of a document in the design data base, the design data base storage unit 8 is activated. The design data base storage unit 8 determines whether the review state of the parts to be registered at the request of the designer 1 is "completed" or "not completed". It registers the parts as a design data base if the state says "completed".

Modifications and improvement can be made to designed parts and program parts registered as design data bases. In this case, the designer 1 accesses the designed parts and the program parts from the design data base storage unit 8, modifies them by the design editor in the design editor unit 5, and registers again the updated designed parts and program parts by the design data base storage unit 8. At this time, if only the designed parts and the program parts registered in the design data base are updated, there arises the inconsistency between the description in the design data base and that in the designed document file 3.

Therefore, if the designed parts and the program parts already registered in the design data base are updated by the design data base storage unit 8, the design information inconsistency correction support unit 9 is activated. That is, the support is provided to remove the inconsistency between the content of the design data base and that of the designed document in the designed document file 3.

The design information inconsistency correction support unit 9 first extracts the name of the designed document related to the updated designed parts and the program parts, and indicates that a correction should be made to the design data base. Then, the design editor related to the designed document to be corrected is activated directly to display in high intensity or in a specific color effect the graphic symbols of the designed parts and the program parts to be corrected. Furthermore, when the correction is made by replacing characters, it should be automatically done after approved by the designer 1.

Thus, the support covers the whole processes of designing software by the designer 1.

Explanation of preferred embodiments

The preferred embodiments of the present invention is described below by referring to the attached drawings.

Figure 2:
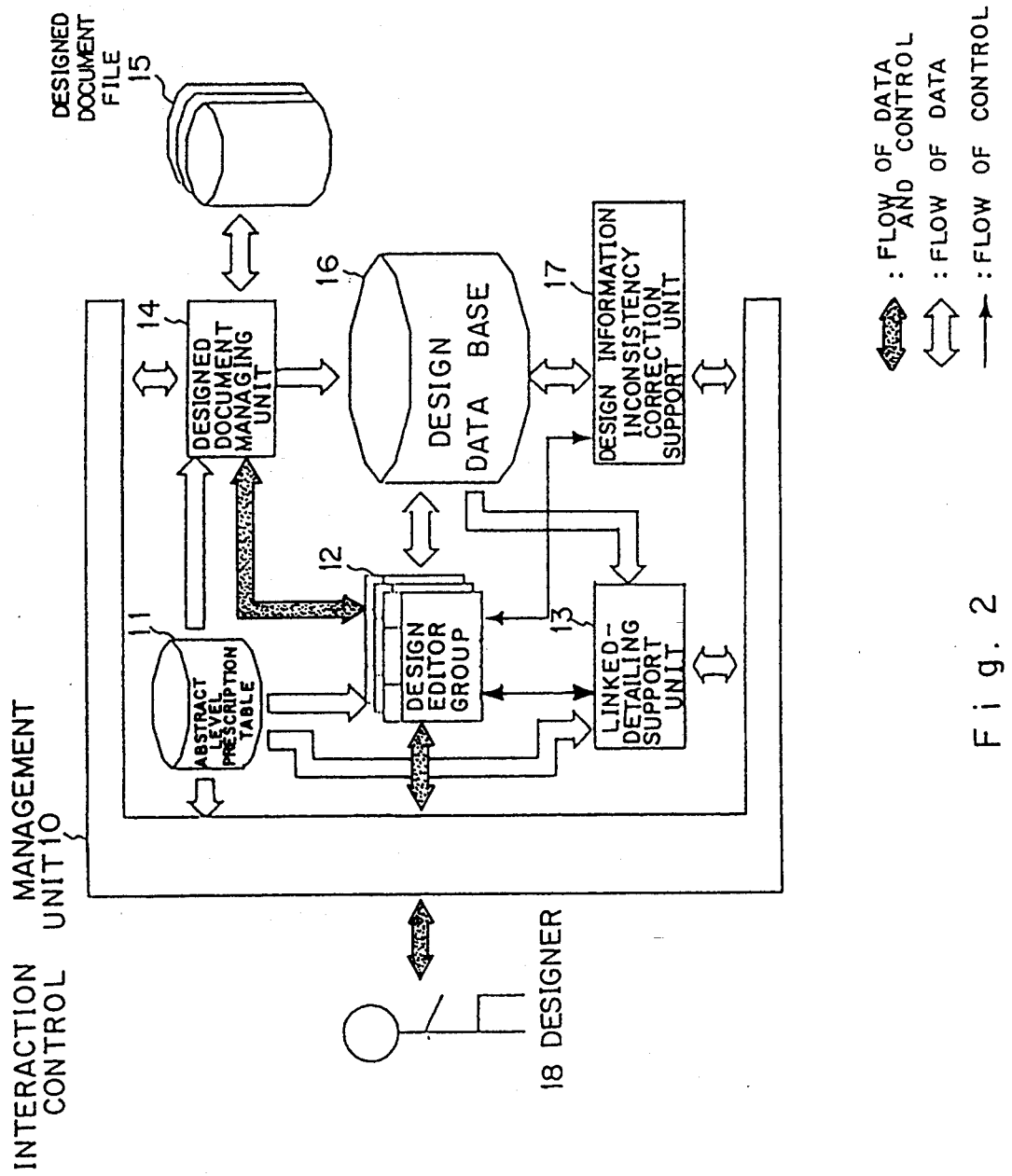
FIG. 2 shows the system configuration of an embodiment.

FIG. 2 shows the system configuration of an embodiment of the present invention. The whole system can be realized as, for example, the software for computer systems such as large scale general purpose computers and workstations. However, they must comprise a direct access storage device (DASD) such as hard disk devices.

The embodiment comprises an interaction management control unit 10, an abstract level prescription table group 11, a design editor group 12, a linked-detailing support unit 13, a designed document managing unit 14, a designed document file 15, a design data base 16, and a design information inconsistency correction support unit 17.

The interaction management control unit 10 manages and controls the interaction between a designer 18 and the system, that is, inputs and outputs. For example, the designer 18 specifies an abstract level at which he wants to design software through the interaction management control unit 10, inputs design information, and specifies a request for support to a designing operation.

The abstract level prescription table group 11 is a prescription table group listing abstract levels defined in this system. The table defines the designed parts at each abstract level, the types of the relationships among the designed parts, the types of the attributes of each designed parts and the relationships, and the types of the design editors each corresponding to the specification information. The detailed contents of the definition are described later.

The design editor 12 comprises a plurality of design editors each being allocated to the specification information at each abstract level. The designer 18 selects an abstract level defined by the abstract level prescription table group 11, obtains the guidance as to how to design software, and then activates a corresponding design editor.

The linked-detailing support unit 13 provides support such that a detailing operation can be performed effectively and efficiently when the designer 18 details a specific designed parts according to the transition of abstract levels. For this purpose, The unit refers to the attribute information, etc. about the relationships among the designed parts stored in the abstract level prescription table group 11, gives the obtained information to the designer 18, and sends it to the designed document to be detailed.

The designed document managing unit 14 stores in the designed document file 15 the designed document as generated by any design editor in the design editor group 12, and then manages it. The designed document file 15 is stored in secondary media such as hard disks designed documents are stored and managed in the abstract level hierarchy.

The design data base 16 stores data relating to the designed parts defined by the design editors and the relationships among the designed parts. The design information inconsistency correction support unit 17 checks the consistency in the contents described in a plurality of designed documents in the abstract level within the designed parts registered in the design data base and the relationships among them. If inconsistency is detected, it provides the support to correct the inconsistency.

The abstract level prescription table 11, the design editor group 12, the linked detailing support unit 13, the designed document managing unit 14, the design data 16, and the design information inconsistency correction support unit 17 are described in detail below.

Figure 3:
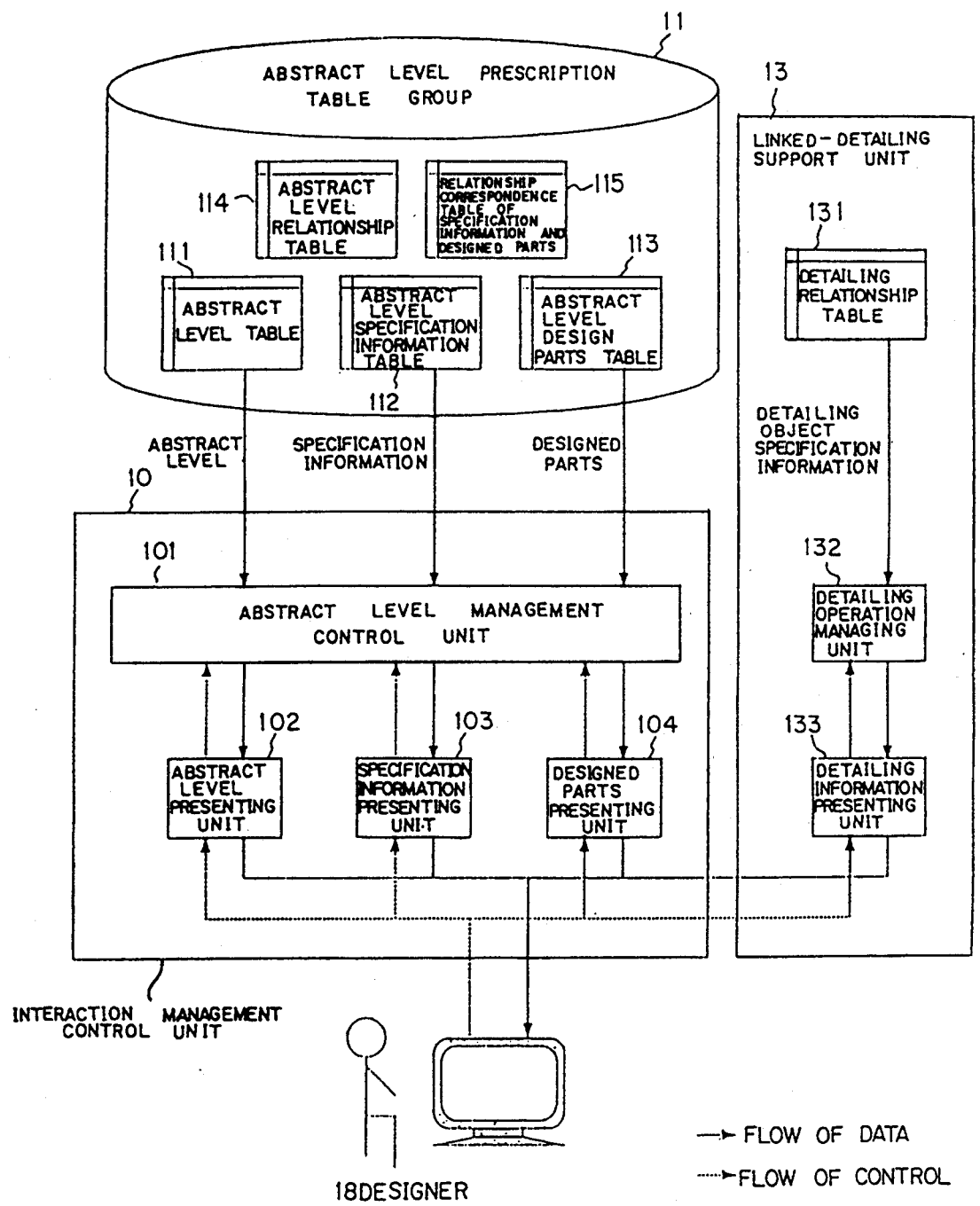
FIG. 3 is a view for explaining the abstract level prescription table group and the linked-detailing support unit.

FIG. 3 is a view for explaining the abstract level prescription table group 11 and the linked-detailing support unit 13.

The abstract level prescription table 11 is stored in the main storage of a computer system, for example. It comprises an abstract level table 111 for prescribing abstract levels, an abstract level specification information table 112 for listing specification information and associating the abstract levels with the specification information, an abstract level designed parts table 113 for listing designed parts and associating the abstract levels with the designed parts, an abstract level relation table 114 for associating the relationships among the designed parts with those between the abstract levels and the designed parts, and a specification information-to-designed parts relation table 115 for registering the relationships between the specification information and the designed parts, the pertaining attributes and the designed parts, and the dependence relationship among the pertaining attributes.

The interaction managing control unit 10 comprises an abstract level managing control unit 101 for managing the abstract level prescription table 11. In response to a request from the designer 18 for the guidance, it accesses the information in the abstract level prescription table according to the request, and presents the designer with the information. Additionally, to process the request from the designer 18 for the guidance, the interaction managing control unit 10 comprises an abstract level presenting unit 102, a specification information presenting unit 103, and a designed parts presenting unit 104.

For example, when the designer 18 issues a request for performing a designing operation, the abstract level presenting unit 102 instructs the abstract level managing control unit 101 to extract prospective abstract levels. In response to the instruction, the abstract level managing control unit 101 extracts prospective abstract levels from the abstract level table 111, and notifies the abstract level presenting unit 102 of the prospects. The abstract level presenting unit 102 presents the designer 18 with the notified prospective abstract levels. Then, the designer 18 specifies a desired level at which he starts the designing operation.

When the designer 18 requests the specification information presenting unit 103 to present a specification information group in the specified abstract level, the specification information presenting unit 103 instructs the abstract level managing control unit 101 to extract prospective specification information in the specified abstract level. The abstract level managing control unit 101 extracts from the abstract level specification information table 112 the corresponding specification information at the specified abstract level in the preliminarily registered abstract level, and then notifies the specification information presenting unit 103 of it. The specification information presenting unit 103 presents the designer 18 with the notified prospective specification information.

When the designer 18 issues a request to present the designed parts at the specified abstract level, the designed parts presenting unit 104 instructs the abstract level managing control unit 101 to extract the designed parts at the specified abstract level. The abstract level managing control unit 101 extracts from the abstract level designed parts table 113 the designed parts at the specified abstract level among preliminarily registered designed parts at the abstract level. Then, it notifies the designer of the notified prospective designed parts.

The linked-detailing support unit 13 comprises a detailing relationship table 131 for relating the type of the specification information related to the detailing operation for designed parts to the designed parts and registering the relationship, a detailing operation managing unit 132 for managing the table, and a detailing information presenting unit 133.

When the designer 18 requests the detailing information presenting unit 133 to present the specification information related to the detailing operation for specific designed parts, the detailing information presenting unit 133 instructs the detailing operation managing unit 132 to extract the specification information related to the detailing operation for the specified designed parts. The detailing operation managing unit 132 extracts from the detailing relationship table 131 the specification information related to the detailing operation for the designed parts, and notifies the detailing information presenting unit 133 of the information. The detailing information presenting unit 133 presents the designer 18 with the notified specification information.

Figure 4:
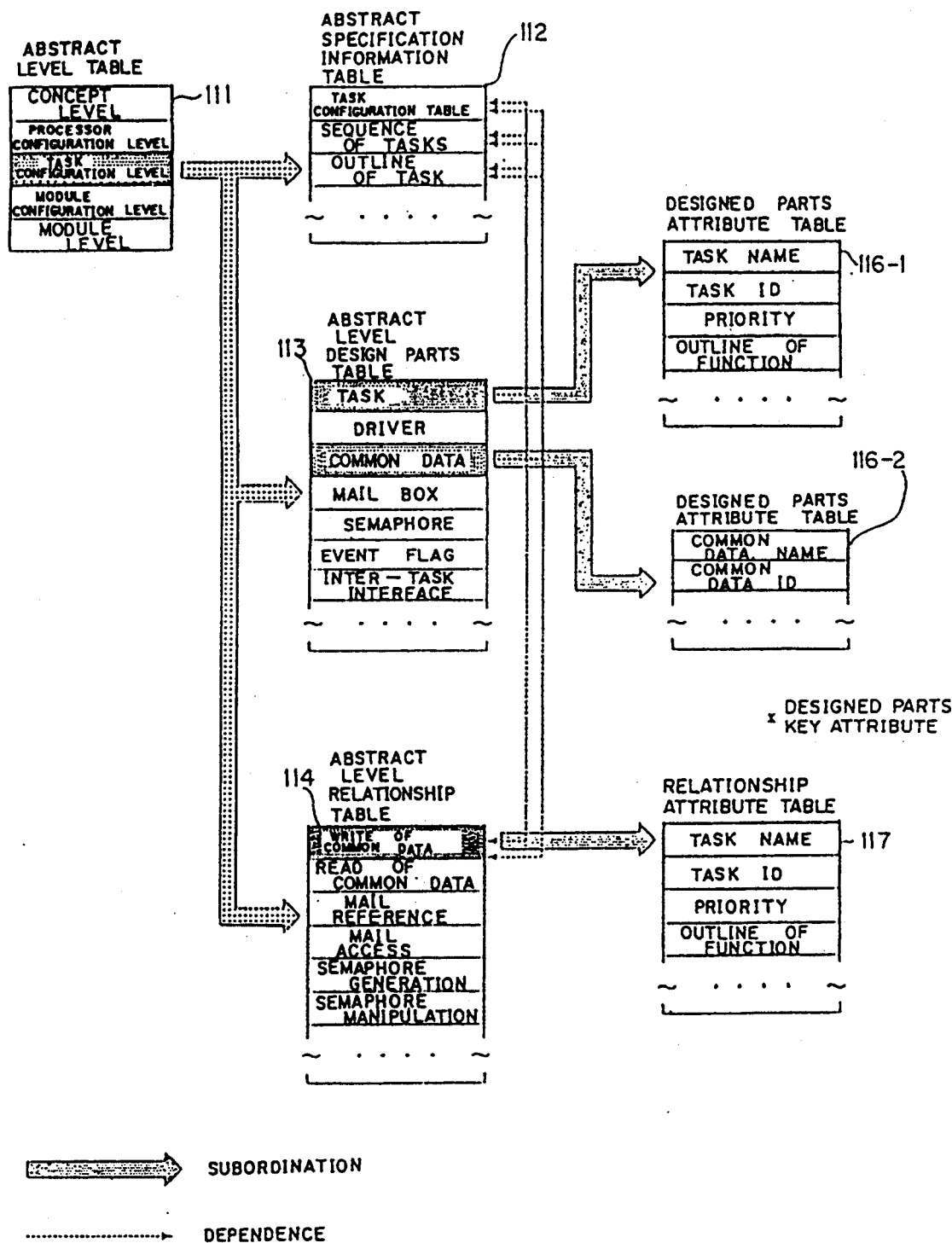
FIG. 4 is a view for explaining the abstract level prescription table of an embodiment.

FIG. 4 shows the contents of the abstract level prescription table 11 of an embodiment. The abstract level table 111 in the embodiment prescribes five hierarchical levels. They are a concept table, a processor configuration level, a task configuration level, a module configuration level, and a module level. Relating to each of the abstract levels, the specification information group is prescribed and registered by the abstract level specification information table 112, the designed parts group by the abstract level designed parts table 113, and the relationships among the designed parts by the abstract level relation table 114.

For example, the task configuration level in the abstract level table 111 is described below. The task configuration level in the specification information includes a task configuration, the sequence of tasks, the outline of a task, etc. shown in the abstract level specification information table 112. The task configuration level in the designed parts includes a task, a driver, common data, a mail box, a semaphore, an event flag, an intra-task interfaces, etc. shown in the abstract level designed parts table 113. The task configuration level in the relationships among the designed parts includes a write of common data, a read of common data, a mail reference, a mail access, the generation of a semaphore, the operation of a semaphore, etc. shown in the abstract level relation table 114.

The designed parts in the abstract level designed parts table 113 and the relationships in the abstract level relation table 114 are associated with each attribute. This is indicated in a design part attribute table 116 and a relation attribute table 117.

The designed parts attribute table 116 is described using a task and common data in the designed parts in the abstract level designed parts table 113. The designed parts "task" are related to the attributes (116-1) such as a task name (key attribute), a task ID, a priority, an outline of a function, etc. The designed parts "common data" are related to the attributes (116-2) such as common data names (key attribute), a common data ID, etc.

The attributes related to the abstract level relation table 114 are, for example, a task name, a task ID, common data names, common data IDs, etc. for "a write of common data" are stored in the relation attribute table 117.

As shown in FIG. 3, the abstract level prescription table group 11 further includes a specification information-to-designed parts relation table 115 indicating the relationship between the specification information and the designed parts. This can be explained by referring to FIG. 4. The task and the common data in the abstract level designed parts table 113 are contained in a plural pieces of different specification information, that is, task configuration, the sequence of tasks, and the outline of the task shown in the abstract level specification information table 112. The attributes of a write of common data shown in the abstract level relation table 114 are the same as those of the designed parts "task" and "common data". The relationships are registered to the specification information-to-designed parts relation table 115.

Figure 5:
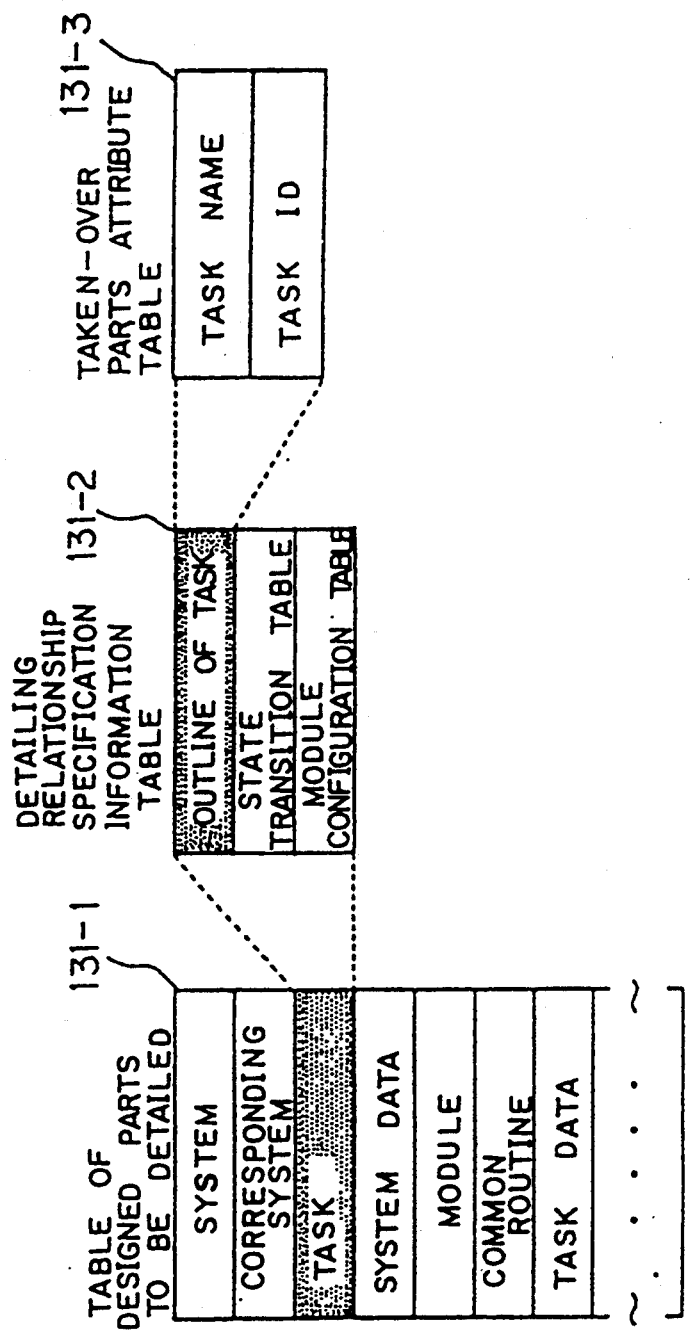
FIG. 5 is an explanatory view of the detailing relationship table of an embodiment.

FIG. 5 is a view for explaining the detailing relationship table 131 of an embodiment. It is a three-step hierarchical table. First, a detailed designed parts table 131-1 which is a list of the designed parts containing the specification information used in a detailing operation comes in the highest order of the table. The designed parts having the specification information used in a detailing operation are system, corresponding system, task, system data, module, common routine, task data, etc. The specification information used for a detailing operation is registered in the second highest order in the table corresponding to each of the designed parts as a detailing relationship specification information table 131-2. In the case of the designed parts "task", for example, the corresponding specification information "outline of a task", "state transition table", and "module configuration" are registered (131-2). In the lowest order, a designed parts attribute to be taken over from the designed parts to the specification information is stored as a taken-over parts attribute table 131-3. For example, "outline of a task" in the detailing relationship specification information table 131-2 shows the task name and the task ID as parts attributes to be taken over.

In an actual software designing operation, a design editor group (12 in FIG. 2) is activated by presenting the specification information, designed parts, and relationship information prescribed in the abstract level prescription table group 11 as described above.

Figure 6:
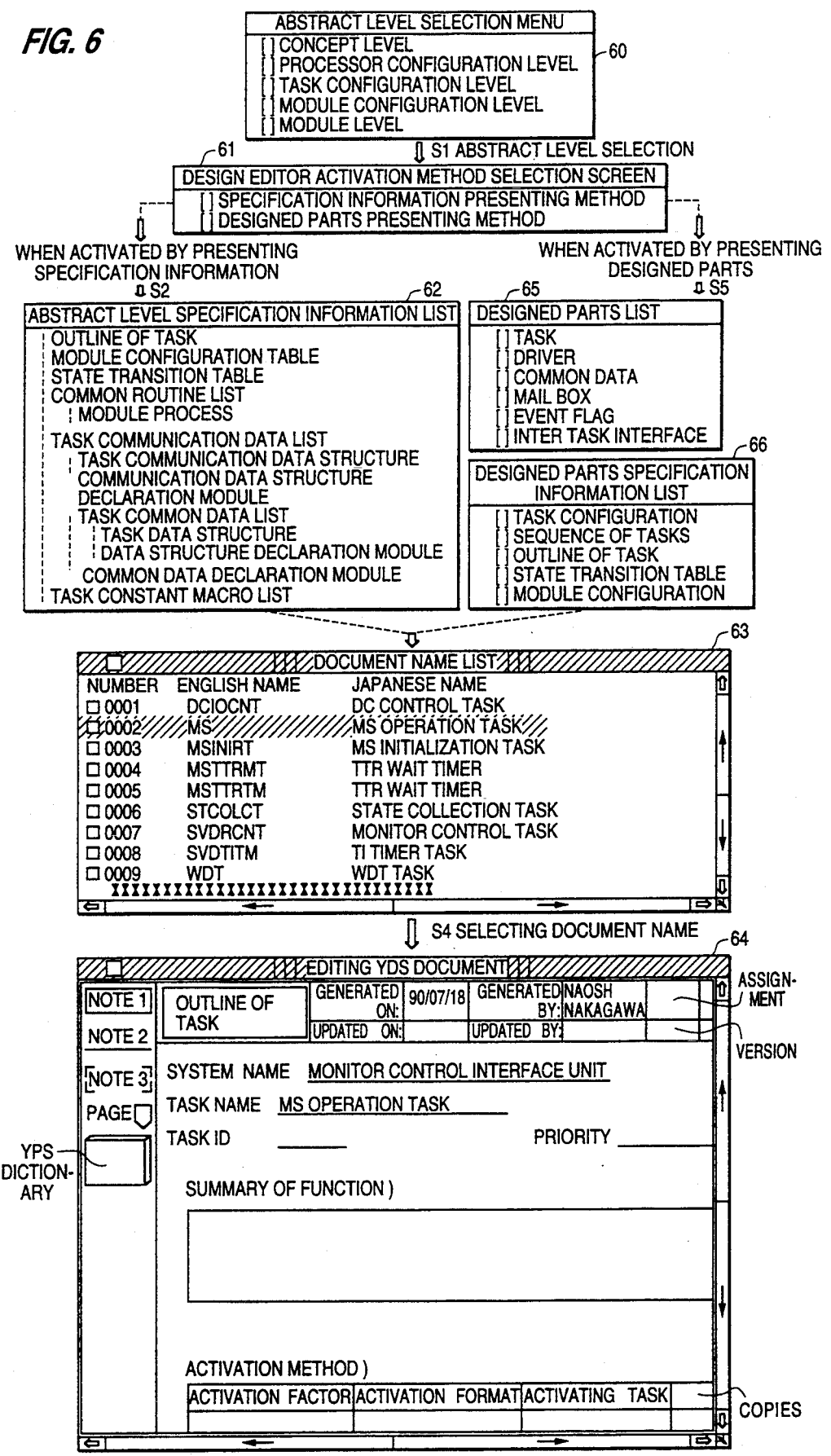
FIG. 6 is a view for explaining the processes from the guidance for a designer to the activation of a design editor.

FIG. 6 shows an embodiment of displays indicating the abstract levels notified to the designer 18, the selection by the designer 18, and the activation of the design editors.

When the software development support system of the present embodiment is activated, an abstract level selection menu 60 is displayed on the display unit. That is, five abstract levels are displayed. They are a concept level, a processor configuration level, a task configuration level, a module configuration level, a module level. The designer 18 selects one of these prospects (S1). Assume that the designer 18 requests and selects an operation at the task configuration level.

Then, a selection screen 61 for selecting a method of activating a design editor is displayed. There are two methods of activating a design editor. They are a specification information presenting method according to the specification information, and a design part presenting method according to the designed parts.

If the designer 18 selects the specification information presenting method (S2), the specification information at the task configuration level is presented according to an abstract level specification information list 62. For example, when the designer 18 selects "outline of a task" as the specification information to be designed (S3), a task outline document for a practical task is presented as a list according to a document list 13. If the designer 18 specifies the document name (S4), a design editor 64 is activated. For example, if the MS operating task is selected (S4), a task outline editor for the MS operating task is activated.

If a design part presenting method is selected according to the design editor activating method selection screen 61 (S5), the designed parts at the task configuration level are presented according to a designed parts list 65. If the designer 18 selects a task as the designed parts to be detailed (S6), the specification information contained in the designed parts "task" is presented as a designed parts specification information list 66. The designer 18 selects one piece of specification information from the list (S3). If the designer 18 selects "outline of a task" (S3), a list of task outline document names of actual tasks is displayed as a document name list 63 as in the design editor activating method according to the above described specification information presenting method. If the MS operation task is selected (S4), a task outline editor for the MS operation task is activated.

The activated task outline design editor presents. a format in which the designed parts is described. The designer 18 enters the designed parts according to the format determined by the task outline in the specification information.

Figure 7:
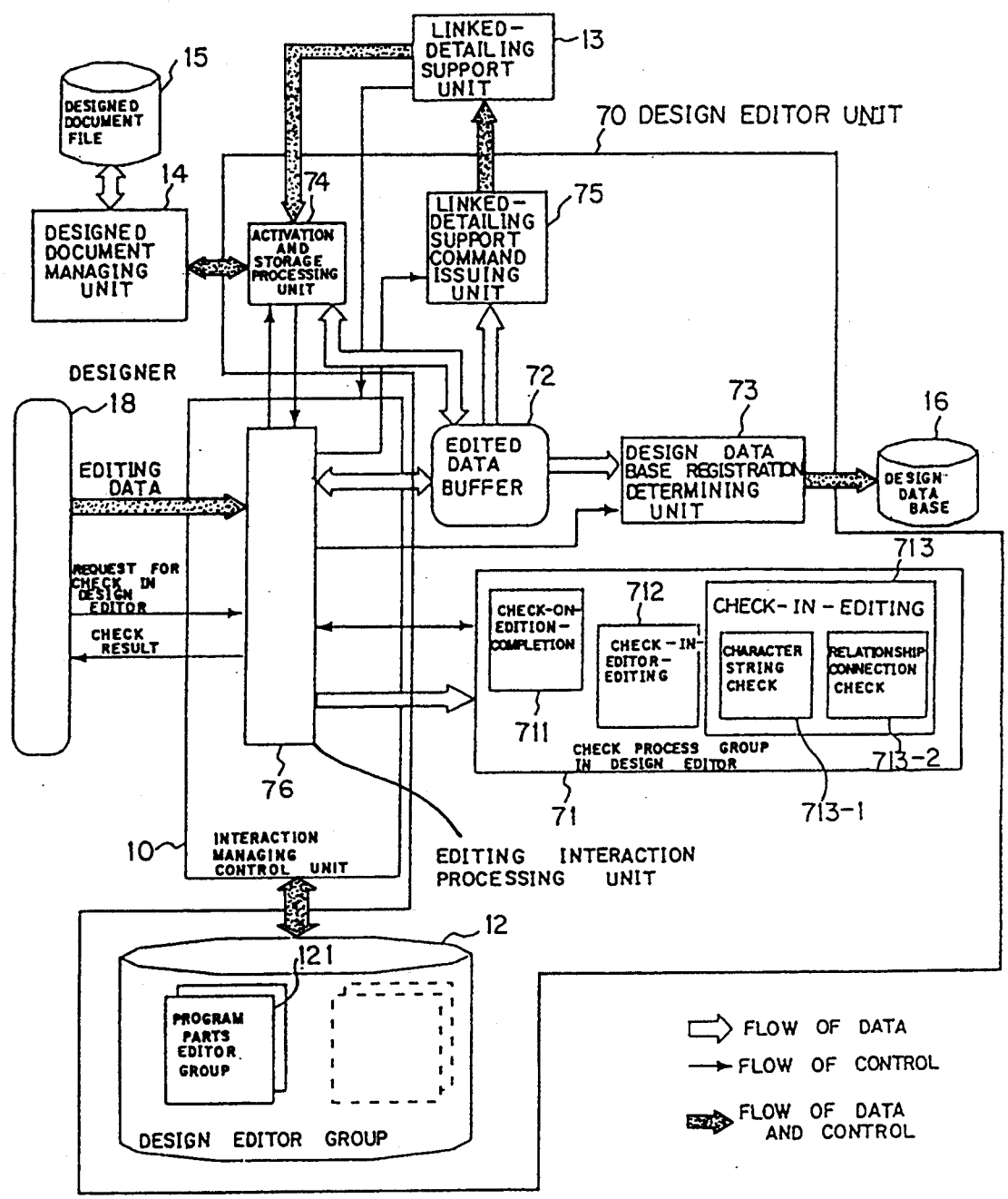
FIG. 7 is an explanatory view of the design editor unit of an embodiment.

FIG. 7 shows the system configuration of the design editor unit of an embodiment.

A design editor unit 70 is surrounded by the interaction managing control unit 10, the designed document file 15 accompanied by the designed document managing unit 14, the design data base 16, and the linked-detailing support unit 13. The interaction managing control unit 10 is located between the designer 18 and the design editor unit 70. In the interaction managing control unit 10, a editing interaction processing unit 76 is provided to control the interaction when the designer 18 performs an editing operation using the design editor unit 70.

The design editor unit 70 comprises design editor group 12, a design editor checking unit group 71, a editing buffer 72, a design data base registration determining unit 73, an activation and storage processing unit 74, and a linked-detailing support command issuing unit 75.

Design editors are assigned one to one to each piece of specification information at each abstract level. They are managed as the design editor group 12 in a computer and connected to the interaction managing control unit 10. The design editor group 12 also contains a program parts editor unit 121.

The design editor checking unit group 71 checks an error in the design contents automatically or at the request of the designer 18 during or on completion of the editing operation by the design editor, and is connected to the interaction managing control unit 10. The design editor checking unit group 71 contains a number of checking units, that is, comprises a check-on-edition-completion unit 711, a check-in-editor-editing unit 712, and a check-in-editing unit 713. The check-on-edition-completion unit 711 automatically checks the inconsistency in the relationship among the designed parts and the program parts on completion of the editing operation by the design editor. The check-in-editor-editing unit 712 checks the inconsistency in the relationships among the designed parts and the program parts at the request of the designer 18 during the editing operation by the design editor. The check-in-editing unit 713 automatically checks when the designer 18 inputs data during the editing operation by the design editor. It performs a character-string check 713-1 and a relation connection check 713-2. The character-string check 713-1 checks whether or not the character string inputted by the designer 18 is correct in type, etc. The relation connection check 713-2 checks whether or not the inconsistency is detected in the connection made by the designer 18.

The editing buffer 72 is a buffer memory for temporarily storing edited data prepared by the design editor, and is connected to the editing interaction processing unit 76 in the interaction managing control unit 10, the activation and storage processing unit 74, the linked-detailing support command issuing unit 75, and the design data base registration determining unit 73.

The activation and connection processing unit 74 accesses a designed document from the designed document file 15 to the design editor unit 70. It also prepares for storing a designed document in the designed document file 15. It is connected to the edited data buffer 72, the designed document managing unit 14, the linked-detailing support unit 13, and the editing interaction processing unit 76 in the interaction managing control unit 10.

The design data base registration determining unit 73 checks whether or not the edited data stored in the edited data buffer 72 can be registered in the design data base 16. It is connected to the editing buffer 72, the design data base 16, and the editing interaction processing unit 76 in the interaction managing control unit 10.

The linked-detailing support command issuing unit 75 issues a command to support a detailing operation of the linked-detailing support unit 13. It is connected to the edited data buffer 72, the linked-detailing support unit 13, and the editing interaction processing unit 76 in the interaction managing control unit 10.

Next, the operation of the design editor unit 70 is described below according to the process flowchart for the design editor unit shown in FIG. 8.

First, the designer 18 issues a request to activate the design editor (S80). The software design support unit activates the design editor according to the procedure shown in FIG. 6 (S81). The design editor activation process (S81) is described later. After activating the design editor, the designer 18 performs an editing operation by, for example, describing designed parts and their attributes by the activated editor (S82). During the editing operation, the design editor unit 70 determines whether or not the editing operation performed by the designer 18 is the operation to be checked during the check-in-editing (S83). If yes, the operation is checked by the check-in-editing 713 (S84). The check-in-editing is described later. If the check (S84) is completed or the check-in-editing is not required (if determination indicates "No"), the edited data are sequentially stored in the edited data buffer 72 temporarily (S85).

Next, the design editor unit 70 determines whether or not the program parts are detailed in the designed parts described in the design editor (S86). If yes, the operation of the program parts editor 121 is started (S93). The operation of the program parts editor 121 is described later. If no, the editing operation is continued.

When the designer 18 requests for a check during the editing operation (S88), the checking operation is performed by the check-in-editor-editing 712 is performed (S88). The check-in-editor-editing 712 (S88) is described later.

When the designer 18 terminates the operation of the design editor (design editor termination request S89), determination is made as to whether or not the editing operation is completed (S90). If yes, a check is made by the check-on-edition-completion unit 711 (S91). After the check or if the editing operation is not completed ("No" in S90), the activation and storage processing unit 74 instructs the designed document managing unit 14 to store the designed document. The designed document generated during the above described editing operation is stored in the designed document file 15 (S92), and thus the process is terminated.

Figure 8:
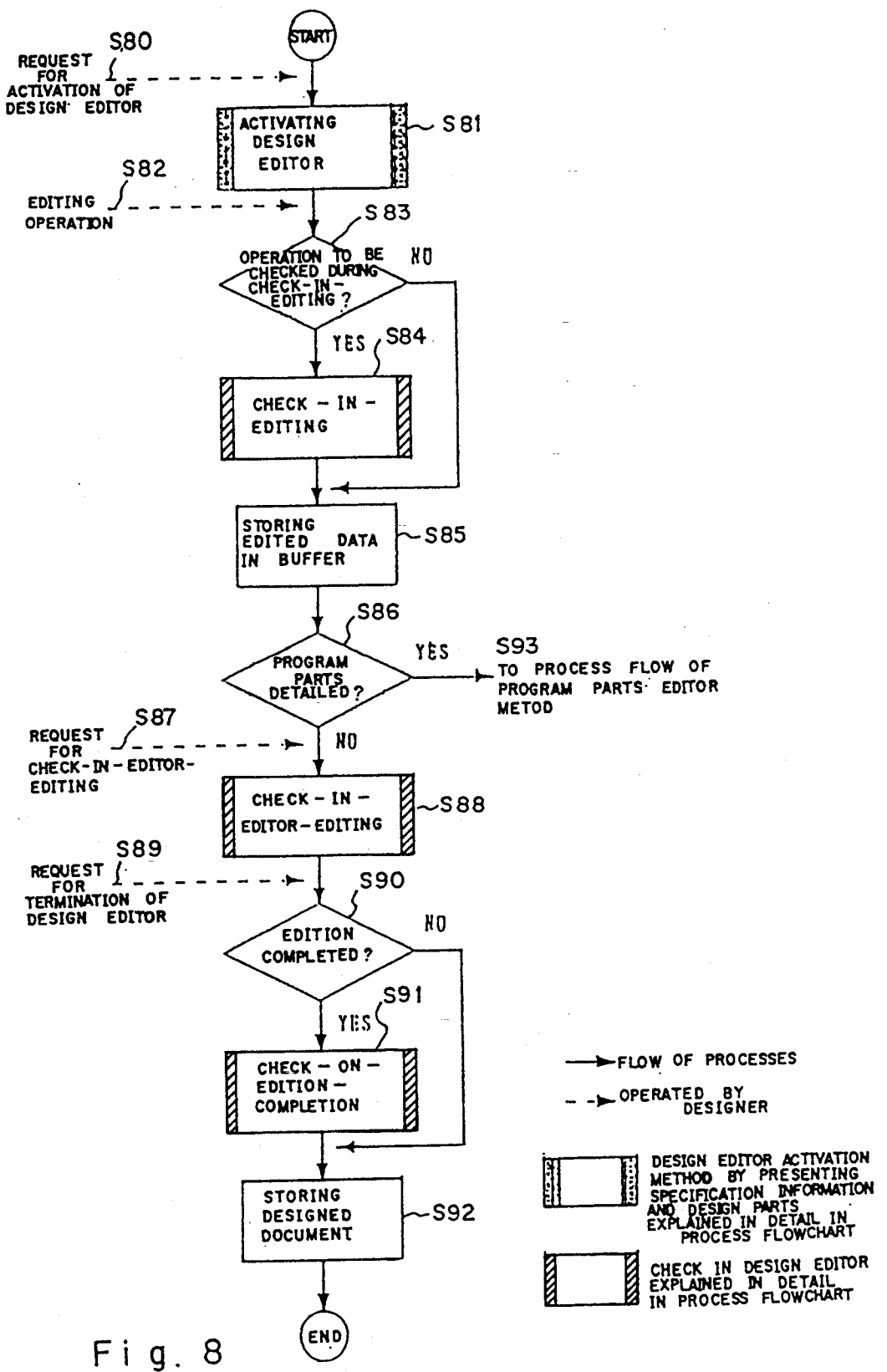
FIG. 8 is an operational flowchart of the design editor unit of an embodiment.

The design editor activating process (S81), the checking process (S84, S88, and S91), the process by the program parts editor (S93), and the designed document storage process (S92) described in the flowchart for explaining the operation of the design editor unit in FIG. 8 are described below in detail.

Figure 9:
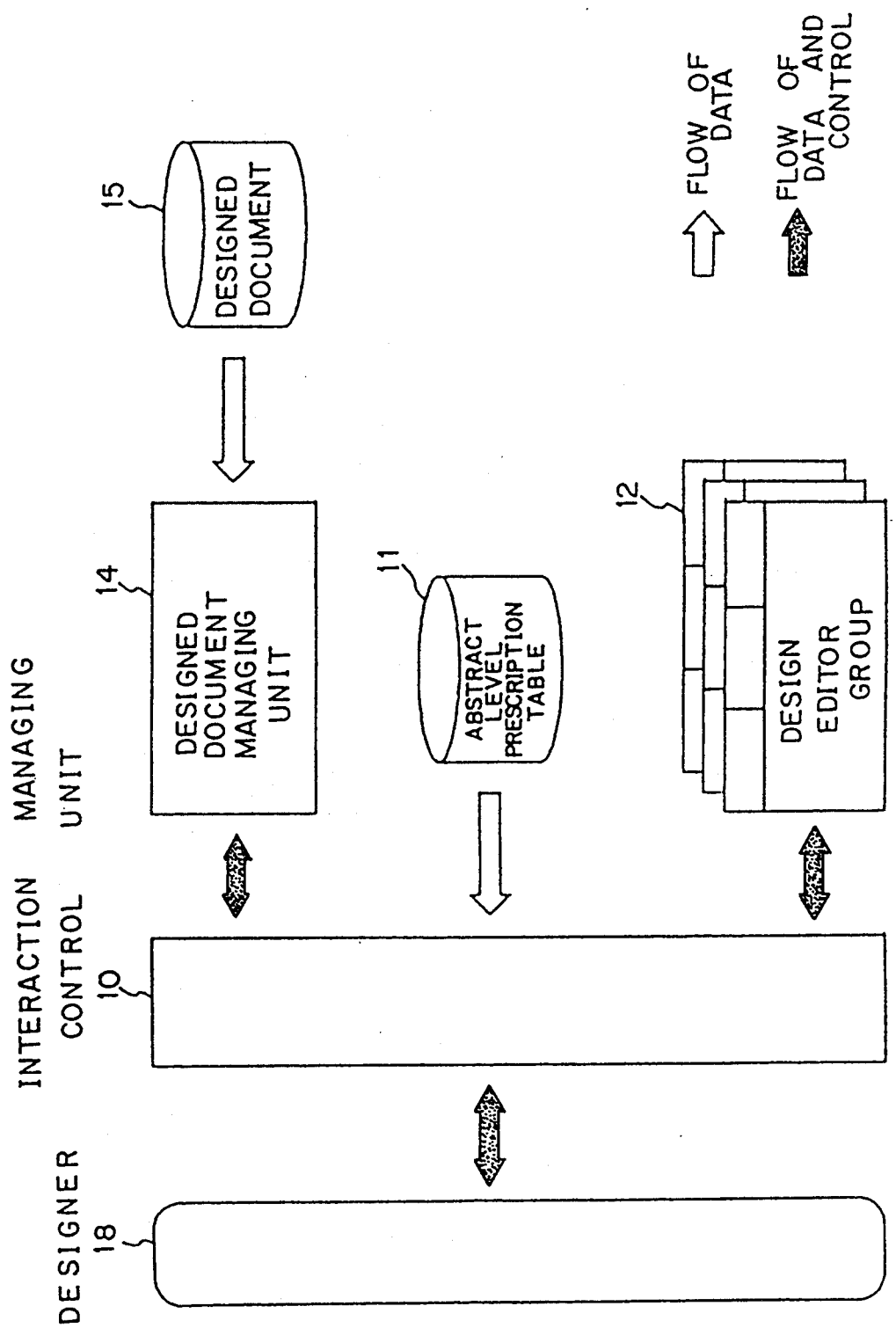
FIG. 9 shows the configuration of the design editor activating method.

FIG. 9 shows the configuration for activating a design editor.

The activation of the design editor involves the abstract level prescription table 11 for extracting the information for guidance, the design editor group 12 containing the design editor activated by the selection by the designer 18, the designed document file 15 and the designed document managing unit 14 for managing the file, the interaction managing control unit 10 for controlling the interaction with the designer 18. The method of activating the design editor includes a method of activating the design editor by presenting the specification information as described by referring to FIG. 6, and a method of activating it by presenting the designed parts.

Figure 10:
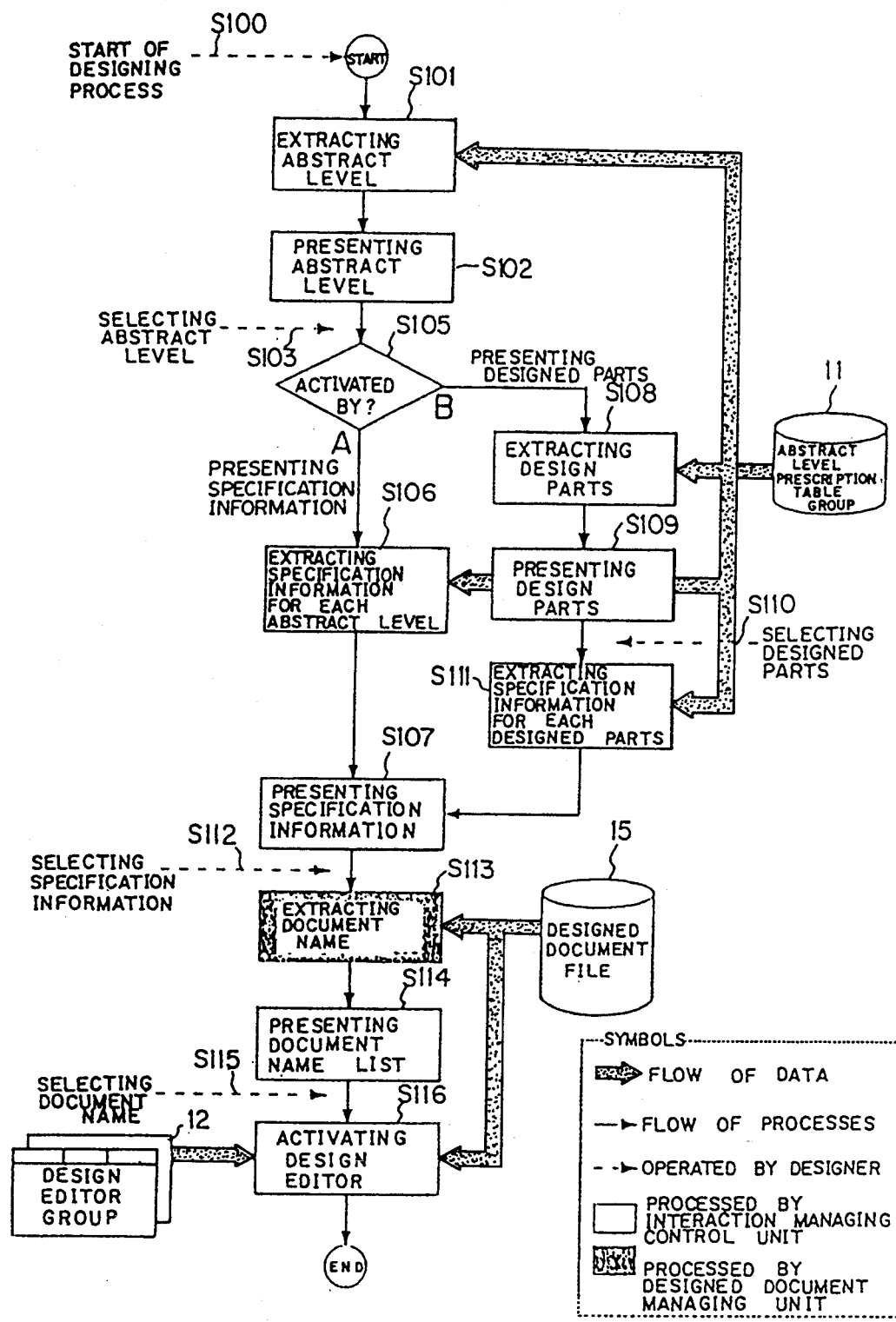
FIG. 10 is an operational flowchart for explaining the activation of the design editor.

FIG. 10 is a flowchart for explaining the operation of the design editor.

When the designer 18 inputs a design start request to the design editor unit 70 through the interaction managing control unit 10 (S100), the interaction managing control unit 10 extracts the abstract level prescribed in the abstract level prescription table group 11 (S101), and presents the designer 18 with an abstract level (S102). Then, the abstract level selection menu 60 shown in FIG. 6 is displayed on the display unit. The designer 18 selects and inputs a desired abstract level in this menu (S103). The interaction managing control unit 10 then displays the screen for selecting the activation method (the design editor activation method selection screen 61). The design editor activating method includes the method in which the specification information is presented, and a method in which the designed parts are presented. The designer 18 selects from the screen one of these activating methods (S104).

The interaction managing control unit 10 determines the activation method selected by the designer 18 (S105). If the method of activating the editor by presenting the specification information is selected (A), the interaction managing control unit 10 extracts from the abstract level prescription table group 11 the specification information corresponding to the abstract level selected in S103 (S106), and presents the designer 18 with the information (S107). Then, a list of abstract level specification information 62 shown in FIG. 6 is displayed.

When the designer 18 selects the method of activating the editor by presenting the designed parts (B in S105), the interaction managing control unit 10 extracts from the abstract level prescription table group 11 the designed parts corresponding to the abstract level selected in S103 (S108), and presents the designer with the information (S109). Then, the designed parts list 65 shown in FIG. 6 is displayed on the display unit. The designer 18 selects the desired designed parts from the list (S110). At the selection result, the interaction managing control unit 10 extracts from the abstract level prescription table group 11 the specification information corresponding to the designed parts (S111), and presents the designer with the information (S107). Then, the specification information list corresponding to the designed parts selected by the designer 18 is displayed on the display unit (refer to the abstract level specification information list 62 shown in FIG. 6).

From the specification information list 62, the designer 18 selects and inputs the specification information to be designed (S112). In response to the input, the interaction managing control unit 10 instructs the designed document control unit 14 to extract the designed document corresponding to the specification information. At this time, the interaction managing control unit 10 notifies the designed document control unit 14 of the type of the specification information selected by the designer 18, or of the type of the designed parts names and the specification information. The designed document control unit 14 extracts the corresponding designed document name (S113), and notifies the interaction managing control unit 10 of the extracted document name. The interaction managing control unit 10 presents the designer 18 with the notified document name (S114). Then, the document name list 63 shown in FIG. 6 is displayed on the display unit. The designer 18 selects and inputs the name of the desired designed document from the document name list 63 (S115). In response to the input, the interaction managing control unit 10 activates the design editor corresponding to the specification information, and accesses from the designed document file 15 the specified designed document to be processed by the design editor (S116). The design editor is activated by the above described process, and the document editing screen 64 shown in FIG. 6 is displayed on the display unit. Then, the designer 18 performs the designing operation through the editing screen.

Figure 11:
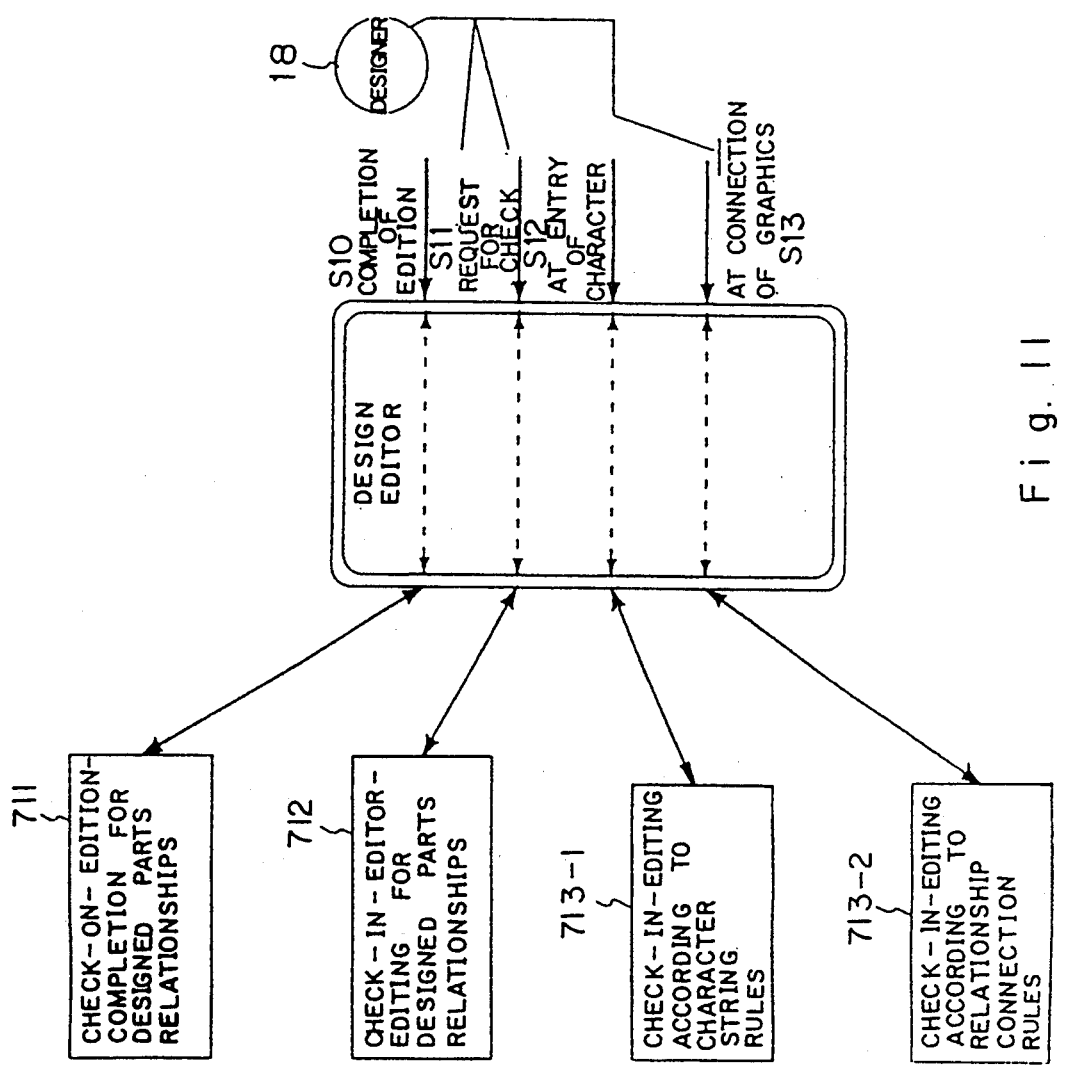
FIG. 11 is a view for explaining how to check in a design editor.

Next, the method of checking the designed document generated by the editing operation is described below. FIG. 11 shows the check-in-design-editor method.

As described above, the design editor unit of the present invention has the designed document checking method comprising a check-on-edition-completion 711 for checking designed parts relationships, a check-in-editor-editing 712 for checking designed parts relationships, and a check-in-editing 713. The check-in-editing 713 comprises a check-in-editing according to the character string restrictions 713-1 and a check-in-editing according to the relationship connection rules 713-2.

The check-on-edition-completion 711 for checking designed parts is activated by the input (S10) of a edition termination request issued by the designer 18 to terminate the editing operation. It determines whether or not the inconsistency exists in the relationship among the parts in the design editor. If yes, it instructs the designer 18 to correct errors.

The check-in-editor-editing 712 for checking designed parts relationships is activated by a check request issued by the designer 18 during the editing operation (S11). This can be performed as in the check-on-edition-completion 711 for checking designed parts relationships, checks for the inconsistency in the relationships among the parts in the design editor. If the inconsistency is detected, it instructs the designer 18 to correct errors.

The check-in-editing according to the character string rules 713-1 is activated when the designer 18 inputs (S12) a character string during the operation through the design editor. The types of character strings to be inputted at each position are defined as restrictions in the design editor. The character string inputted by the designer 18 is checked as to whether or not the inputted character string meets the restrictions. If it does not meet the restrictions, the designer 18 is instructed to correct an error.

The check-in-editing according to the relationship connection rules 713-2 is automatically activated during the editing operation of the designer 18. That is, it can be activated when the designer 18 connects graphics (S13) during the design-editor-editing operation. The graphics to be connected are checked as to whether or not they meet predetermined connection restrictions. If no, the designer 18 is instructed to correct errors.

Figure 12:
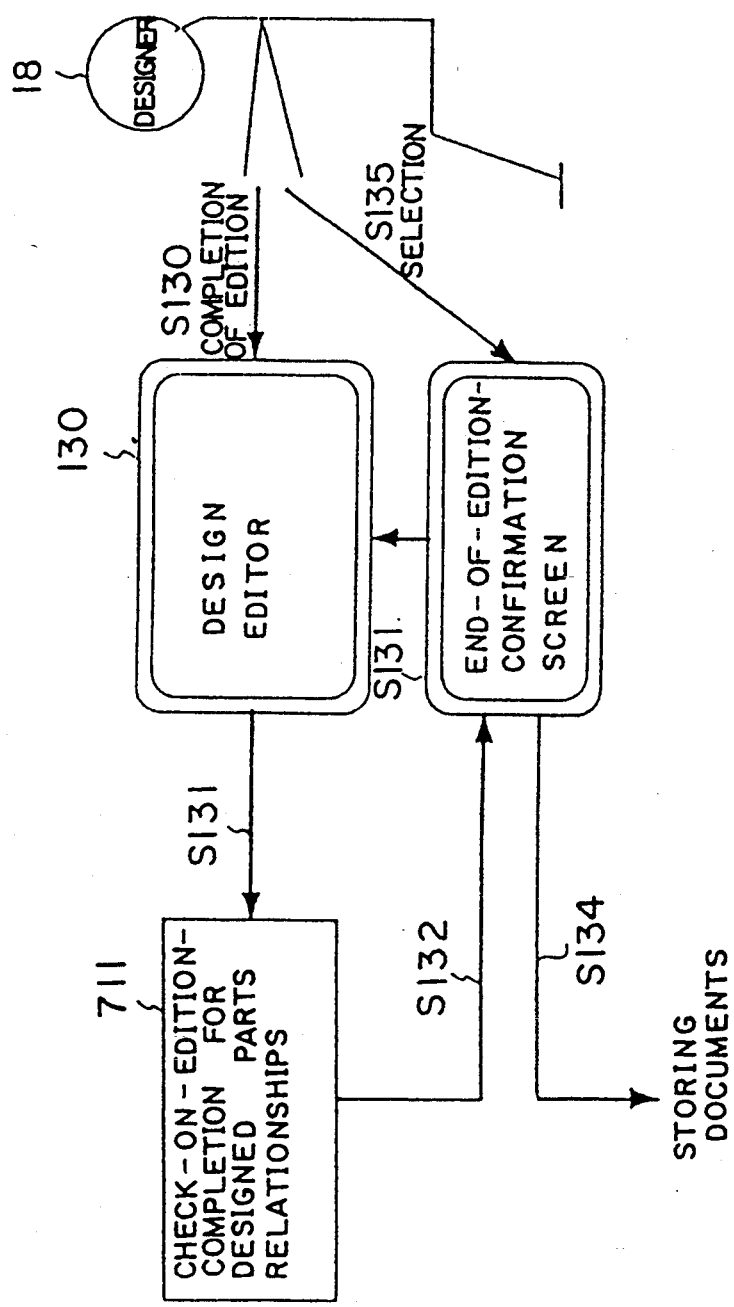
FIG. 12 is a view for explaining how to check designed parts relationships on completion of an editing process.

FIG. 12 shows the method of check-on-edition-completion for checking designed parts relationships. The arrows indicate the direction of control.

When the designer 18 finishes editing a designed document through the design editor screen 130 (S130), the design editor 130 activates the check-on-edition-completion unit 711 for checking designed parts relationships (S131). The check-on-edition-completion 711 for checking designed parts relationships checks the relationships among the designed parts in the designed documents, checks whether or not the inconsistency in attributes, etc. exists, and outputs the check result to the end-of-edition confirmation screen 131 (S132). The designer 18 can confirm the consistency through the end-of-edition confirmation screen 131. If all data are consistent, a screen is outputted to store the designed document in the design editor screen 130 (S133), and the designed document is stored there (S134). If items to be corrected are detected by the check, the designer 18 checks the end-of-edition confirmation screen 131 to confirm the existence of the items to be corrected, and resumes the editing operation to select correcting errors or storing the designed document as is (S135).

Figure 13:
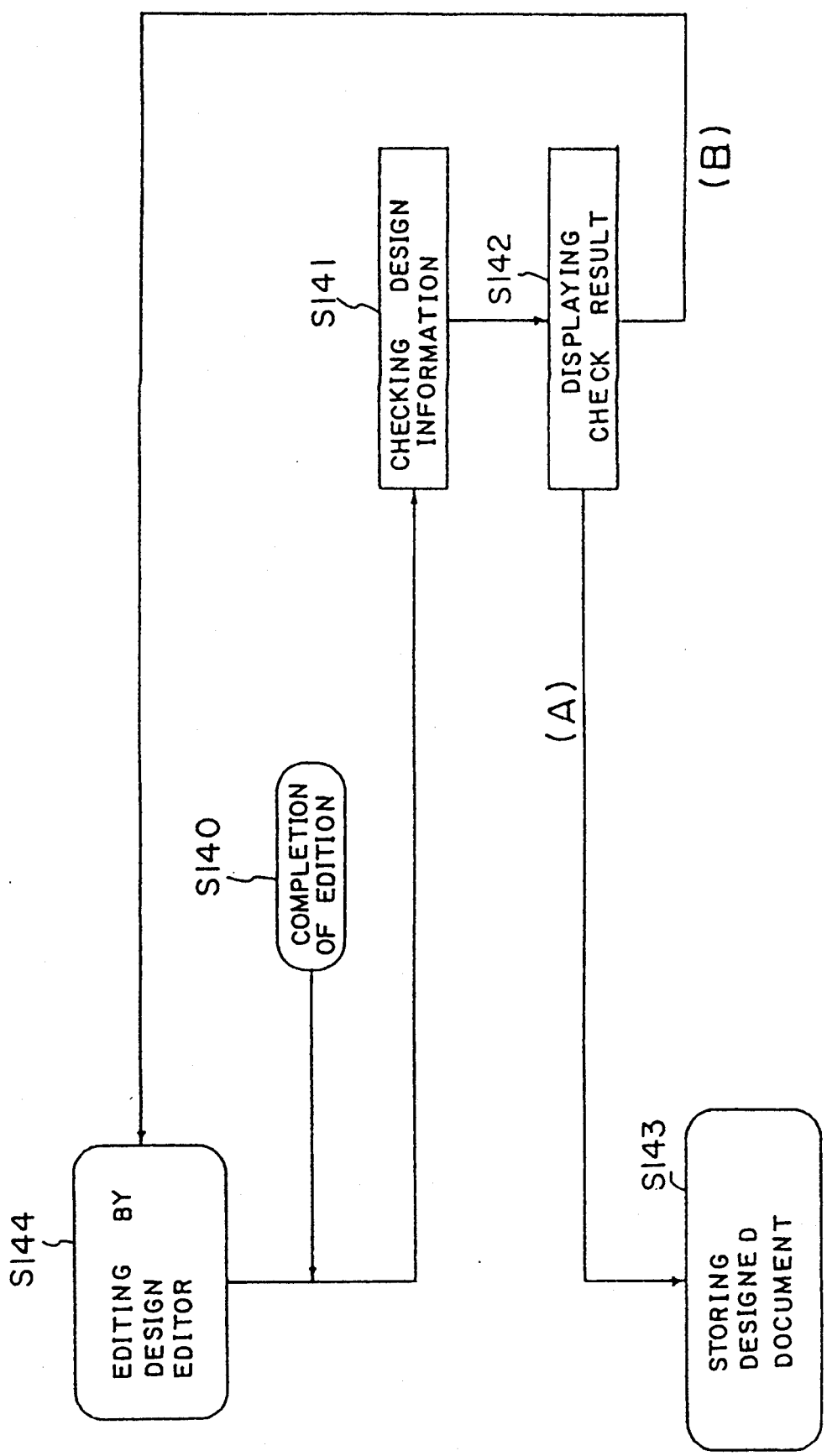
FIG. 13 is a flowchart for explaining how to check designed parts relationships on completion of an editing process.

FIG. 13 is a flowchart for explaining the operation of the check-on-edition-completion for checking designed parts relationships shown in FIG. 12.

When the designer issues an end-of-edition notification (S140) during the design-editor-editing operation (S144), the design information check unit is activated (S141), the design information in the design editor is obtained to confirm the duplicate definitions, the relationships among the designed parts, and the attributes of the designed parts. Then, the check result is displayed on the screen (S142), and the confirmation of the designer 18 is prompted. If the designer 18 selects "completion" (A), control is transferred to the designed document storage unit to store the designed document in the designed document file 15 (S143). If the designer 18 selects "re-edition", control is returned to the design-editor-editing operation (S144).

Figure 14:
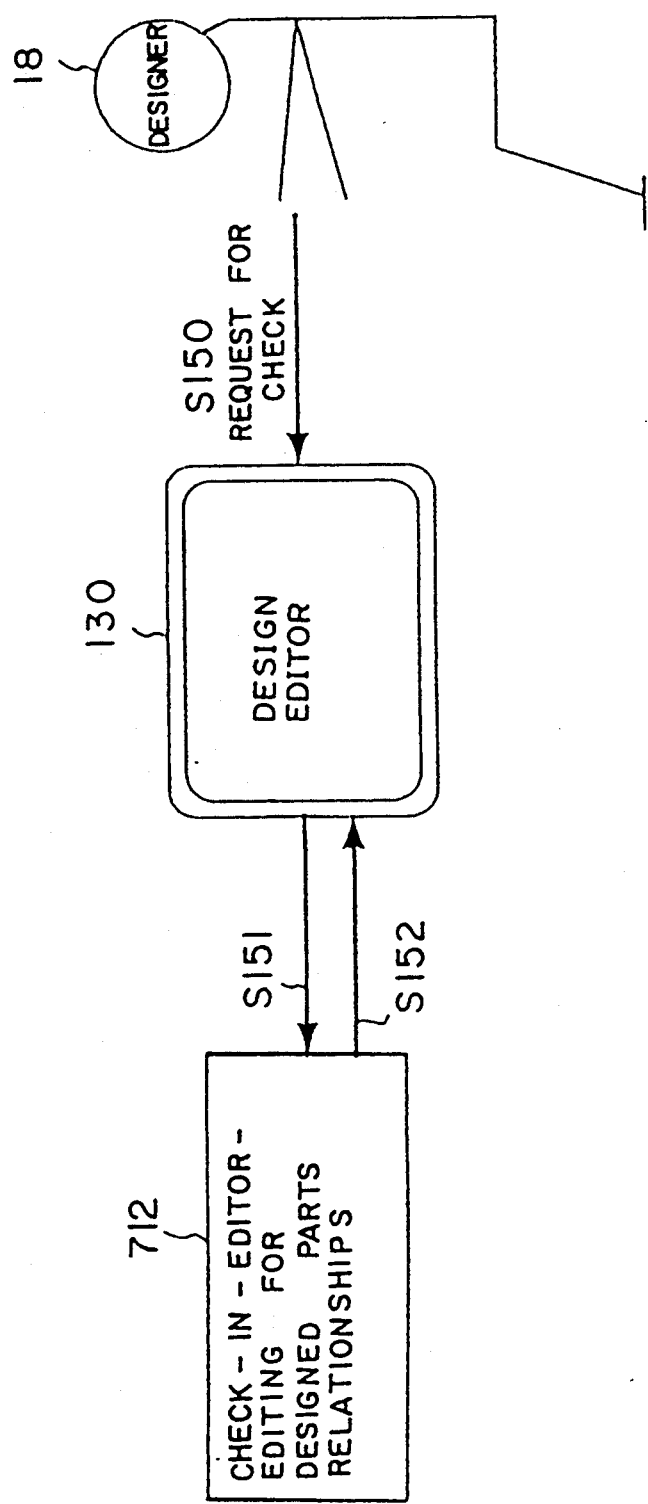
FIG. 14 is a view for explaining how to check designed parts relationships during the editing process.

FIG. 14 is a view for explaining the check-in-editor-editing operation for checking designed parts relationships. The arrows indicate the direction of control.

Assume that the designer 18 issues a request for a check during the designing operation through the design editor 130 (S150). In response to the request, the design editor 130 activates the check-in-editor-editing unit 712 for checking designed parts relationships (S151). The check-in-editor-editing unit 712 for checking designed parts relationships checks the relationships among the designed parts in the designed document, checks whether or not inconsistency is detected in attributes, etc., outputs the check result to the end-of-edition confirmation screen 131 of the design editor 130 (S152), and prompts the designer 18 for his confirmation. Control is returned to the design editor when the designer 18 inputs his confirmation.

Figure 15:
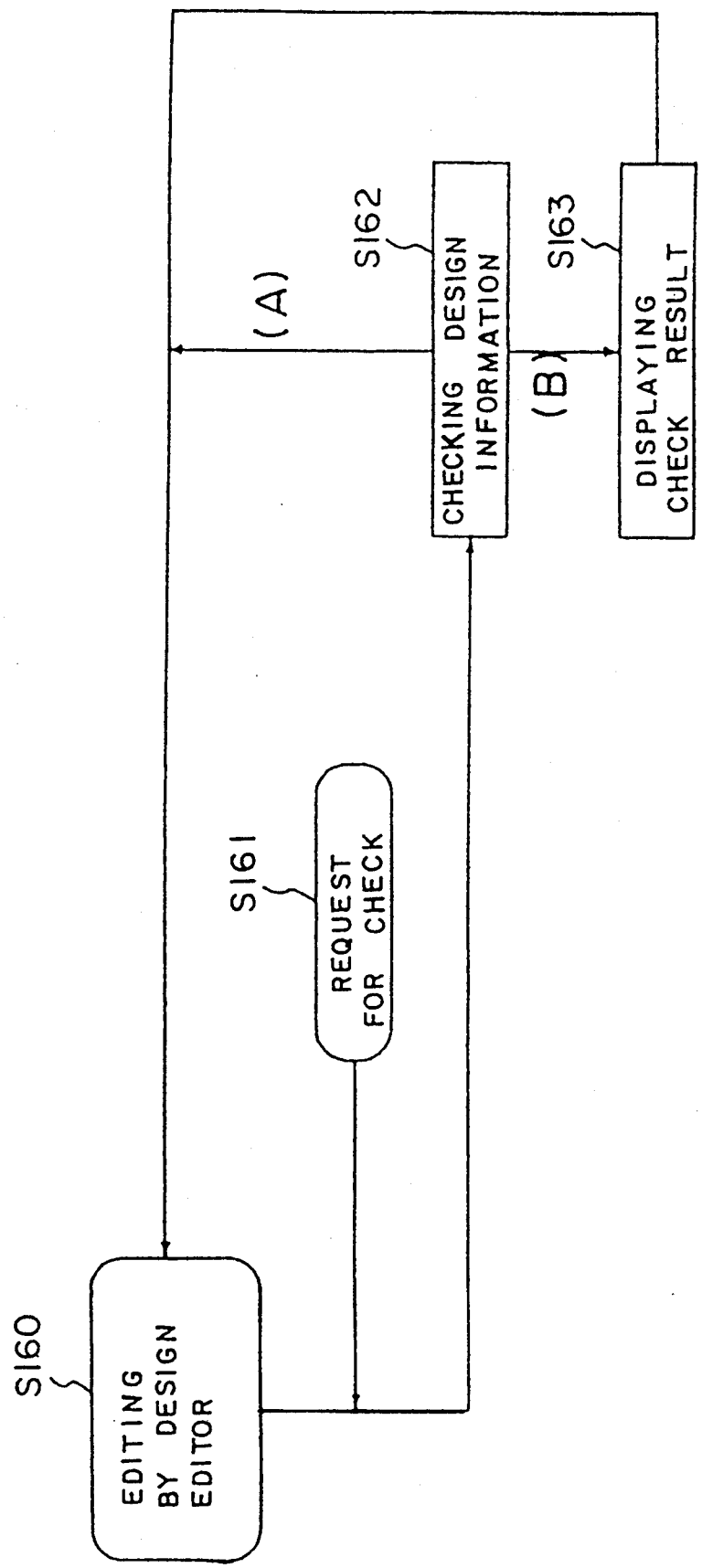
FIG. 15, is a flowchart for explaining how to check designed parts relationships during the editing process.

FIG. 15 is a flowchart for explaining the operation of the check-in-editor-editing operation for checking designed parts relationships shown in FIG. 14.

When the designer 18 issues a request for a check (S161) during the design editor editing operation (S160), the design information check unit (S162) is activated, the design information in the design editor is obtained to confirm the duplicate definitions, the relationships among the designed parts, and the attributes of the designed parts. If the check result indicates consistency (A), control is returned to the editing operation through the design editor (S160). If the check result indicates inconsistency (B), the check result is indicated (S163), and the designer 18 is instructed to correct errors and returns to the editing operation through the design editor (S160).

Figure 16:
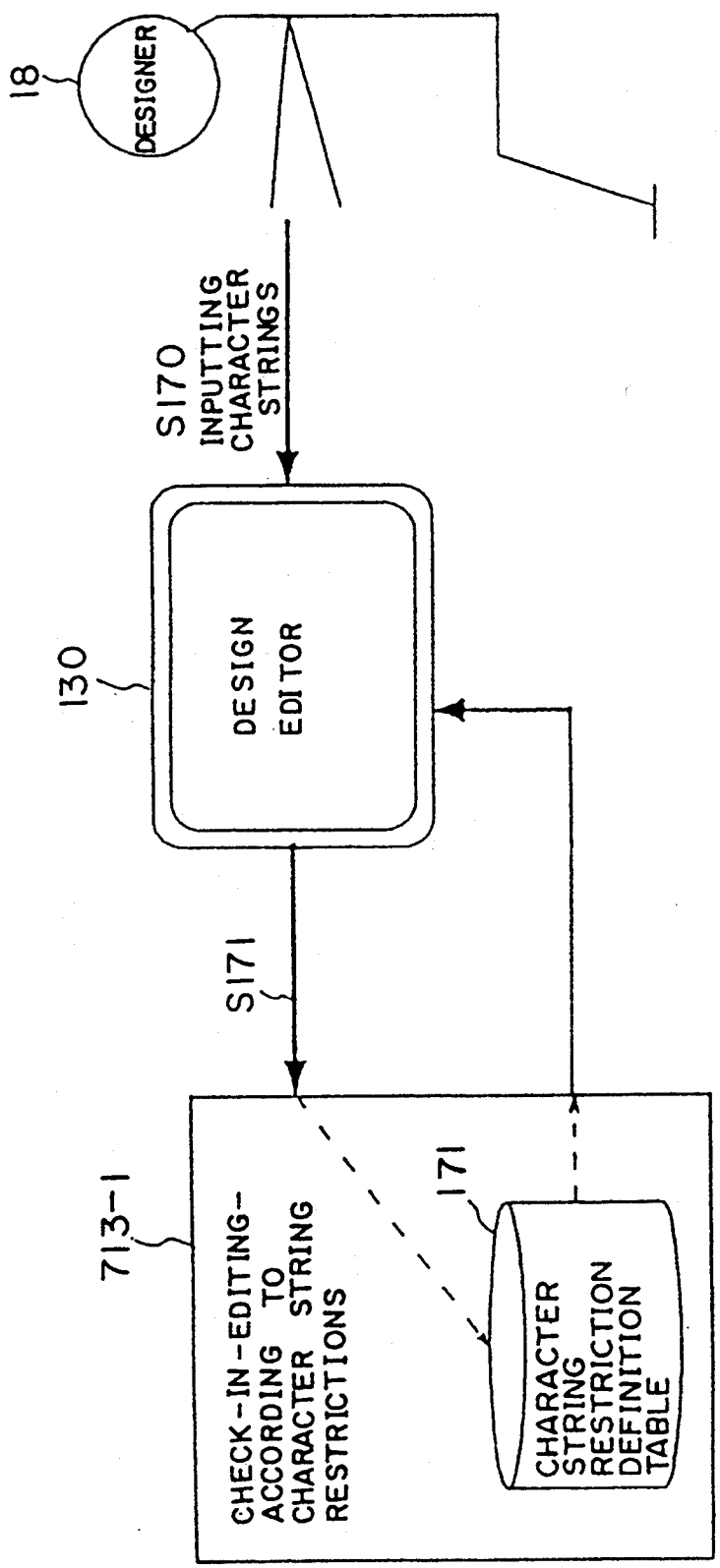
FIG. 16 is a view for explaining how to check an editing operation according to the character string restrictions.

FIG. 16 is a view for explaining the check-in-editing according to the character string restrictions. The arrows indicate the direction of control.

If the designer 18 inputs a character string during the edition of the designed document through the design editor (S170), the design editor 130 activates the check-in-editing unit according to the character string restrictions 713-1 (S171). The check-in-editing unit according to the character string restrictions 713-1 retrieves the character string restrictions (character string restriction definition table 171) corresponding to the designed parts stored in a predetermined table, and checks whether or not the inputted character string (S170) meets the character string restrictions. If no, the indicator area of the design editor is notified of the invalid character string (S172). Upon the notification indicated in the indicator area of the design editor 130, the designer 18 knows that the nputted character string contains an error.

Figure 17:
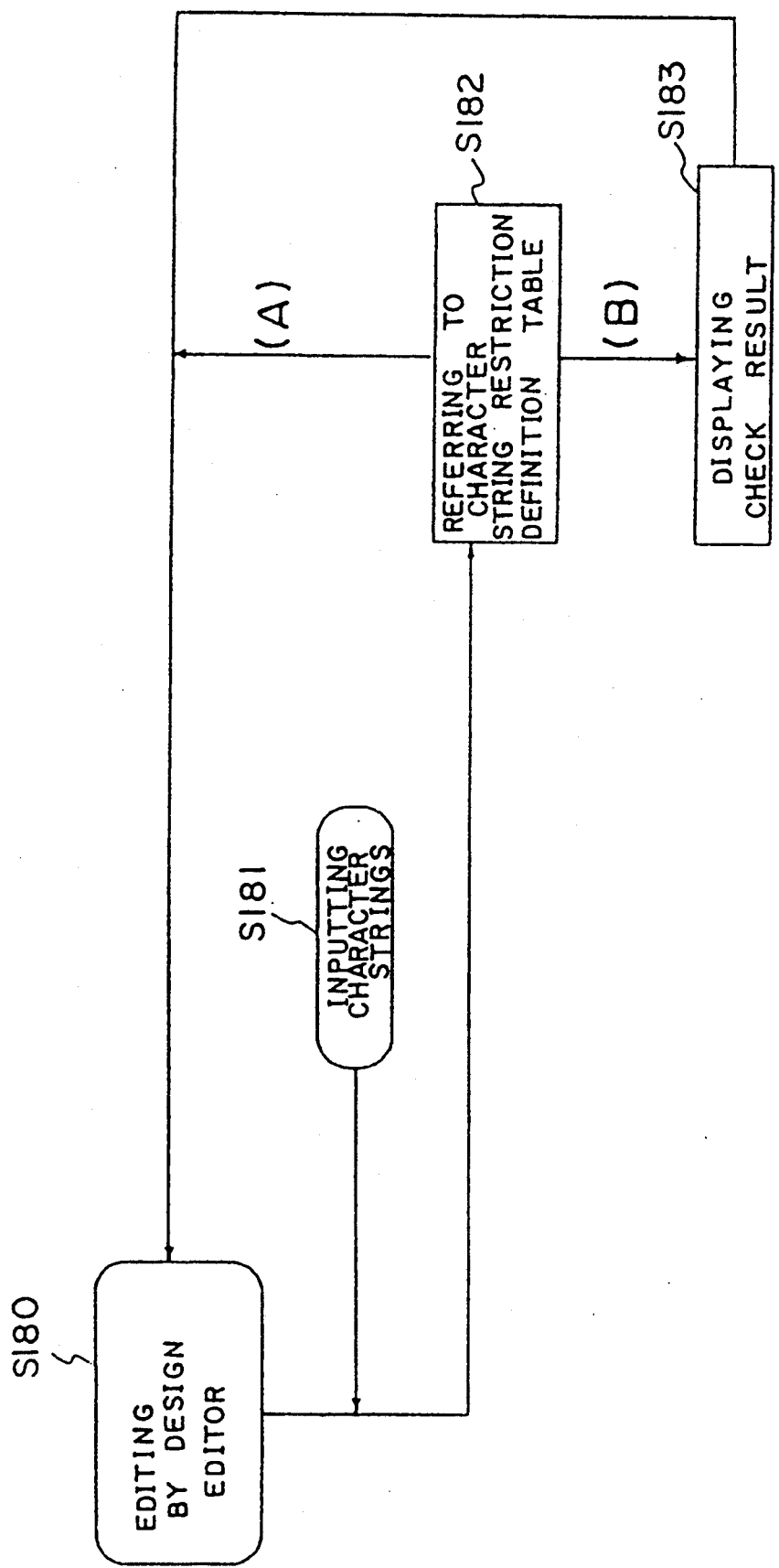
FIG. 17 is an operational flowchart for explaining how to check an editing operation according to the character string restrictions.

FIG. 17 is a flowchart for explaining the operation of the check-in-editing according to the character string restrictions shown in FIG. 16.

When the designer 18 inputs characters indicating an attribute name, etc. of designed parts (S181) during the design-editor-editing operation (S180), the check-in-editing unit according to the character string restrictions 713-1 is activated, the inputted character string is compared with the character string restriction definition table 171, and determination is made as to whether or not the character string corresponds to the attribute of the designed parts (S182). If the determination indicates consistency (A), control is returned to the editing operation through the design editor (S180). If the determination indicates inconsistency (B), control is transferred to the check result indicator, and the check result is indicated on the designed parts of the design editor (S183), and control is returned to the editing operation through the design editor (S180).

Figure 18:
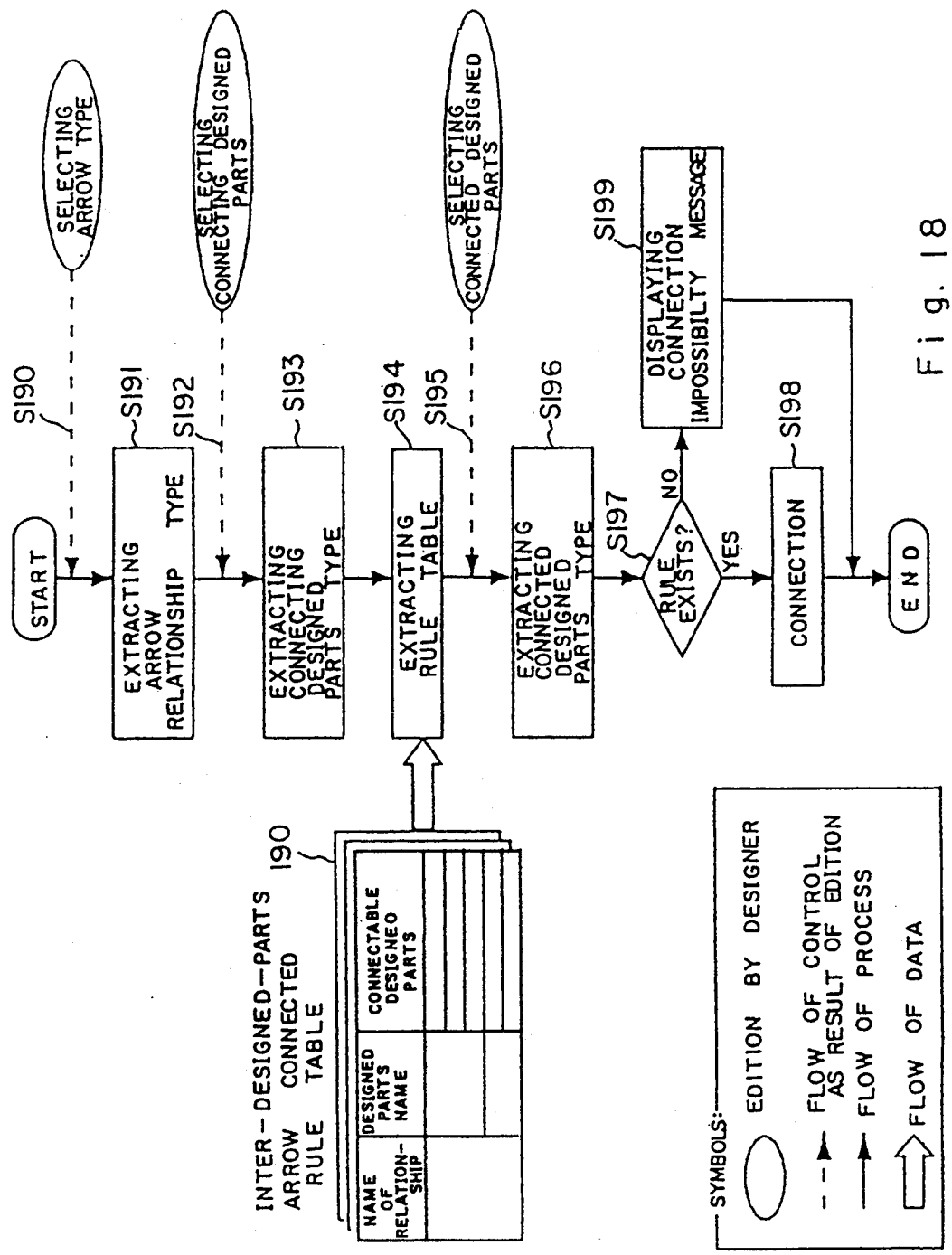
FIG. 18 is an operational flowchart for explaining how to check an editing operation according to the restrictions on the relationship connections.

FIG. 18 is a flowchart for explaining the operation of the check-in-editing according to the relationship connection rules 713-2.

The check-in-editing unit according to the relationship connection restrictions 713-2 shown in FIG. 11 comprises an inter-design-parts arrow-connected rule table 190 shown in FIG. 18. The inter-design-parts arrow-connected rule table 190 is defined as a table containing three items: relation names (indicated by arrows) described in the design editor, designed parts names of the connecting parts, and connectable designed parts.

When the designer 18 selects the type of an arrow (S190) to describe the specific relationship, the arrow relation type extracting process is performed to determine the correspondence of the arrow in the inter-design-parts arrow-connected rule table 190 (S191). Next, the designer 18 specifies the designed parts entity of the connecting parts according to the selected relation (S192). The check-in-editing unit according to the relationship connection rules 713-2 extracts from the inter-design-parts arrow-connected rule table 190 the specified designed parts of the connected parts (S193). Then, the relation type and the designed parts of the connected parts are determined. As a result, the designed parts connectable to the designed parts of the connecting parts with the arrow of the specified relation type can be extracted from the rule table 190 (S194).

Next, when the designer 18 selects connected designed parts (S195), the connected designed parts type extracting process (S196) is activated, and the name of the designed parts entity of the connected parts is identified. As a result, the names of the designed parts are determined as to whether or not they exist in the connectable designed parts extracted in S194 (S197). If yes, the parts can be connected, the connecting operation is performed (S198), and the process is terminated. If no, the parts cannot be connected, the connection impossibility message display process is performed (S199) to notify the designer 18, and the process is terminated.

Figure 19:
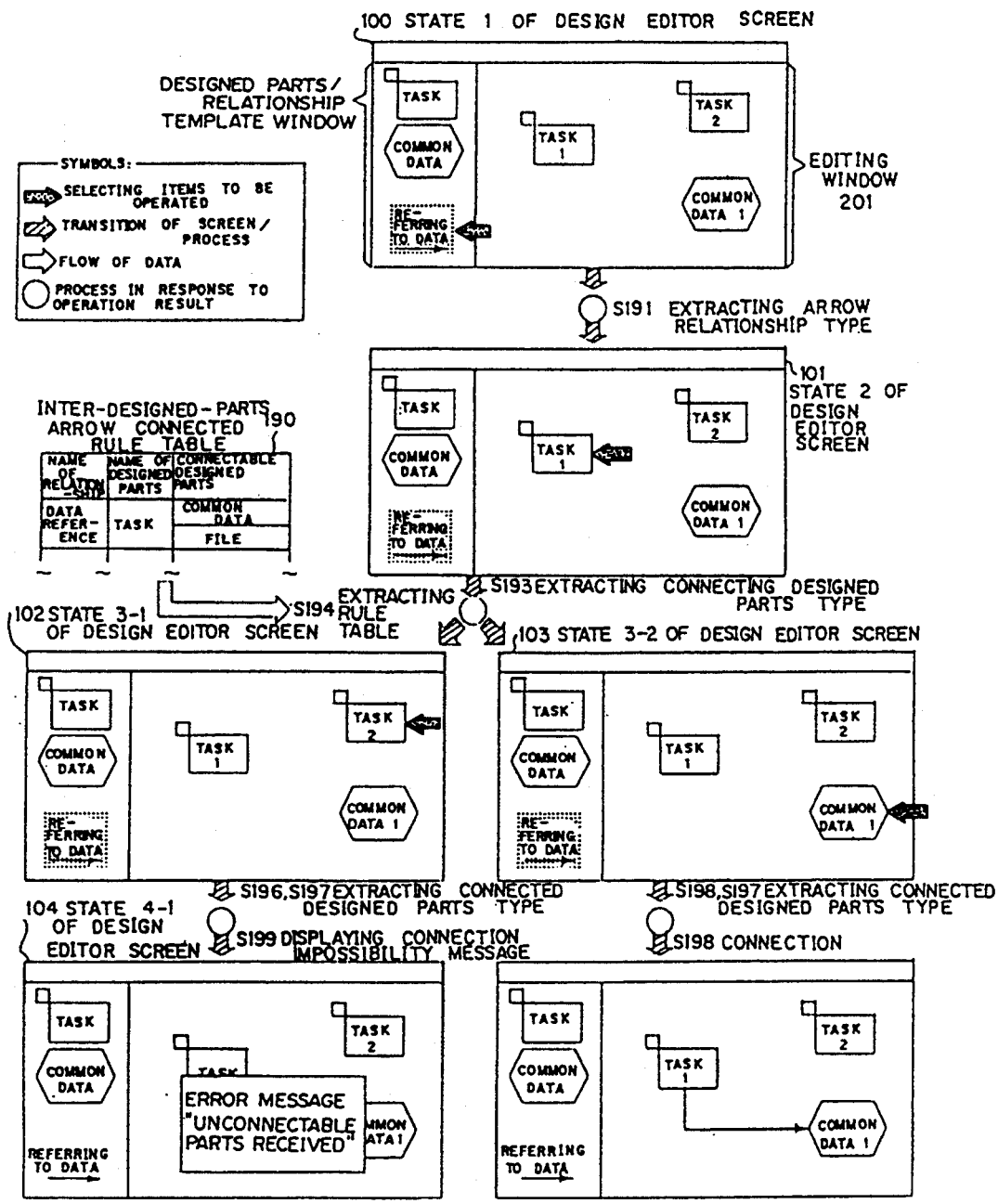
FIG. 19 is a view for explaining an embodiment of checking an editing operation according to the restrictions on the relationship connections.

FIG. 19 shows an embodiment for explaining the check-in-editing unit according to the relationship connection restrictions. The flow of a checking process is indicated by the transition of states on the design editor screen. The design editor screen is divided into a small left window and a large right window, and the left window is a designed parts/relationship template window 200 for displaying the menu of the designed parts and the relationships, and the right window is an editing window 201 in which performing an actual design operation is performed. The designer 18 selects necessary designed parts and the relationships from the template of the left window and puts them in the editing window, thereby carrying out the editing operation.

In the design editor screen 100 of state 1 in FIG. 19, the designer 18 defines on the editing window "task 1" and "task 2" as a task entity, and "common data 1" as common data entity. To define the relationship of "data reference" for these entities, the corresponding relationship types are selected from the designed parts/relationship template window 200. Then, the relationship types are selected. In this case, the check-in-editing unit according to the relationship connection restrictions 713-2 refers to the inter-design-parts arrow-connected rule table, and extracts the arrow relationship type of "data reference" (S191).

Next, state 2 of the design editor screen 101 is displayed. The designer 18 selects the designed parts of the connecting parts. In this case, an entity "task 1" is selected as the designed parts of the connecting parts. The check-in-editing unit according to the relationship connection restrictions 713-2 refers to the inter-design-parts arrow-connected rule table, and extracts the connecting designed parts type of "task" (S193).

If the types of the relationship and the connecting designed parts are determined, the rule table extracting process (S194) is performed, the type of the designed parts connectable to the designed parts entity of the connecting parts of "task 1" with the relationship arrow of "data reference" is identified only to be "common data" and "file".

Next, the designer 18 selects the designed parts of the connected parts. Two examples are shown in FIG. 19. In state 3-1 of the design editor screen 102 in the left column, the designer 18 selects "task 2". In state 3-2 of the design editor screen 103 in the right column, the designer 18 selects "common data 1".

Relating to these selections, the check-in-editing unit according to the relationship connection restrictions 713-2 compares the selected designed parts with the connectable designed parts extracted in S194, and determines whether or not the selected designed parts are connectable (S196, S197). In the case of state 3-1 in the left column of the design editor screen 102, no tasks exist in the connectable designed parts. Therefore, it is determined that the connection is impossible in S196 and S197, and the message indicating "not connectable" is notified to the designer 18 (S199). The message "not connectable" is shown as state 4-1 in the design editor screen 104. In state 3-2 in the right column of the design editor screen 103, common data exist in the designed parts which can be designed. Therefore, it is determined that the connection is possible in S196 and S197, and the connection process is performed (S198). That is, an arrow is displayed in the direction from "task 1" to "common data 1", thereby connecting "task 1" with "common data 1".

As described above, various check processes can be performed in the design editor.

Next, the program parts editor process (S93) in detailing the program parts explained by referring to the flowchart for explaining the operation of the design editor unit shown in FIG. 8 is described below.

Figure 20:
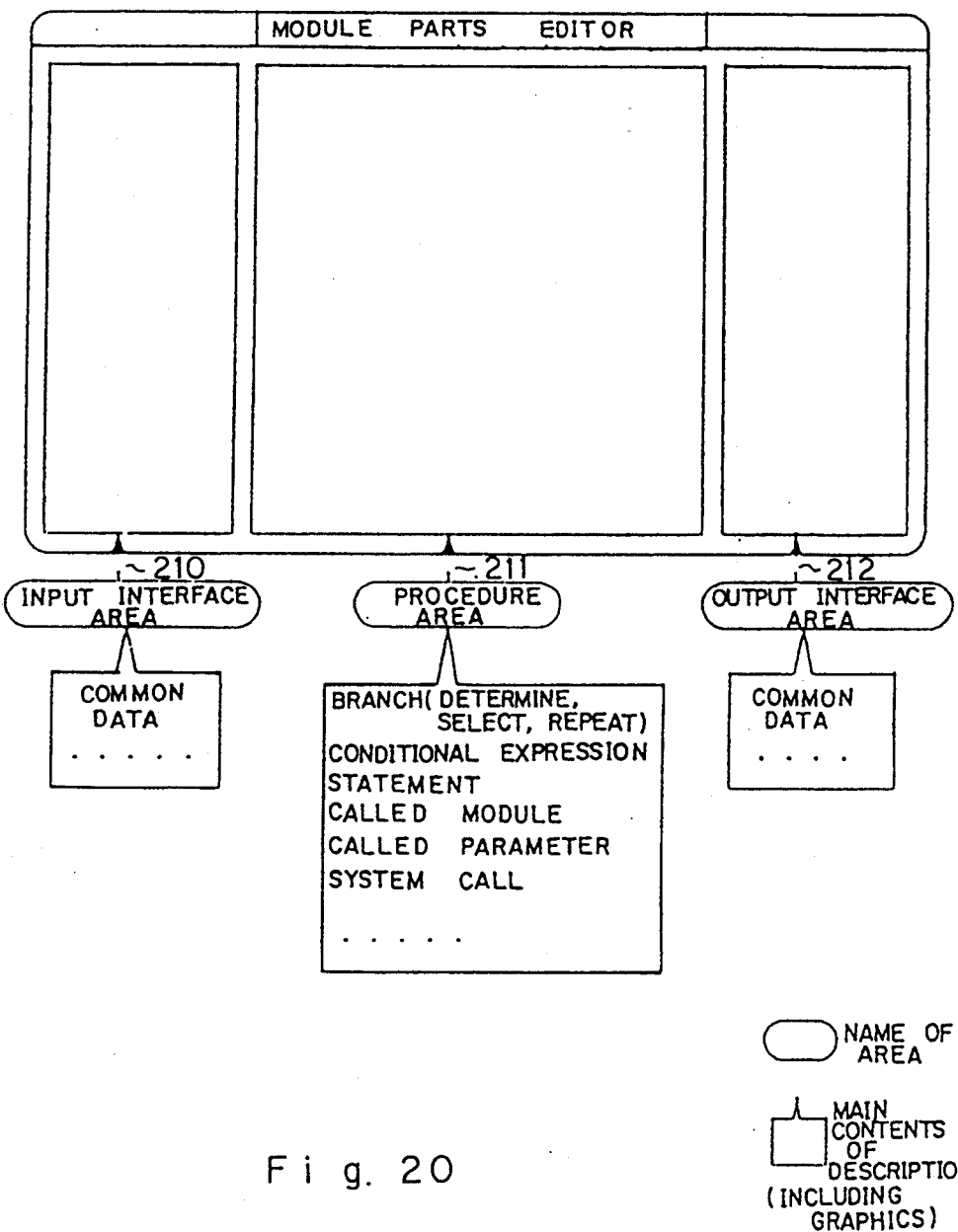
FIG. 20 is a view for explaining the configuration of the module parts editor.

FIG. 20 shows the screen configuration of the module parts editor.

When program parts are processed, it is often requested that the flow of processes should be written separate from the input interface, the procedure, and the output interface. Therefore, in the module parts editor of this embodiment, the screen area is divided into three sections: an input interface area 210, a procedure area 211, an output interface area 212.

Data and parameters received by the program module, for example, common data are written to the input interface area 210. The internal processes in response to the common data and parameters written to the input interface area, for example, branches and conditional expressions in the module parts such as determination, selection, repetition, etc., and program statements, calling modules and their parameters, and calling system calls, etc. are written to the procedure area 211. The data names written by the program modules, for example, common data are written to the output interface 212. Additionally, in the procedure area 211, the detailing operation can be performed by the structural chart representation as a procedure.

Figure 21:
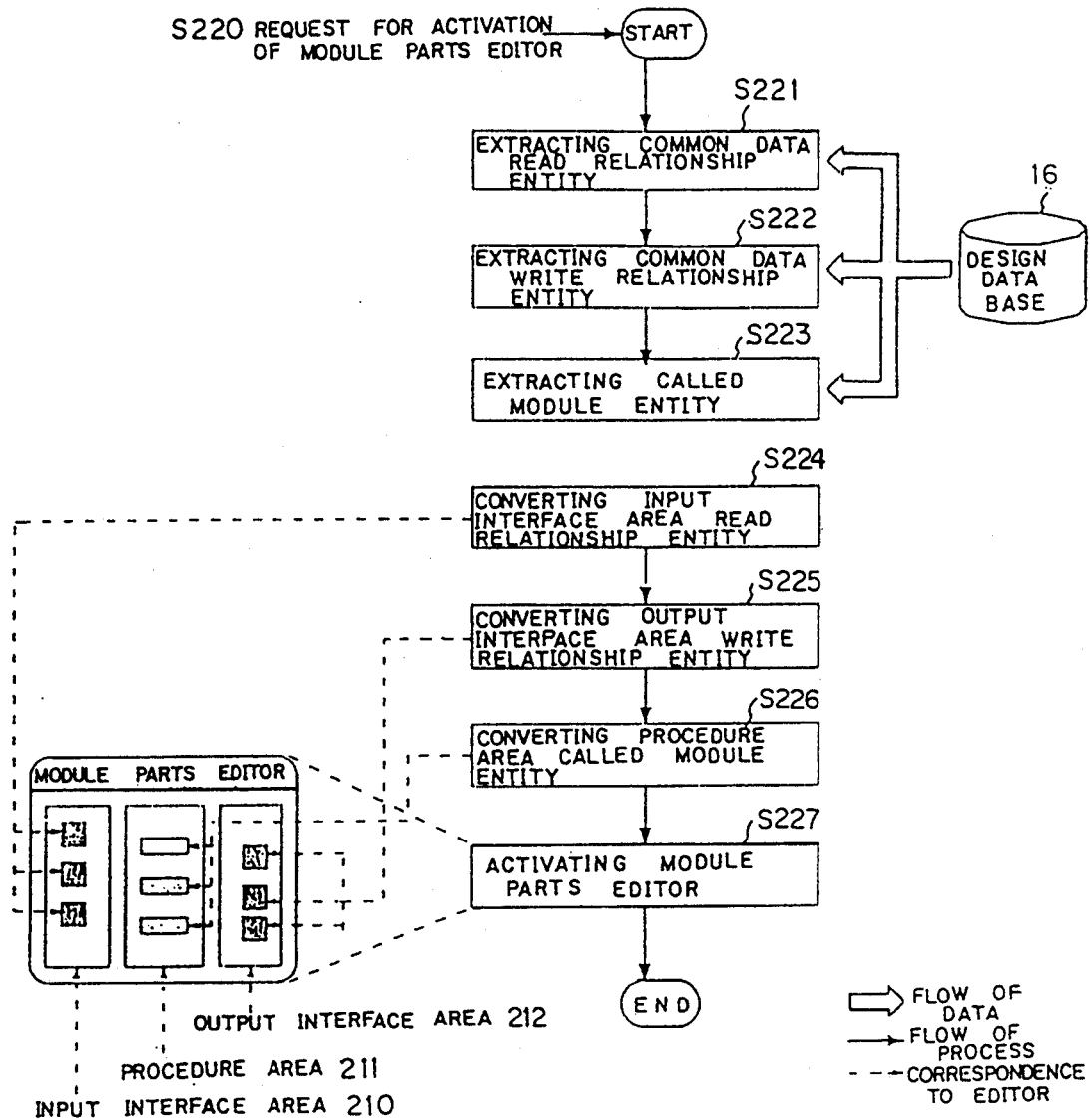
FIG. 21 is an operational flowchart for explaining the activation of the module parts editor.

FIG. 21 is a flowchart for explaining the activating operation of the module parts editor. As described in the operational flowchart of the design editor unit shown in FIG. 8, a request is issued to activate the program parts editor when the designer 18 details the program parts. Then, the program parts editor (module parts editor) is activated.

When a request to activate the module parts editor is issued by the designer 18 (S220), the information defined in the upstream of a detailing operation is transmitted to the downstream (S221–S223). The transmitted information is stored in the design data base 16. First, the entities such as common data, etc. referred to by the module parts from the design data base 16, that is, the data to be inputted are extracted (common data read relationship entity extracting process S221). Besides, the entity such as common data, etc. written by the module parts are extracted from the design data base 16 (common data write relationship entities extracting process S222). Then, the entity of the module called for use in the module parts is extracted from the design data base 16 (called module entity extracting process S223).

Next, the display process (S224–S226) is performed. This process displays in each area of the module parts editor described by referring to FIG. 20 the common data read relationship entity, the common data write relationship entity, and the called module extracted in S221–S223. That is, the input interface area read relationship entity conversion process S224 is performed first. This process converts the common data read relationship entity (extracted in S221) to the internal structure to display it as the common data graphic symbol in the input interface area 210 in the module designed parts editor. Then, the symbol is displayed in the input interface area 210.

Next, the output interface area write relationship entity converting process S225 is performed. This process converts the common data write relationship entity (extracted in S222) to the internal structure to display it as the common data graphic symbol in the output interface area 212. Then, the symbols are displayed in the output interface area 212. Finally, the procedure area calling module entity converting process S226 is performed to display the calling module (extracted in S223) as a graphic symbol in the procedure area 211. Then, the graphic symbol is displayed in the procedure area 211. In the above described process, the information in the high order level is transmitted to the low order level. When the module parts editor is activated (S227) with the information in the high order level reflected to each area (210–212), the module parts can be ready for the detailing operation.

Figure 22:
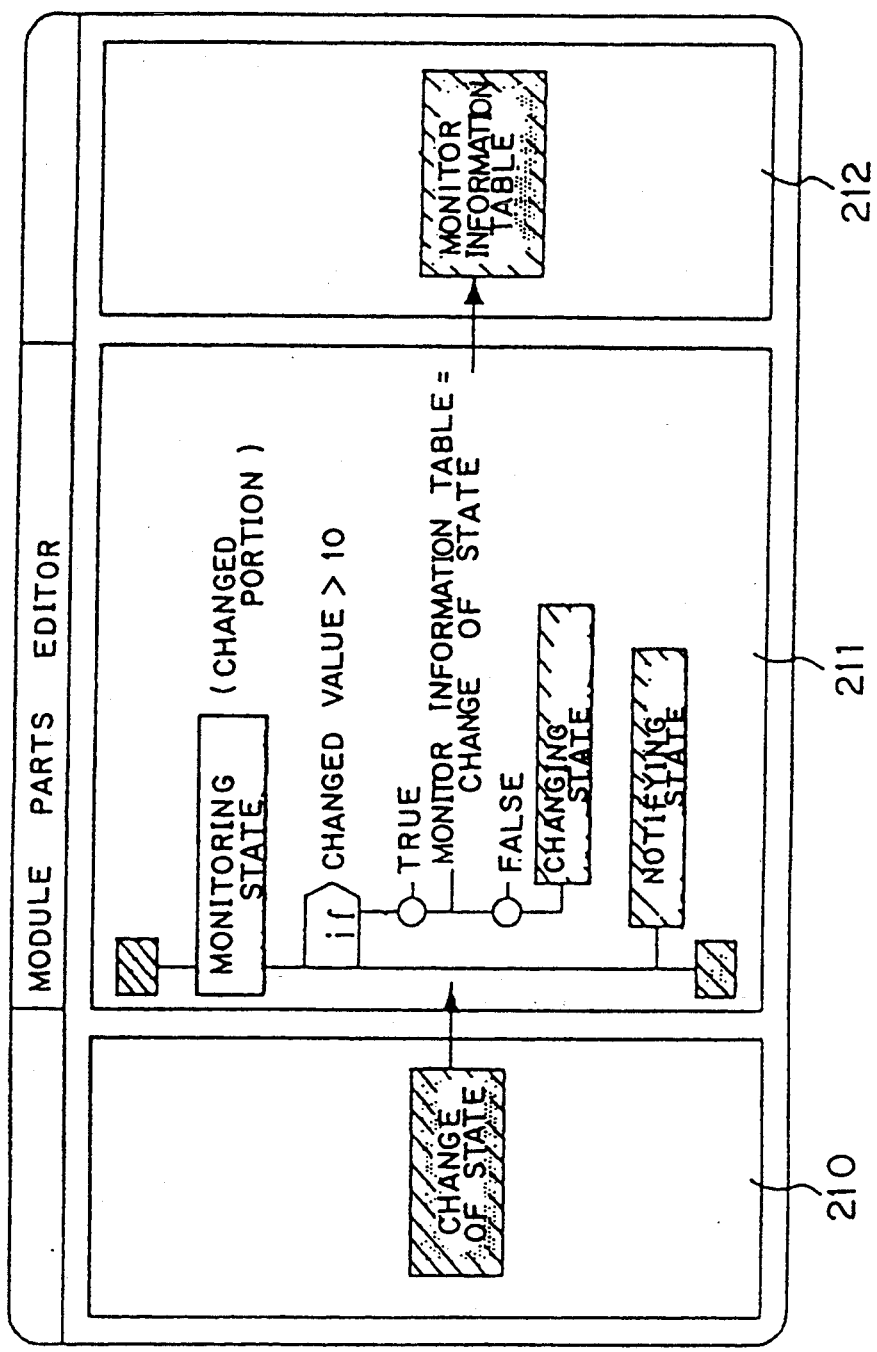
FIG. 22 shows a module parts editor of an embodiment.

FIG. 22 shows an embodiment of the module parts editor activated by the module parts editor activation process explained by referring to FIG. 21.

The portion in the shadow frame indicates a designed parts entity which is extracted (S221–S223) from the design data base during the module parts editor activation process (S220–S227 shown in FIG. 21) and automatically reflects the information of a high order level (S224–S226). That is, the change of the state is displayed in the input interface area 210 as the common data having the read relationship, the state change process and the state notification process are displayed in the procedure area 211 as the module parts entity having the calling relationship, and the monitor information table is displayed in the output interface area 212 as a write relationship entity.

The designer 18 details the design editors displayed only in the shadow frames, and describes the determination control structure in the procedure part shown in FIG. 22 (if) and the design information such as branch conditional expressions. In the module parts editor of the present embodiment, the procedure area 211 can be described by the representation according to the structuring editor. As a result, the determination control structure and the call of modules can be represented structurally.

Figure 23:
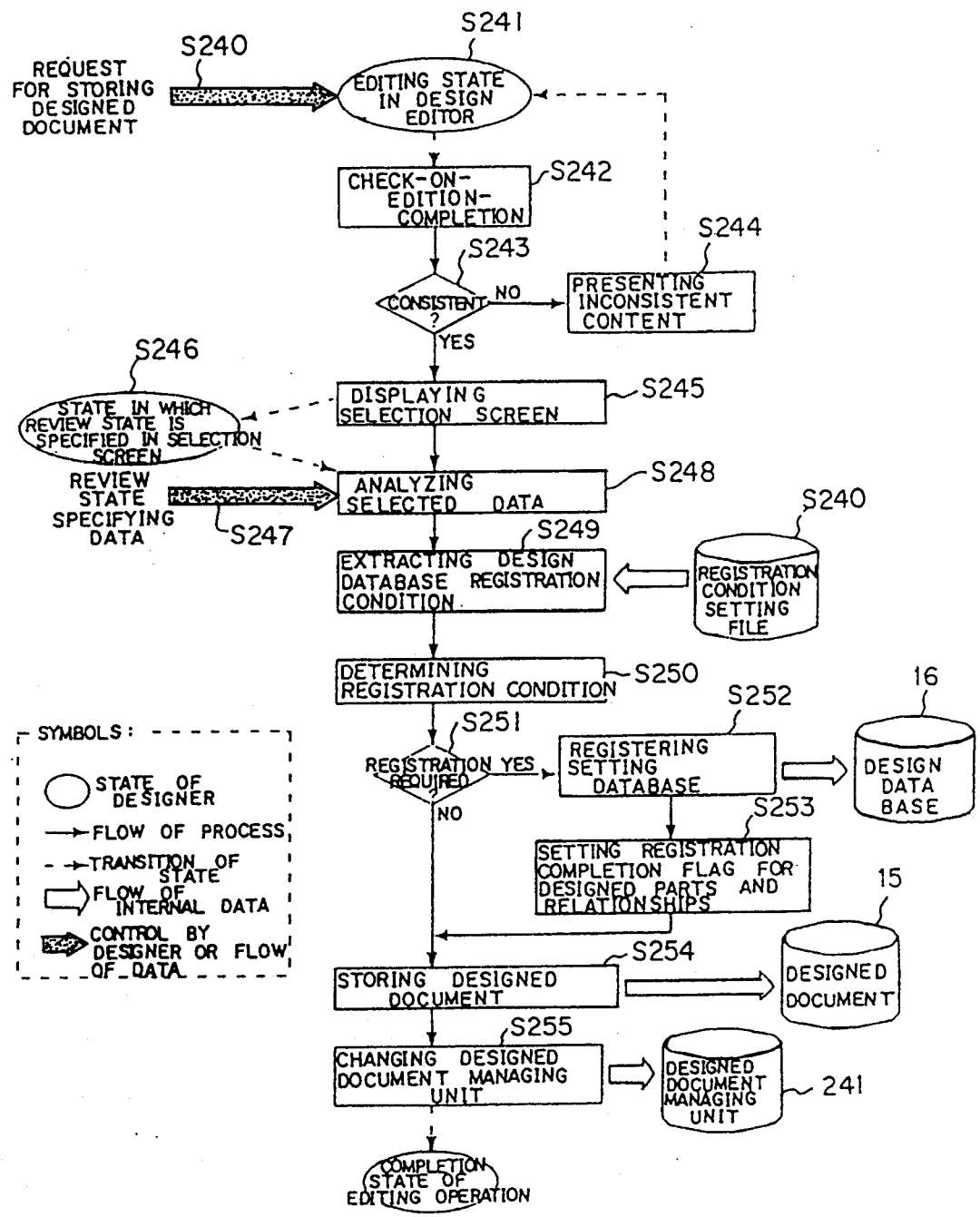
FIG. 23 is an operational flowchart for explaining the process when a request for storing a designed document is issued.

Next, the process to be performed when the designed document storage is requested in response to the design editor termination request from the designer 18 in S89 shown in FIG. 8 is explained by referring to the operational flowchart in FIG. 23.

When the designer 18 has finished the designing operation through the design editor and tries to store the generated designed document in the designed document file 15, a designed document storage request is issued to the design editor (S240). At this time, the design editor is in the editing state (S241). In response to the request, the design editor first performs a check-on-edition-completion (S242). This check is the check-on-edition-completion for checking designed parts relationships shown in FIG. 11–13, and the processes are carried out according to the operational flowchart shown in FIG. 13. Then, determination is made as to whether or not the inconsistency is detected in the check (S243). If yes, the consistency is corrected (S244) and the design editor is returned to the editing state (S241).

If no, a process of specifying the review state of the designed document to be stored by the designer. 18 is performed (S245–S247). The review state is displayed as "completed" or "not completed", and the detailed explanation is given later. First, a process of displaying a state selection screen for specifying the review state (S245). Thus, the design editor screen is displayed as a review state selection screen (S246), and the designer 18 selects a review state in this screen (S247). Then, according to the review state specified data, the designer 18 analyzes the data (S248).

Then, a series of processes are performed to determine whether or not the designed document should be registered in the design data base 16 (S249–S251). That is, the registration condition of the design data base predetermined and stored in the registration condition setting file 240 is read (S249). Then, determination is made as to whether or not the design information of the designed document should be registered in the design data base 16 (S250, S251). If the registration is required (S251), the design data base registration process is carried out (S252). Then, a flag is set for the entity of each of the designed parts and the relationships to indicate whether or not the entity is registered in the design data base. If the flag is set for the entity of the designed parts or the relationships registered in the design data base 16 in S252, it is set to "registered" (S253). Thus, when the same designed document is re-edited afterwards, the registration in the design data base can be inquired for each entity of the designed parts and the relationships.

After the registration of the designed parts and the relationships in the design data base 16 (S253), or when the registration in the design data base 16 is not required, a process of storing the designed document in the designed document file 15 is performed (S254). Thus, the designed document is stored in the designed document file in the secondary media. At this time, a process of updating the file for managing the designed document previously stored is performed (S255). It is a designed document managing card 241 for storing the managing data in the designed document including the review state.

Figure 24:
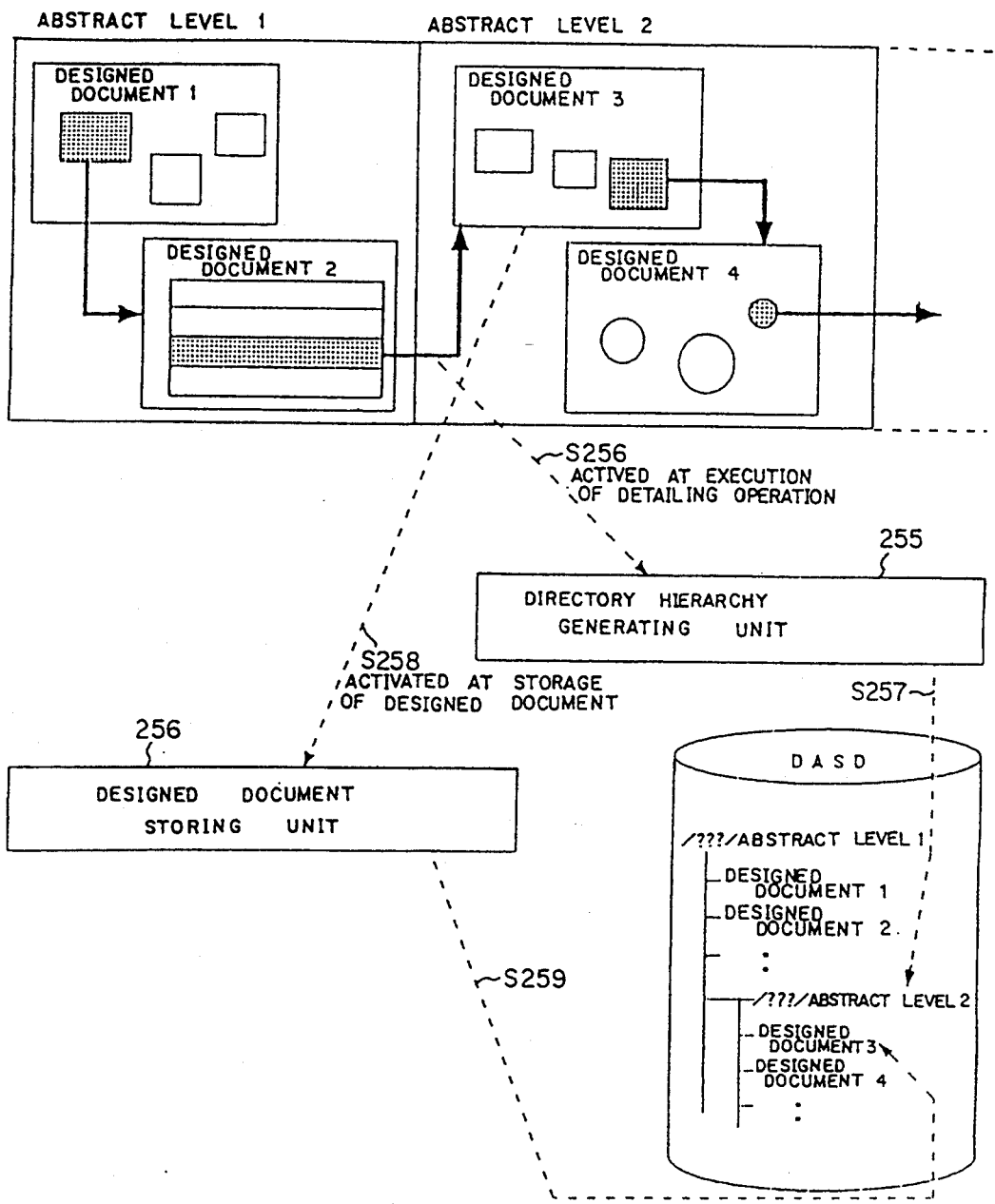
FIG. 24 is a view for explaining the abstract level designed document storing method.

FIG. 24 is a view for explaining the management and the storage of the designed document performed for each abstract level by the designed document management unit (14 shown in FIG. 2). The designed document managing unit 14 comprises a directory hierarchy generating unit 255 for generating the hierarchy of the directory of the designed document, and a designed document storage unit 256 for actually storing the designed document in the designed document file 16 in the DASD. The arrow indicated by the bold line shows the flow of the detailing processes, and the arrow indicated by the broken line shows the flow of control.

That is, a designer generates designed document 1 at the abstract level 1, and details one parts in the document using designed document 2 at the same abstract level 1. Then, the designer further details through designed document 3 at the lower-order abstract level 2 the parts detailed through designed document 2, and then details one parts in the document through designed document 4 at the same abstract level 2.

If the designer performs a detailing operation over two abstract levels when he designs software according to the abstract level (for example, when designed document 2 at abstract level 1 is detailed at abstract level 2 to generate designed document 3), the directory hierarchy generating unit 255 is activated when the designed document 2 is detailed (S256). The directory hierarchy generating unit 255 determines whether or not there is a directory corresponding to the abstract level (abstract level 2). If no, the directory corresponding to the abstract level is generated. That is, determination is made as to whether of not the directory at abstract level 2 exists. If no, the designed document 3 is generated as the directory at abstract level 2 (S257).

When the designer has finished the editing operation and requests to store a designed document (S240 in FIG. 23), the designed document storage unit 256 is activated (S258). The designed document storage unit 256 stores a designed document at the directory generated by the directory hierarchy generating unit 255 during the detailing operation (S259), asks the review state of the designed document of the designer as described by referring to FIG. 23, and accumulates the information in the designed document managing card 241.

Figure 25:
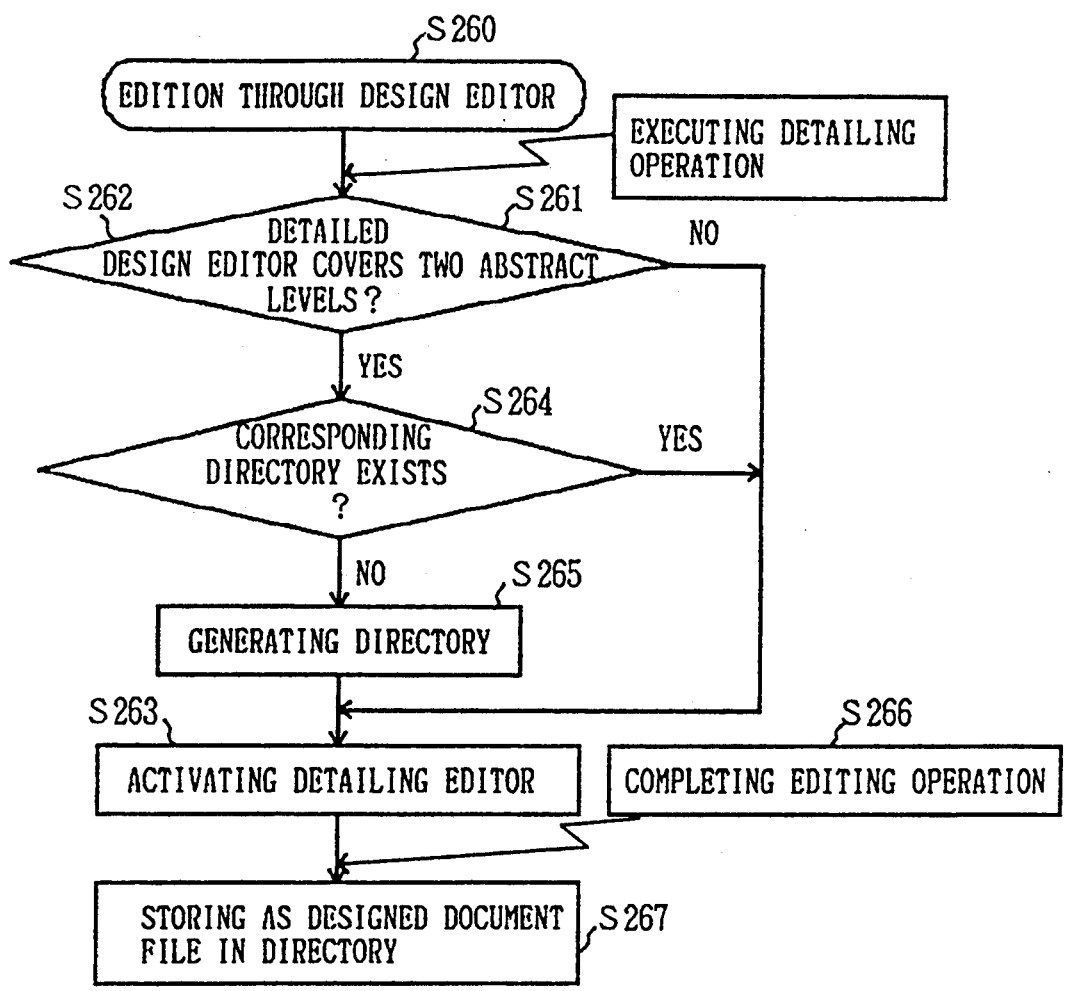
FIG. 25 is an operational flowchart for explaining the designed document storing process.

FIG. 25 is a flowchart for explaining the operation of storing the designed document.

When the designer performs a detailing operation (S261) during the design-editor-editing operation (S260), the directory hierarchy generating unit 255 determines whether or not the detailed design editor covers two abstract levels (S262). If no, a process of activating the detailing editor is performed (S263). If it covers two abstract levels (yes), determination is made as to whether or not a directory corresponding to the abstract levels exists (S264). If yes, a process of activating the detailing editor is performed (S263). If no, the required directory is generated (S265). Then, a process of activating the detailing editor is performed (S263), and the detailing operation is performed through the design editor.

When the designer issues a request to terminate the editing operation through the design editor (S266), the designed document is stored (S267) at the directory already generated or generated by the process in S265.

Figure 26:
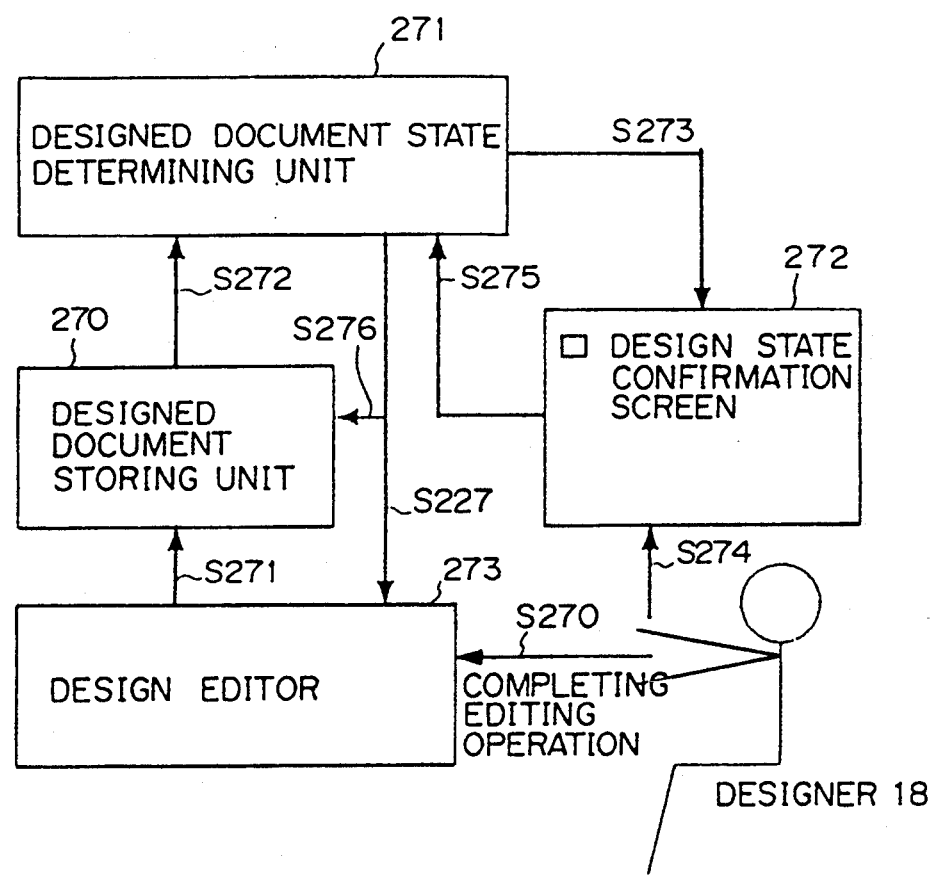
FIG. 26 is a view for explaining the designed document state determining method.

Next, the configuration of the registration condition determining process (S250 shown in FIG. 23) for determining the state of the designed document is explained below by referring to FIG. 26. The arrow shown in FIG. 26 indicates the flow of control.

The process is associated with a design editor 273, a designed document storage unit 270, a designed document state determining unit 271, and a design state confirmation screen 272.

When the designer 18 requests the design editor 273 to terminate the editing operation (S270), the design editor 273 activates the designed document state determining unit 271 (S272) through the designed document storage unit 270 (S271). The designed document state determining unit 271 displays on the display unit (S273) the design state confirmation screen 272 on which the designer indicates the design state of the designed document. At this screen, the designer 18 specifies the review state (S274), and the data are transmitted to the designed document state determining unit 271 (S275). When the designer selects "complete" of the review, the designed document state determining unit 271 activates the designed document storage unit 270, accumulates the information in the designed document managing card 241, and stores the designed document in the designed document file 15 (S276). If the review state does not indicate "completed", the state is not accumulated in the designed document managing state 241, and control is returned to the design editor editing screen (S277).

Figure 27:
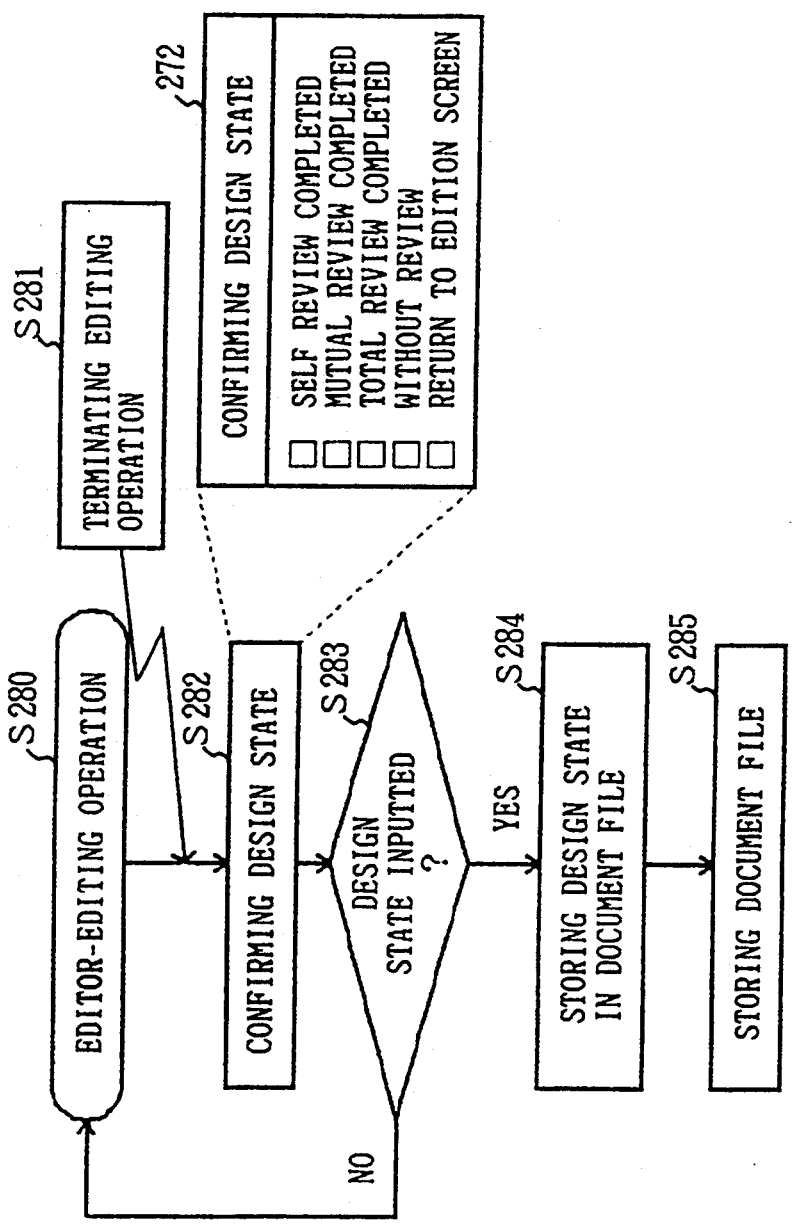
FIG. 27 is an operational flowchart for explaining the state determining method for each type of review.

FIG. 27 is a flowchart for explaining the operation of the review type state determining method.

When the designer 18 issues a request to terminate the editing operation (S281) during the editing operation (S280), the designed document state determining unit 271 is activated through the designed document storage unit 270 as described above, and the designed document state determining unit 271 displays the design state confirmation screen 272 (S282). At this screen, the designer 18 specifies the review state. The designed document state determining unit 271 determines whether or not the review state is inputted by the designer 18 (S283). If no, control is returned to the editor editing operation (S280). If yes, the design state is accumulated in the designed document managing card 241 (S284), and the designed document is stored in the designed document file 16 (S285).

Figure 28:
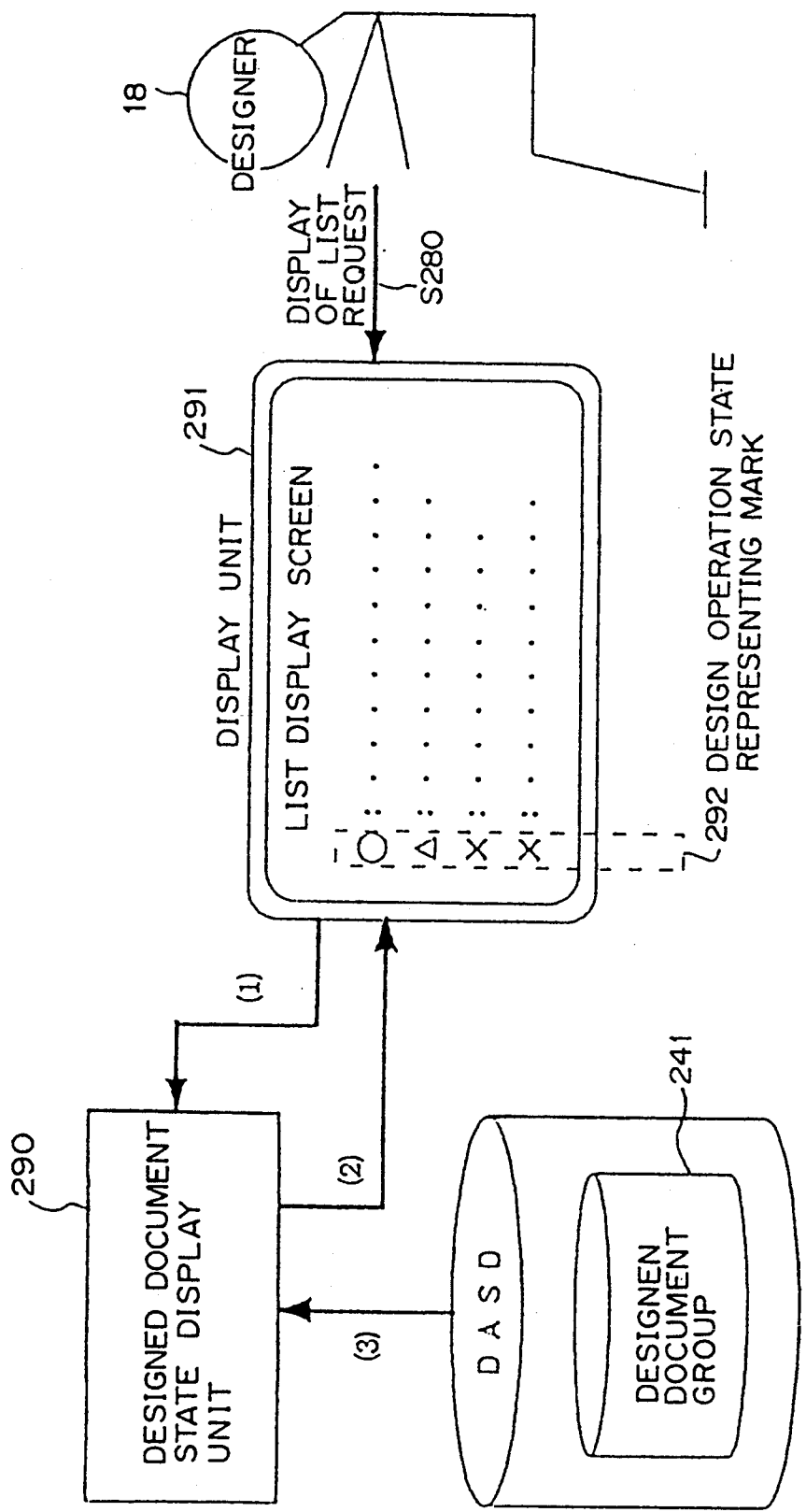
FIG. 28 is a view for explaining the designed document state indicating method.

FIG. 28 is a view for explaining the configuration of the method of displaying the state of the designed document. The process is associated with a designed document state display unit 290 the designed document managing card 241 in the DASD, and a display unit 291 which is a design editor screen.

When the designer 18 issues a request to display a list of the names of designed documents (S290), the designed document state display unit 290 is activated through a design editor. The designed document state display 290 extracts the information such as document names, designer names, design states, etc. from the designed document managing card 241 stored in the DASD, replaces the design state with a mark for indicating the current state, and displays a list on the display unit 291. Shown on the list display screen of the display unit 291 shown in FIG. 28 are designing operation state representing marks 292 for indicating the design state.

Figure 29:
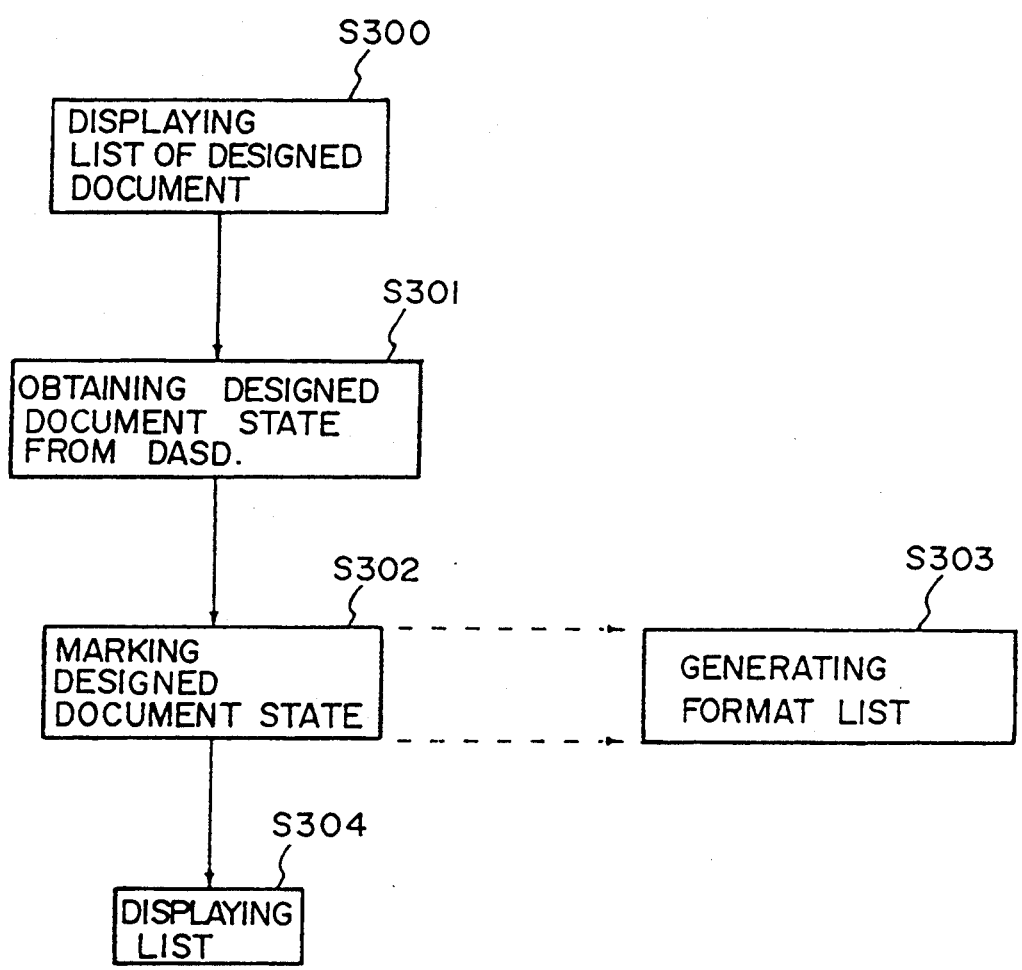
FIG. 29 is an operational flowchart for explaining the designed document state indicating method.

FIG. 29 is a flowchart for explaining the operation of displaying the design states of the designed document shown in FIG. 28.

First, the designer 18 issues a request to indicate the designed document list (S300). The designed document state display unit 290 refers to the designed document managing card 241 in the DASD, and extracts the information such as the names of documents, designer names, and design state, etc (S301). Next, the information about the design state is replaced with the mark indicating the state (S302). Then, a list format is generated, and provided with the marks (S303). Finally, the list is displayed (S304).

Figure 30:
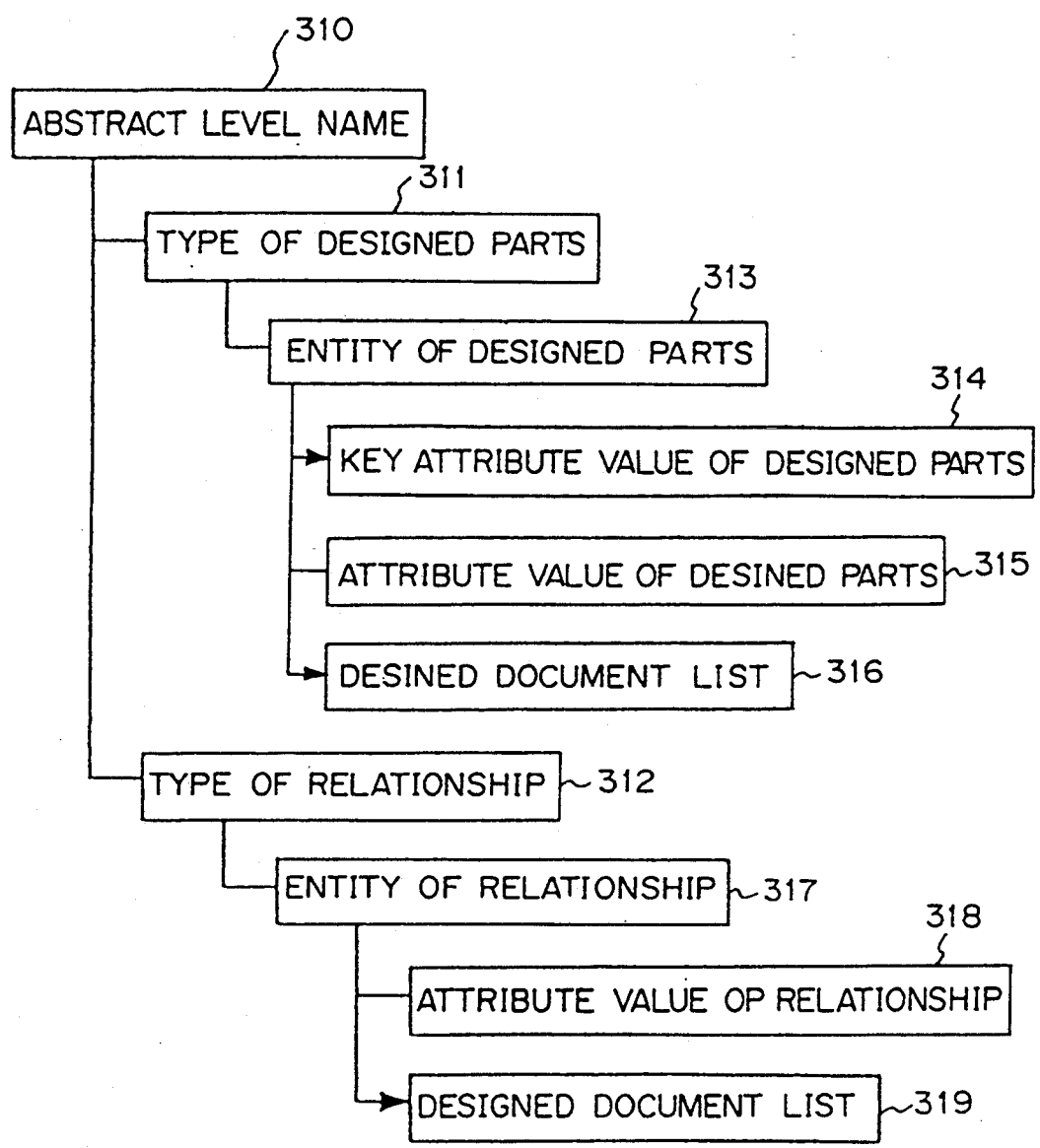
FIG. 30 is a view for explaining the logical configuration of the design data base.

The process of registering the designed parts and the relationships in the design data base (S249–S252 shown in FIG. 23) is explained below. FIG. 30 shows the logical configuration of the design data base.

The logical configuration of the design data base is represented as a hierarchical structure having an abstract level name 310 on top of it. The abstract level name 310 contains an abstract level name prescribed in the abstract level table 111 described by referring to the view of the abstract level prescription table group of an embodiment shown in FIG. 4. The type of the designed parts 311 and the type of the relationship 312 come below the abstract level name 310. The type of the designed parts 311 contains the type name of the designed parts prescribed in the abstract level designed parts table 113 described by referring to FIG. 4. The type of the relationship 312 contains the type name of the relationship prescribed in the abstract level relationship table 114 described by referring to FIG. 4. The designed parts entity 313 comes below the type of the designed parts 311 and contains the type of each designed parts. The key attribute value 314 of the designed parts prescribed in the designed parts attribute table 116 shown in FIG. 4 and other attribute values 315 come below the designed parts entity 313. Together with them, a designed document list 316 defining the designed parts is assigned. The type of the relationship entity 317 comes below the type of the relationship 312, and the attribute value of the relationship 318 and the designed document level 319 in which the relationship is defined come below the relationship entity 317.

Among the lines defining the hierarchical positions in the configuration, a line without an arrow indicates that a high-order position has a plurality of related low-order positions. For example, an abstract level has a plurality of designed parts and relationships, each of them having a plurality of designed parts entities and the relationship entities. Furthermore, the entity of each designed parts and the relationship has a plurality of attribute values. By contrast, a line with an arrow indicates that a high-order position has one low order position. For example, the designed parts has one designed parts key attribute and the designed document list. The designed document lists 316 and 319 are used to guarantee the consistency among them when each of the designed parts and the relationship entity appear in a plurality of designed documents.

The entities of the designed parts and the relationships are registered and updated in the design data base in response to a request to store the designed document as shown in the operational flowchart at the request for the storage of the designed document shown in FIG. 23. At this time, determination can be made according to the design data base storage flag as to whether or not the registration is made for each entity of the designed parts and the relationships to be stored as the designed document. Therefore, a correction can be made, separate from the entities of the designed parts or the relationships newly registered in the design data base, to the entities of the designed parts and the relationships in the designed document already registered in the design data base.

Figure 31:
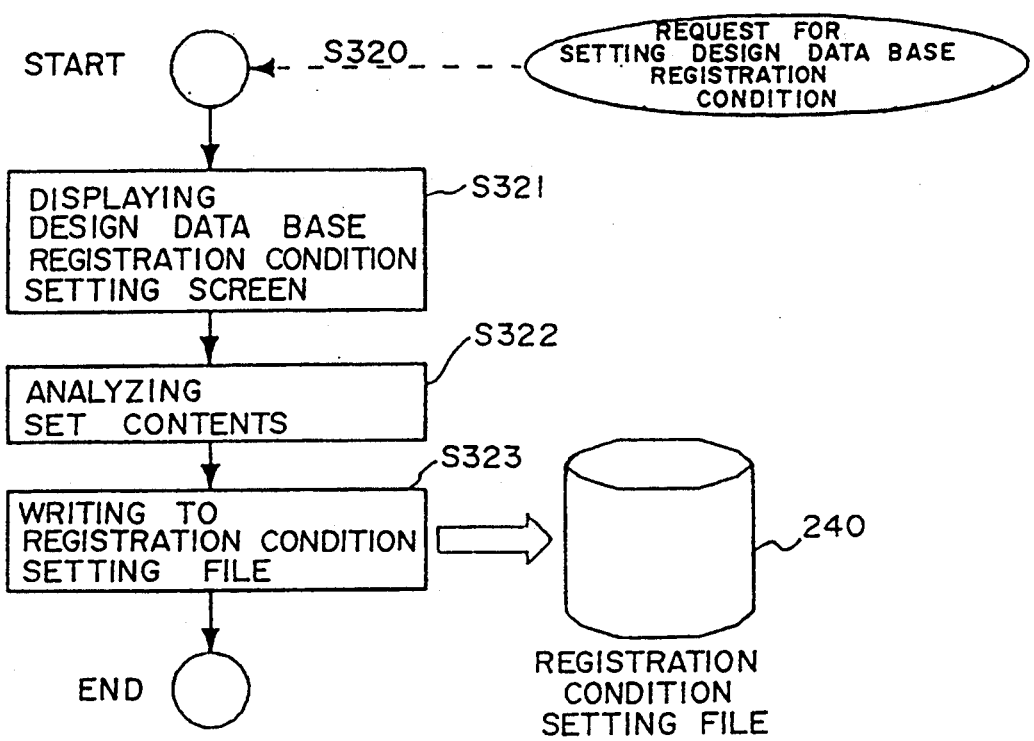
FIG. 31 is an operational flowchart for explaining the design data base registration condition setting process.
Figure 32:
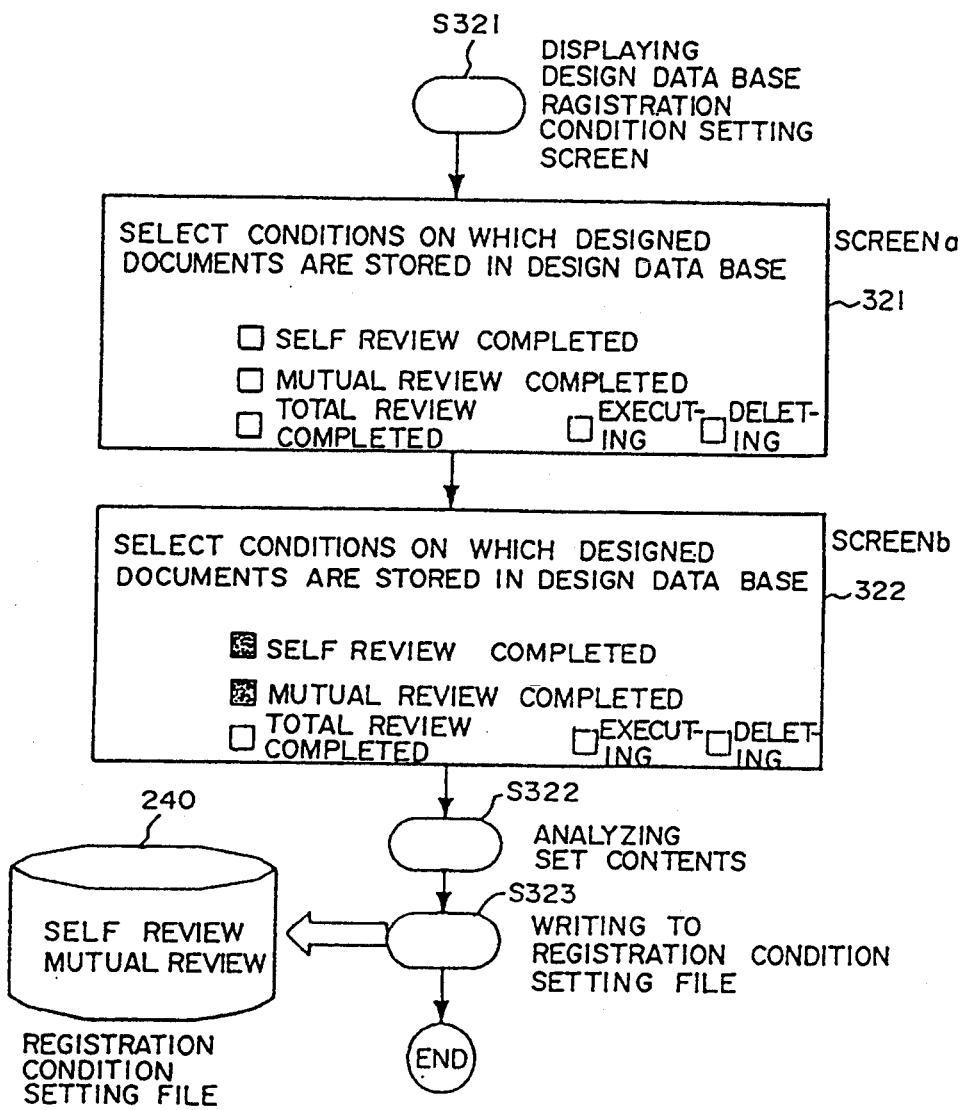
FIG. 32 shows an embodiment of setting the registration condition for design data base.

FIG. 31 is a flowchart for explaining the operation of designing the registration conditions used in determining the registration conditions performed when the entities of the designed parts and the relationships are registered in the design data base. FIG. 32 shows an embodiment of the screen display accompanied with the process shown in FIG. 31.

As described about the operational flowchart of the process performed at the request to store the designed document in FIG. 23, the registration condition determining process S250 for determining whether or not the registration is permitted is performed when the entities of the designed parts and the relationships are registered in the design data base 16. Only the entities of the designed parts and the relationships considered that they must be registered in the registration condition determining process S250 are registered in the design data base 16. The registration conditions for the registration condition determining process S250 are preliminarily written in the registration condition setting file 240, and the registration condition determining process S250 is carried out by calling the registration conditions through the process S249 shown in FIG. 23.

A process of setting the registration conditions is activated by a design data base registration condition setting request S320 from the designer 18. First, a process of displaying the design data base registration condition setting screen is performed (S321). In the display process, screen a of 321 shown in FIG. 32 is displayed, for example. At this screen, the designer 18 selects the conditions of the registration in the design data base. At this time, the registration conditions can be selected from the three review states "self", "mutual", and "total". Assuming that the designer 18 selects the self-review completed and the mutual review completed as the registration conditions, the selected conditions are displayed so that they can be easily confirmed as shown in the screen b322.

Then, the registration conditions selected by the designer 18 are analyzed (setting content analysis S322), and written in the registration condition setting file 240 (S323). Using the registration condition setting file 240, the process of storing the data in the design data base is executed at the request to store the designed document (FIG. 23).

Next, the design information inconsistency correction support unit 17 referred to in FIG. 2 is described below in detail. When software is designed through a design editor, a designed parts may be used in a number of designed documents. Assume that the information of a designed parts is corrected during the generation of a designed document. At this time, all designed documents associated with the designed parts must be corrected. The design information inconsistency correction support unit 17 can support such a process.

Figure 33:
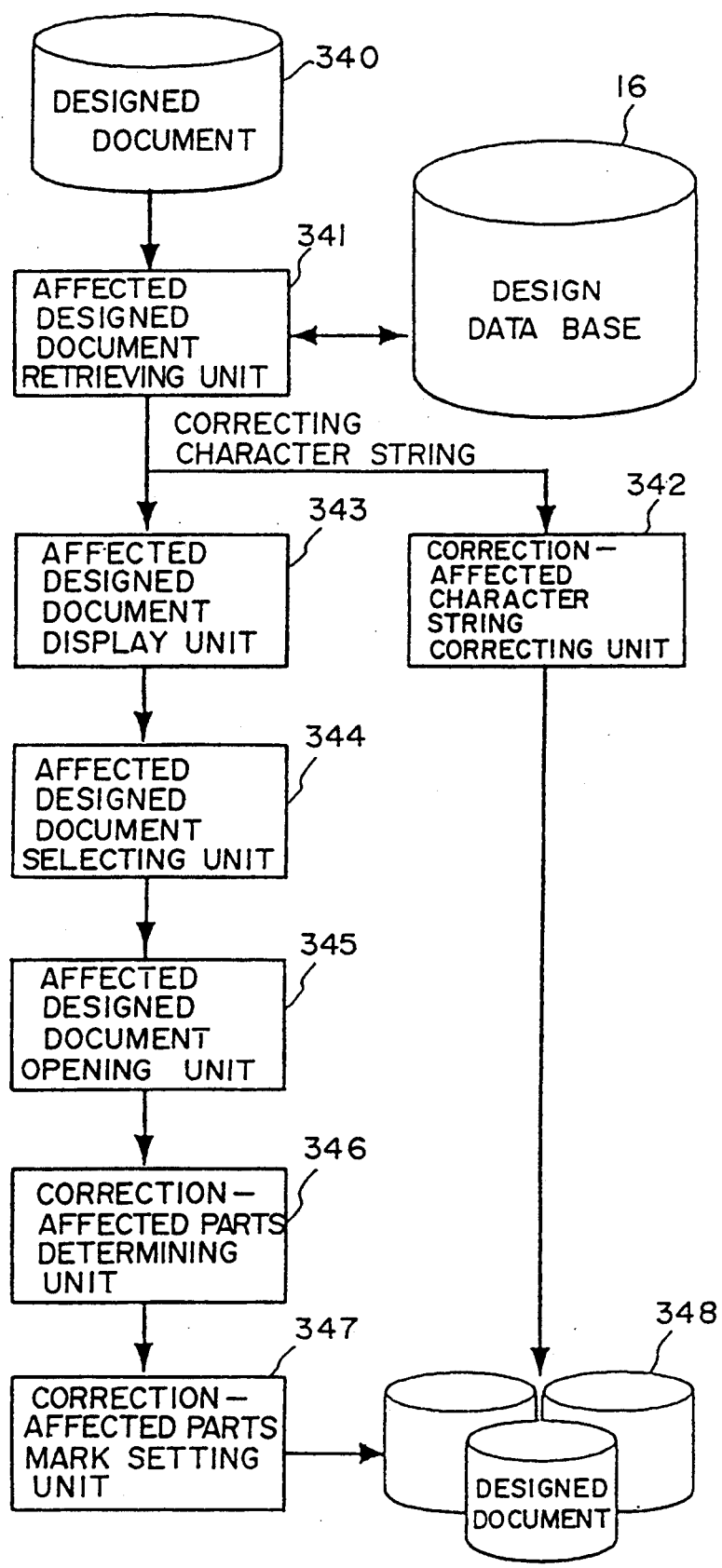
FIG. 33 is a view for explaining the principle of the consistency guarantee method in the abstract levels.

FIG. 33 shows the principle of the abstract level consistency guarantee method.

Assume that the designer 18 is editing a designed document 340, and that the designer 18 tries to change the attribute information of a designed parts. Then, the design information inconsistency correction support unit 17 first activates an affected designed document retrieving unit 341. The affected designed document retrieving unit 341 retrieves the designed document list 316 in the design data base 16 (refer to the logical configuration of the design data base shown in FIG. 31) to extract the file names of other documents using the attribute of the designed parts. If the attribute of the retrieved designed parts is "character", a correction-affected character string correcting unit 342 described later is activated.

If the attribute of the designed parts is not "character", an affected designed document display unit 343 is activated. The affected designed document display unit 343 displays as a list the names of the files in an affected document retrieved by the affected designed document retrieving unit 341. Next, an affected designed document selecting unit 344 is activated, and the designer 18 is permitted to select the name of the designed document to be corrected from among the designed document displayed in the list. At this time, a plurality of names of the designed documents can be specified simultaneously. Then, an affected designed document opening unit 345 is activated to open through the design editor the designed document previously opened to be corrected. If a plurality of designed documents are specified, a plurality of design editors are activated simultaneously to open a plurality of designed documents through them. This allows the designed parts in each designed document to be corrected in a multiple manner.

Next, a correction-affected parts determining unit 346 is activated. The correction-affected parts determining unit 346 retrieves from among the designed documents opened by the affected designed document opening unit 345 the designed parts having the attribute of the designed parts retrieved by the affected designed document retrieving unit 341. Then, a correction-affected parts marking unit 347 is activated to set a mark so as to determine the extracted designed parts to be corrected. At this time, an mark appropriate for each designed document must be set. With this mark, the designer 18 can easily recognize the designed parts to be corrected.

If the attribute of the designed parts to be corrected is "character", the correction-affected character string correcting unit 342 is activated as described above. The correction-affected character string correcting unit 342 automatically corrects the character strings having the corresponding attribute in all designed documents extracted by the affected designed document retrieving unit 341 to be corrected.

A designed document 348 stores the designed documents corrected by the designer 18 through the support of the mark displayed by the correction-affected parts mark setting unit 347, and the designed documents corrected by the correction-affected character string correcting unit 342.

Figure 34:
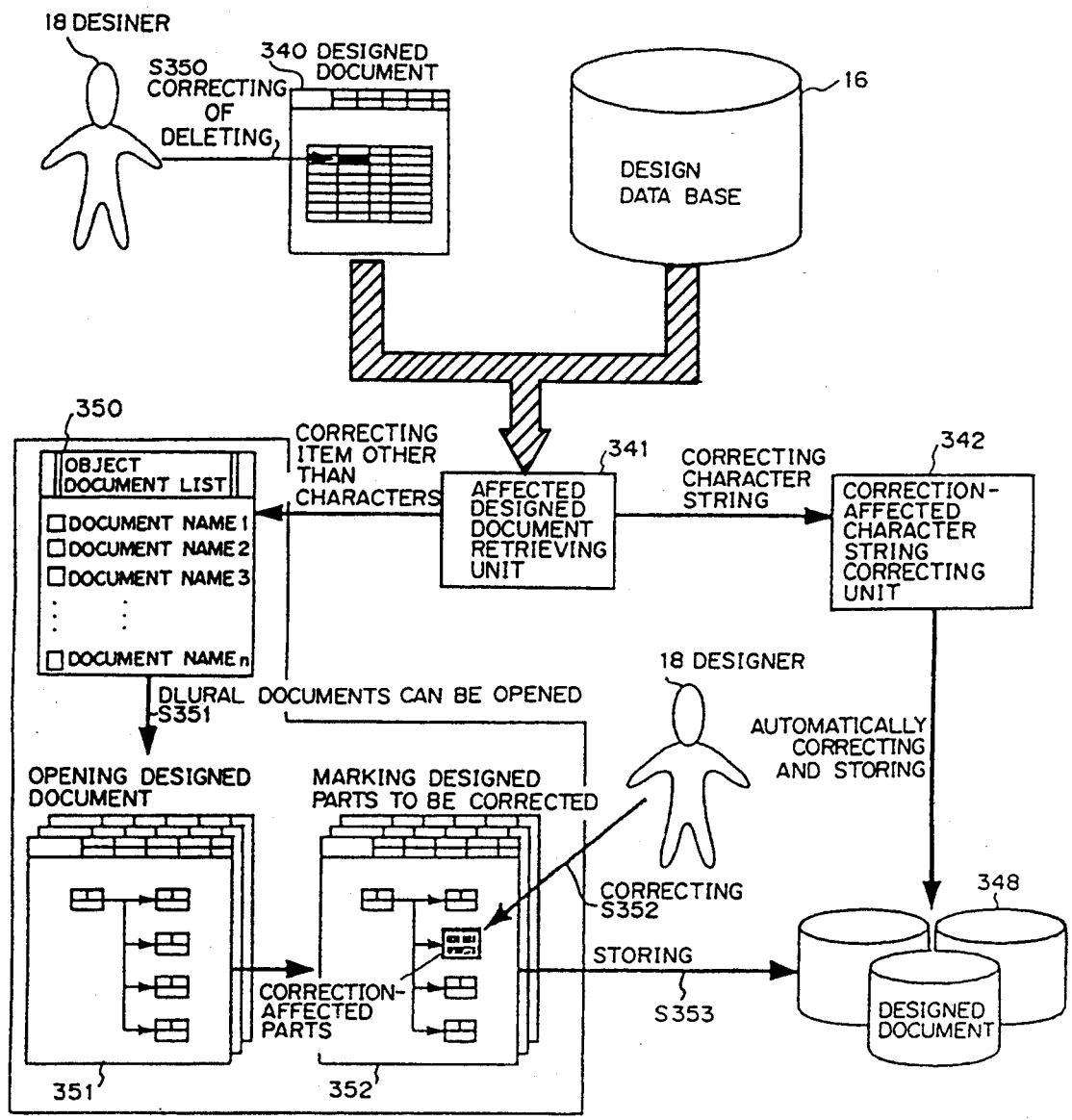
FIG. 34 is a view for explaining the consistency guarantee in the abstract levels of an embodiment.

FIG. 34 shows an embodiment of the guarantee for the consistency in the abstract level.

The designer 18 selects the designed parts to be changed or deleted in the designed document 340 edited by the design editor (S350). In response to a request for a correction, the affected designed document retrieving unit 341 is activated, and the names of the files of all designed documents sharing the attribute of the designed parts to be corrected by the design data base 16 are extracted.

If the attribute of the designed parts to be corrected is "character string" (the correction of character strings), the correction-affected character string correcting unit 342 is activated, and all designed documents sharing the attribute are automatically corrected and stored in the designed document 348.

If the attribute of the designed parts to be corrected is not "character string" (the correction of an attribute other than "character string"), the affected designed document display unit 343 displays the list of the extracted file names (an object document list 350). At the object document list 350, the designer 18 selects the designed documents to be corrected (S351, the affected designed document selecting unit 344). At this time, a plurality of designed documents can be selected simultaneously. Then, one or more designed documents for which the affected designed document opening units 345 are selected are opened to be corrected on the display unit (a designed document opening unit 351). Then, the correction-affected parts determining unit 346 retrieves the designed parts to be corrected in all the opened designed documents, and assigns each of them an identification mark which enables the correction-affected parts mark setting unit 47 to determine the parts with ease and display the documents (a design-parts-to-be-corrected marking unit 352). The designer 18 corrects the designed parts having the identification mark (S352), and stores them in the designed document 348 (S353).

Figure 35:
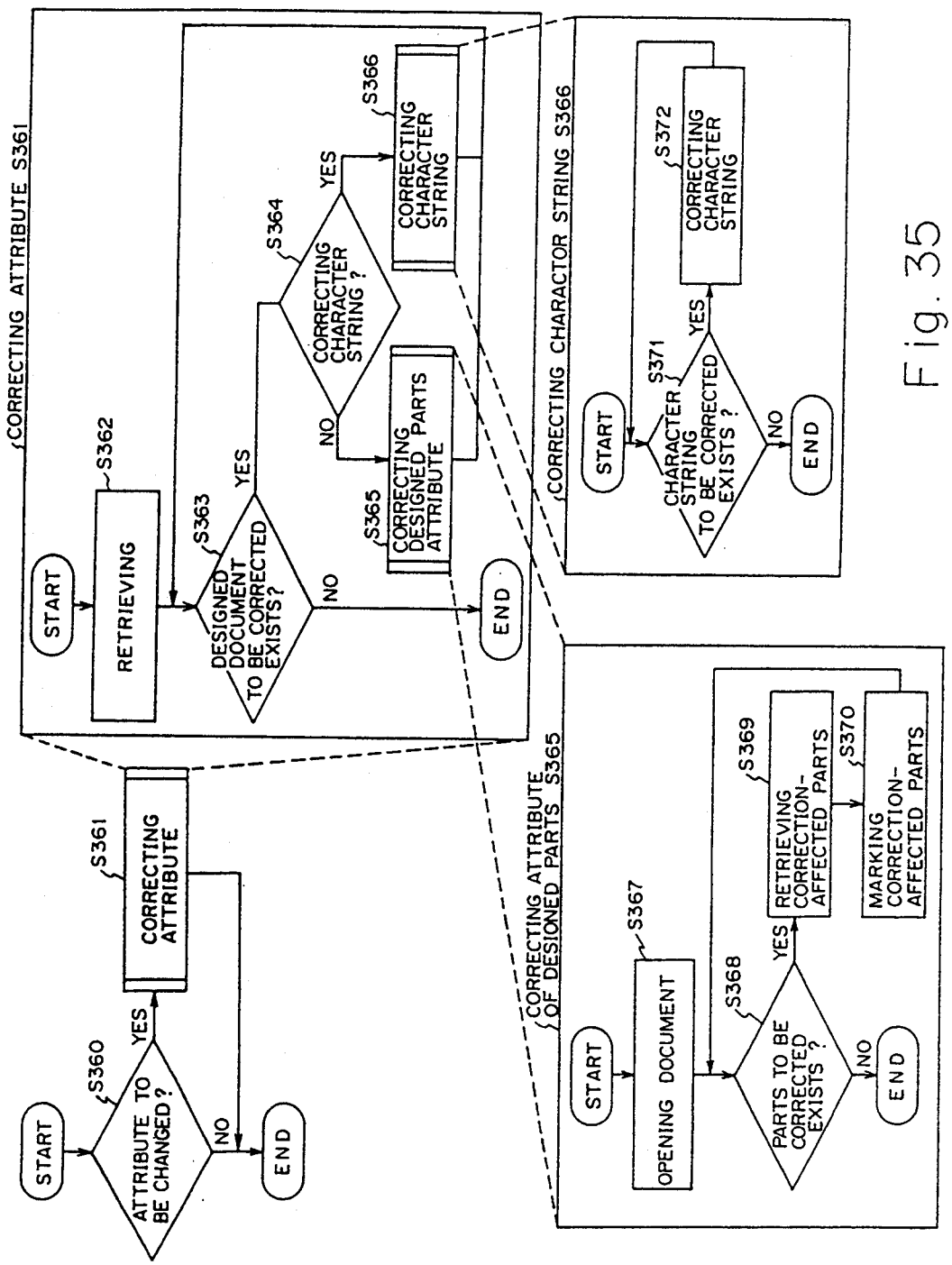
FIG. 35 is an operational flowchart for explaining the consistency guarantee in the abstract levels.

FIG. 35 is an operational flowchart for explaining the guarantee for the consistency in the abstract level.

When the designer 18 is editing designed documents through the design editor, the following guarantee process for the consistency in the abstract level is activated (start). First, determination is made as to whether or not the process the designer 18 tries to perform is a correction of an attribute (S360). If no, the process is terminated. If yes, the attribute correcting process S361 is performed.

In the attribute correcting process S361, the designed document to be corrected is extracted from the design data base 16 (S362). Then, determination is made as to whether or not a designed document to be corrected exists (S363). If no, the process is terminated. If yes, determination is made as to whether or not the correction should be made to character strings (S364). If no, the designed parts attribute correcting process S365 is activated. If yes, the character string correcting process S366 is activated.

In the designed parts attribute correcting process S365, a process of opening an object designed document is performed (S367) first. Then, determination is made as to whether or not designed parts to be corrected exist (S368). If no, the process is terminated. If yes, designed parts to be corrected are retrieved (S369), and the extracted parts are marked and displayed (S370).

In the character string correcting process S366, determination is made first as to whether or not character strings to be corrected exist (S371). If yes, the character string correcting process is performed (S372). If no, the process is terminated.

Figure 36:
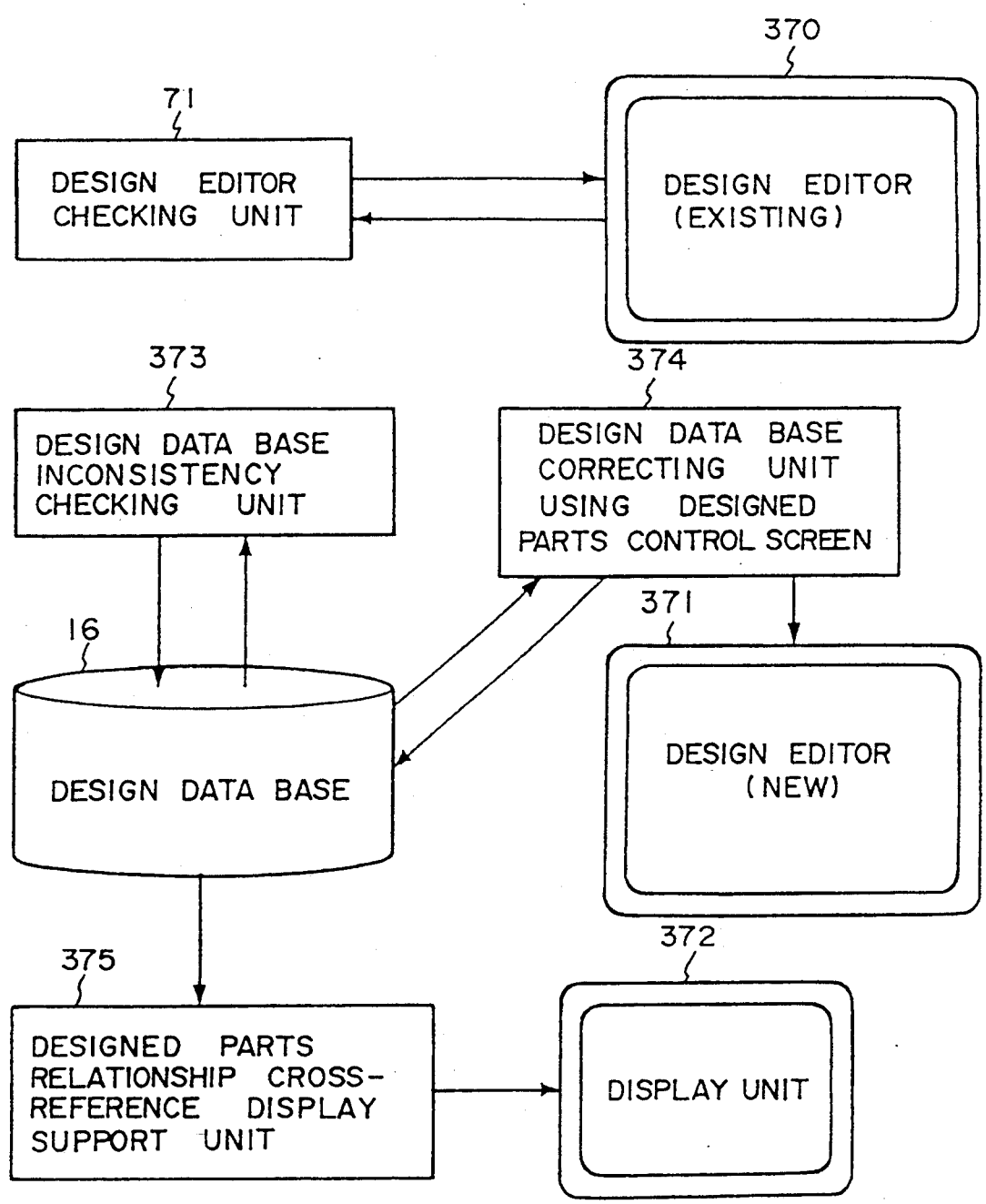
FIG. 36 is a view for explaining the principle of the design support method in the abstract levels.

FIG. 36 shows the principle of the support method provided by the system when the software is designed at an abstract level.

First, when a normal designing operation is performed through the design editor 370, the design editor check method 71 (explained by referring to FIGS. 7, 8, 11-19) is activated on completion of the editing operation, during the editing operation (at a request of the designer), or during the editing manipulation (inputs of character strings and inputs of connection arrows between parts) as described above.

When an editing operation is performed to change or delete the designed parts and the relations already registered in the design data bases 16, the abstract level consistency guarantee method explained by referring to FIGS. 33–35 is activated and correcting support is provided for all the designed documents using the designed parts and the relationships registered in the design data base 16. This causes a change and deletion in the registered contents in the design data base 16. Then, a design data base inconsistency check method 373 is activated, retrieves the design data base 16, and checks if the inconsistency to be corrected exists. Then, a design data base correcting method 374 through the designed parts control screen is activated and a new design editor 371 is opened to support the correction of the design data base. Next, a designed parts relationship cross-reference display support method 375 is activated to display on a display unit 372 a list of cross-references stored in the design data base to indicate the relationships among the designed parts.

Figure 37:
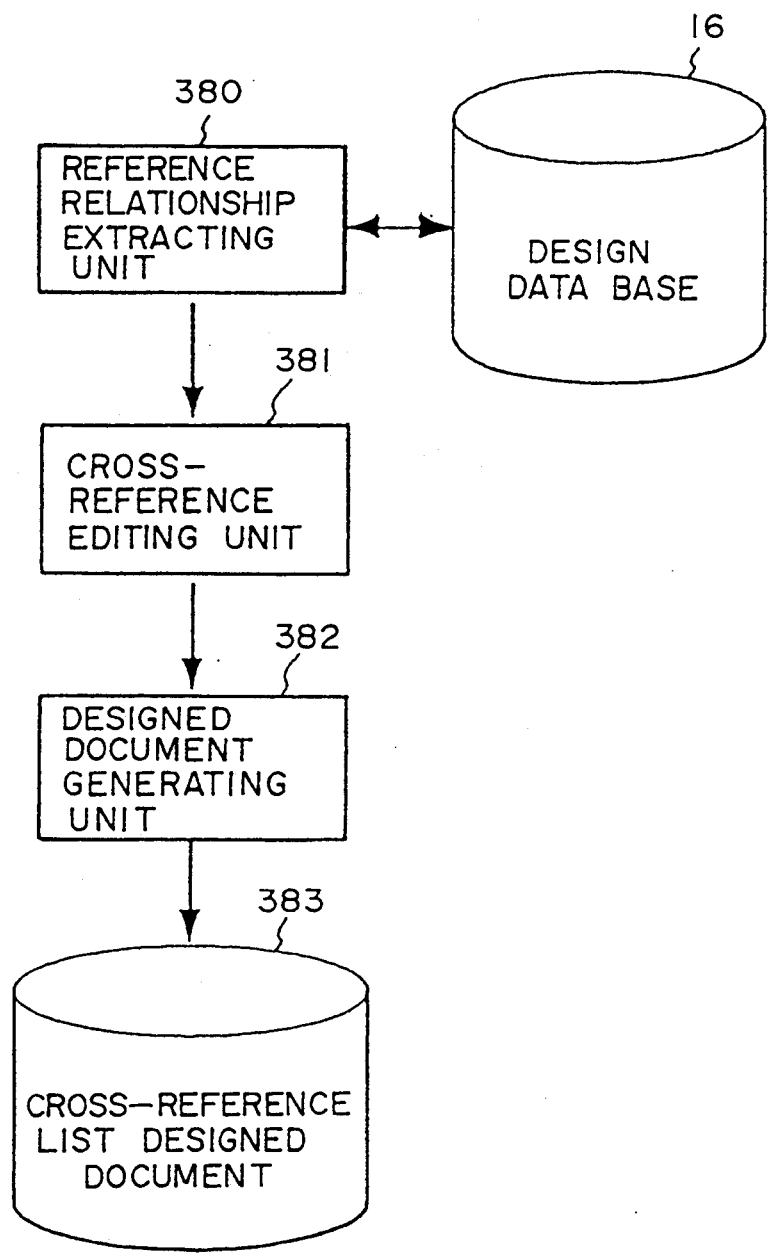
FIG. 37 is a view for explaining the designed parts relationship cross-reference indication support method (1)

FIG. 37 shows the principle of the designed parts relationship cross-reference display support method.

As described above, the types and attributes, etc. of the designed parts and the relationships are hierarchically registered at each abstract level in the design data base 16 (FIG. 30). First, a reference relationship extracting unit 380 is activated, and the design data base 16 is retrieved to extract the relationship between the entities of two specific designed parts. For example, the relationship such as a read or a write of a module designed parts entity and a common data designed parts entity is extracted. Next, a cross-reference editing unit 381 is activated to arrange the relationship information between the extracted entities in the two-dimensional format related with two designed parts entities and to identify the position of the relationship entities. Then a designed document generating unit 382 is activated to relate the cross-reference information processed by the cross-reference editing unit 381 such that one designed parts entity is related to the vertical axis, and the other designed parts entity to the horizontal axis. Then, it marks the positions where the relationship exist. Finally, it outputs the two-dimensional cross-reference information generated as a cross-reference list designed document 383.

Figure 38:
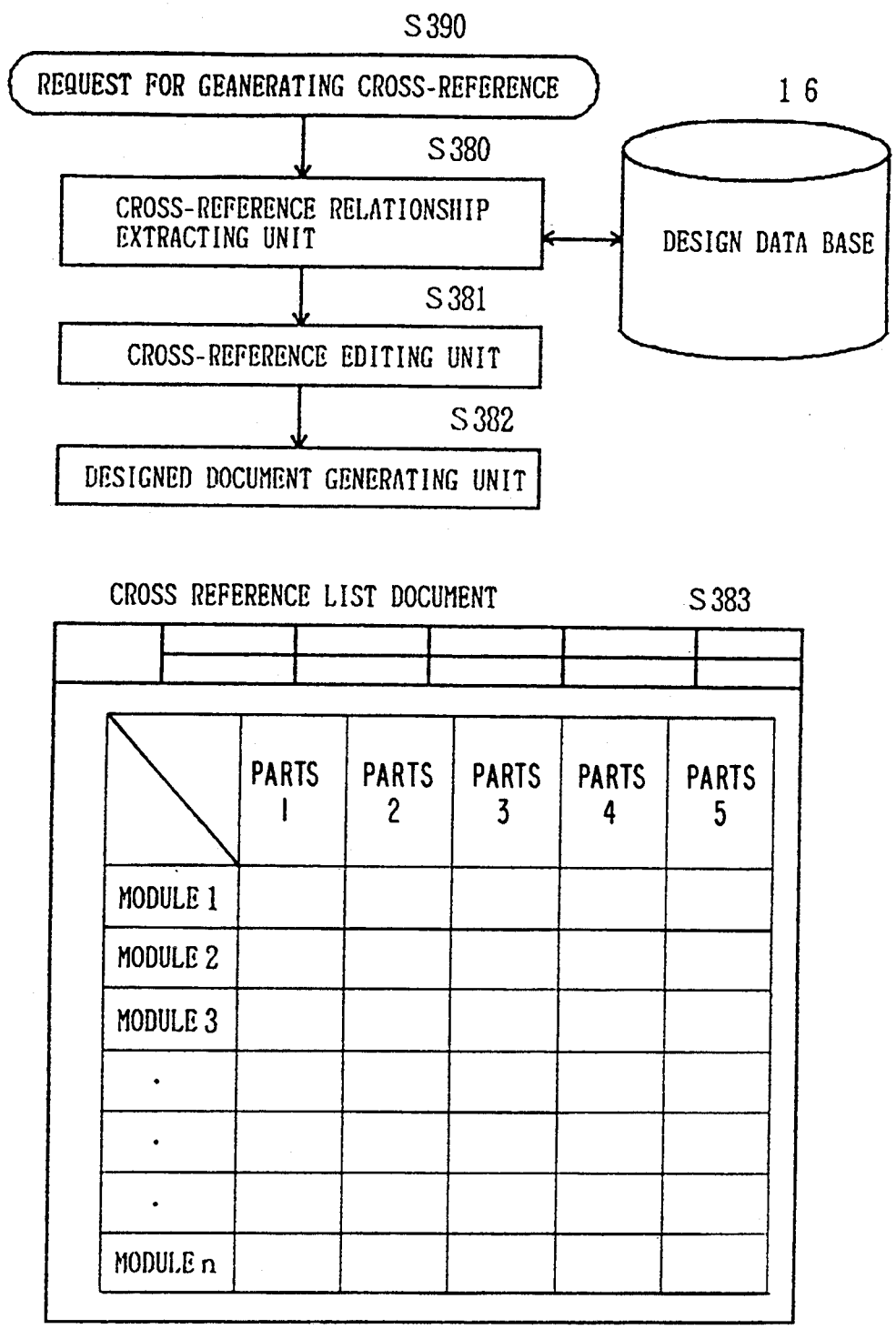
FIG. 38 is a view for explaining the designed parts relationship cross-reference indication support method (2)

FIG. 38 shows an embodiment of the support method of displaying the designed parts relationship cross-reference.

At the request (S390) for the generation of a cross-reference issued from the designer 18 during the editing operation, the above described reference relationship extracting unit 380, the cross-reference editing unit 381, and the designed document generating unit 382 are sequentially activated to perform their processes. Then, the cross-reference information is outputted as he cross-reference list document 383.

As shown in FIG. 38, the designed parts entities are written to the vertical and the horizontal axes. If any relationship exists between the designed parts entities of the vertical and the horizontal axes, a mark indicating that the relationship is assumed at their intersection is entered.

Figure 39:
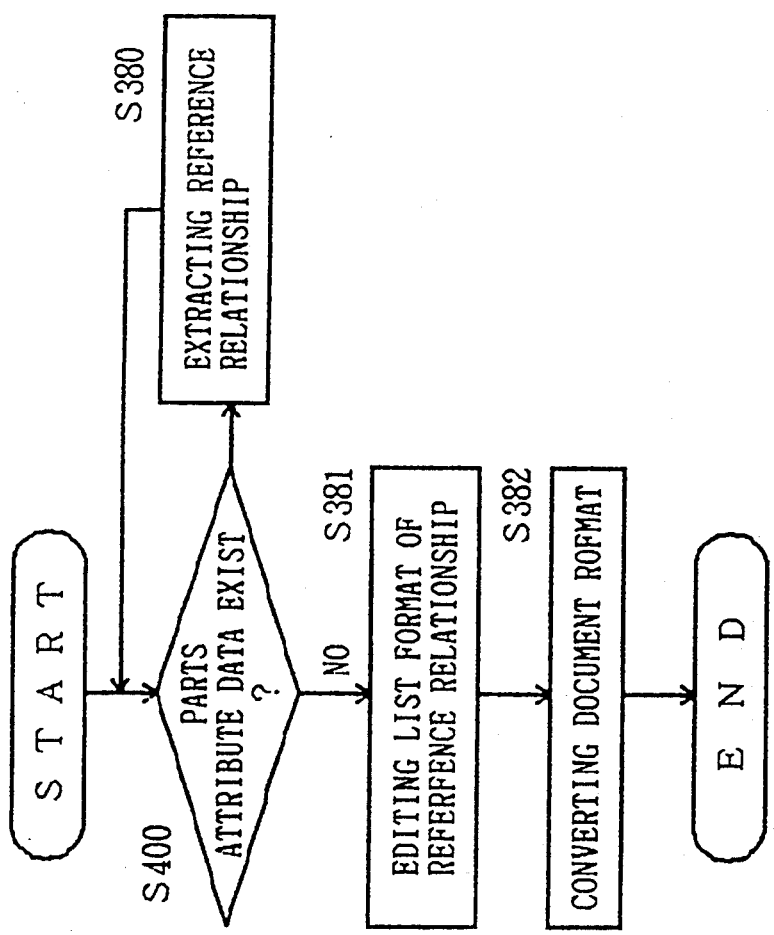
FIG. 39 is an operational flowchart for explaining the cross-reference of design information.

FIG. 39 is an operational flowchart for explaining the process of cross-referencing the design information.

First, at the request of the designer 18 for a cross-reference, determination is made as to whether or not the attribute of the designed parts required and shared in the designing operation (for example, a common data name and a common routine name) (S400). If yes, the reference relationship extracting unit 380 extracts the attribute of the designed parts (for example, a module name) from the design data base 16 (S380). Then, determination is made again as to whether or not the shared attribute of the designed parts exists (S400), and the process of extracting the reference relationship (S380) is repeated until no other shared attribute of designed parts can be detected. If there are no other shared attribute of designed parts (No in S400), the cross-reference editing unit 381 is activated to perform the process of editing the reference relationship list format (S381). Then, the designed document generating unit 382 is activated to convert the documents into the document format (S382), and to output the processed document as the cross-reference list designed document 383. Thus, the process is terminated.

Finally, the linked-detailing support unit 13 shown in FIG. 2 is described below in detail. In the software design process in the present embodiment, the designed documents including the designed parts, relationships, etc. are detailed according to the hierarchical abstract level prescribed in the abstract level prescription table group 11. That is, in the detailing operation, the relationships between two adjacent abstract levels must be clarified to generate a designed document. This is supported by the linked-detailing support unit 13.

Figure 40:
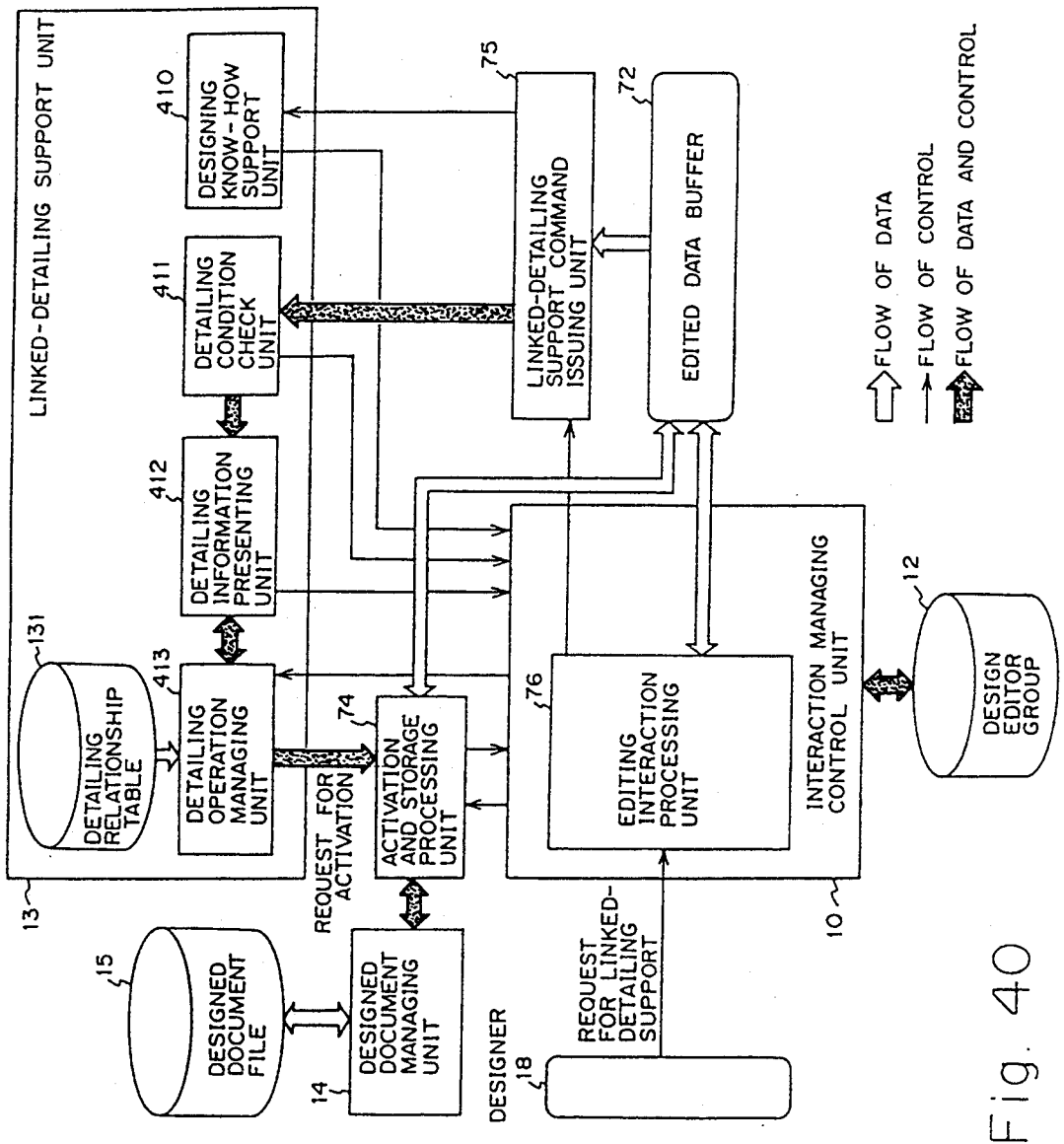
FIG. 40 is a view for explaining the principle of the linked-detailing support method.

FIG. 40 shows the system configuration for explaining the linked-detailing support method.

The linked-detailing support unit 13 comprises a designing know-how support unit 410 for presenting the know-how of performing a design detailing operation, a detailing condition check unit 411 for checking whether or not the condition for activating the design editor according to the transition of the abstract level is sufficient, a detailing information presenting unit 412 for presenting the designer with a plurality of design editors corresponding to the specification information group to be described prior to the detailing operation, a detailing operation managing unit 413 for managing the detailing operation, and the detailing relationship table 131, described by referring to FIG. 3, for prescribing for each designed parts to be detailed the types of specification information in the detailing operation. The linked-detailing support unit 13 is operated with the design editor unit 70 and the interaction management control unit 10.

In response to the control signal from the linked-detailing support command issuing unit 75 in the design editor unit 70 (FIG. 7), the designing know-how support unit 410 issues a control signal to the interaction managing control unit 10. In response to the data and the control signal from the linked-detailing support command issuing unit 75, the detailing condition check unit 41 issues a control signal to the interaction managing control unit 10 and issued a control signal and data to the detailing information presenting unit 412. The detailing information presenting unit 412 receives a control signal and data from the detailing condition check unit 411, transmits data and control signal to and from the detailing operation managing unit 413, and sends a control signal to the interaction managing control unit 10. Finally, the detailing operation managing unit 413 transmits a control signal and data to and from the detailing operation presenting unit 412, receives data from the detailing relationship table 131, sends data and a control signal to the activation and storing unit 74 in the design editor unit 70, and receives a control signal from the interaction managing control unit 10.

Figure 41:
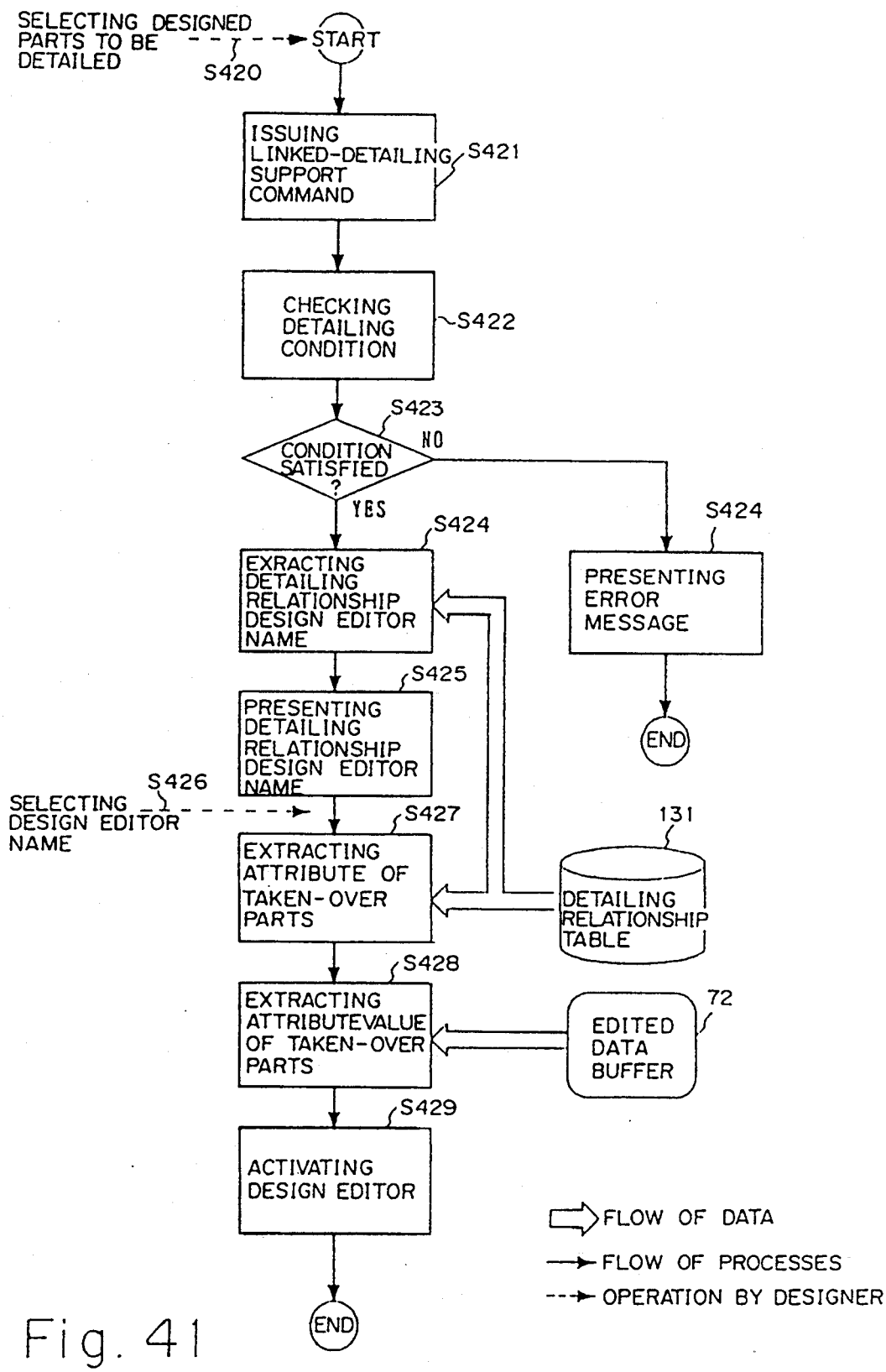
FIG. 41 is an operational flowchart for explaining the linked-detailing support method.

FIG. 41 is an operational flowchart for explaining the linked-detailing support method. The operational flowchart contains no designing know-how support method, which is described later.

First, the designer 18 selects the designed parts to be detailed, and requests the interaction managing control unit 10 to perform the detailing process (S420). The editing interaction processing unit 76 sends the request to the linked-detailing support command issuing unit 75 in the design editor unit 70. In response to this, the linked-detailing support command issuing unit 75 issues a command to the detailing condition check unit 411 to execute a checking process (S421). The detailing condition check unit 411 is provided with a designed parts detailing attribute prescription table for prescribing the type of an attribute required in a detailing operation. It refers to this table to check whether or not necessary designed parts attributes are all described for requested designed parts entities (S422). If there are designed parts attributes not described yet, it determines that the detailing condition is not satisfied (No in S423), clearly indicates the designed parts attributes not described yet, displays an error message indicating that the detailing operation is impossible (S424), and the process is terminated.

If all necessary designed parts attributes are described, it is determined that the detailing condition is satisfied (Yes in S423), and the detailing operation managing unit 413 is activated. The detailing operation managing unit 413 extracts the name of the design editor for describing the specification information having detailing relationship with the corresponding designed parts from the detailing relationship table 131 (S424). The extracted name of the design editor is sent to the detailing information presenting unit 412, and presented in the list to the designer 18 through the interaction management control unit 10 (S425). The designer 18 selects the name of the design editor from the list (S426). The information about the selected design editor name is sent from the interaction managing control unit 10 to the detailing operation managing unit 413. In response to the information, the detailing operation managing unit 413 extracts the designed parts attributes to be taken over from the detailing relationship table 131 (S427), retrieves the value from the edited data buffer 72 in the design editor unit 30, and gives the value to the activation and storage processing unit 74 (S428). The activation and storage processing unit 74 takes over the designed parts attribute value, and activates the design editor (S429).

FIGS. 42A, 42B, 42C and 42D show embodiments of the detailing support method.

Figure 42A:
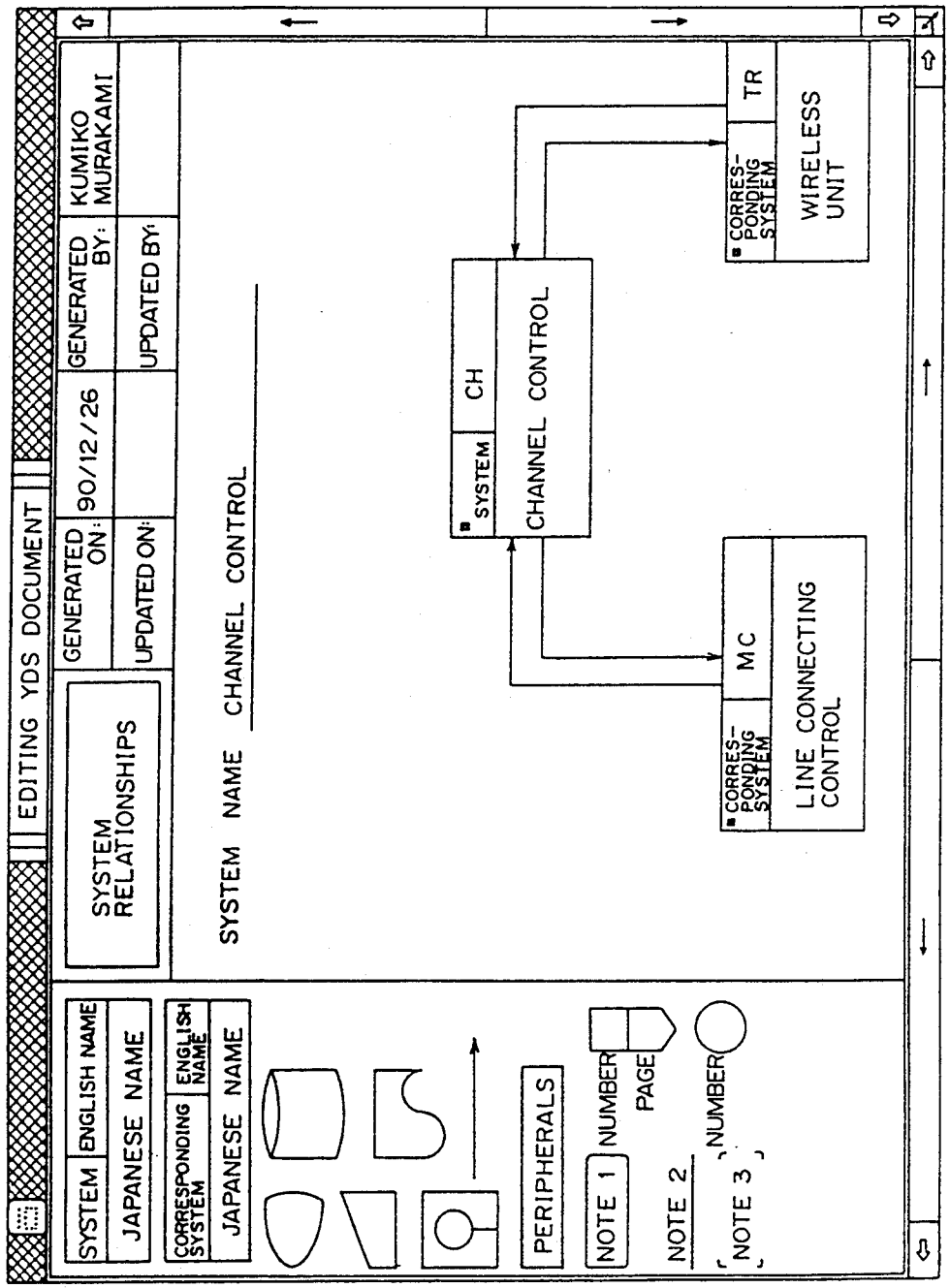
FIGS. 42A and 42B show one embodiment (1) of the detailing support method and FIGS. 42C and 42D shown another embodiment of the detailing support method.
Figure 42B:
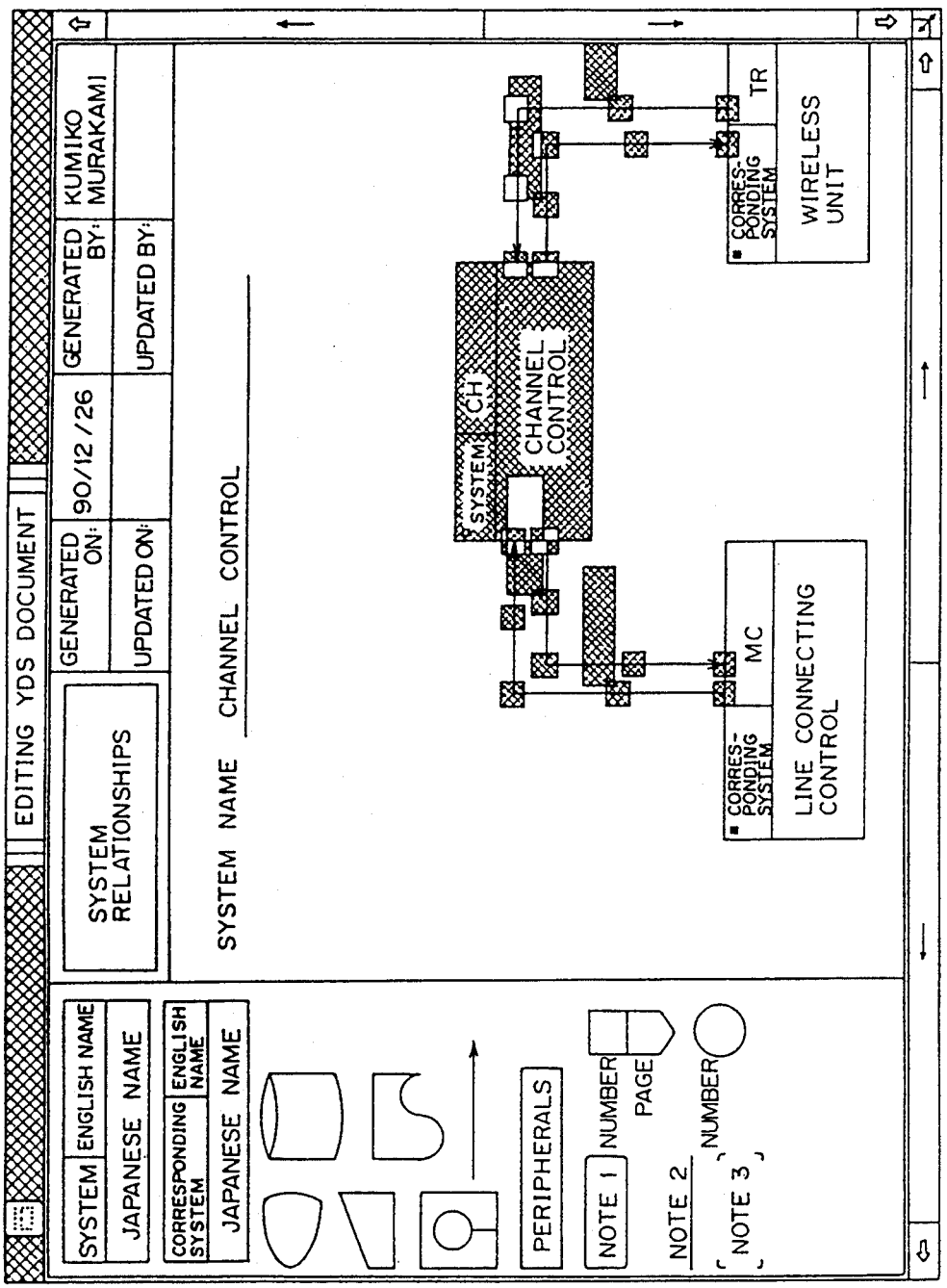
Figure 42C:
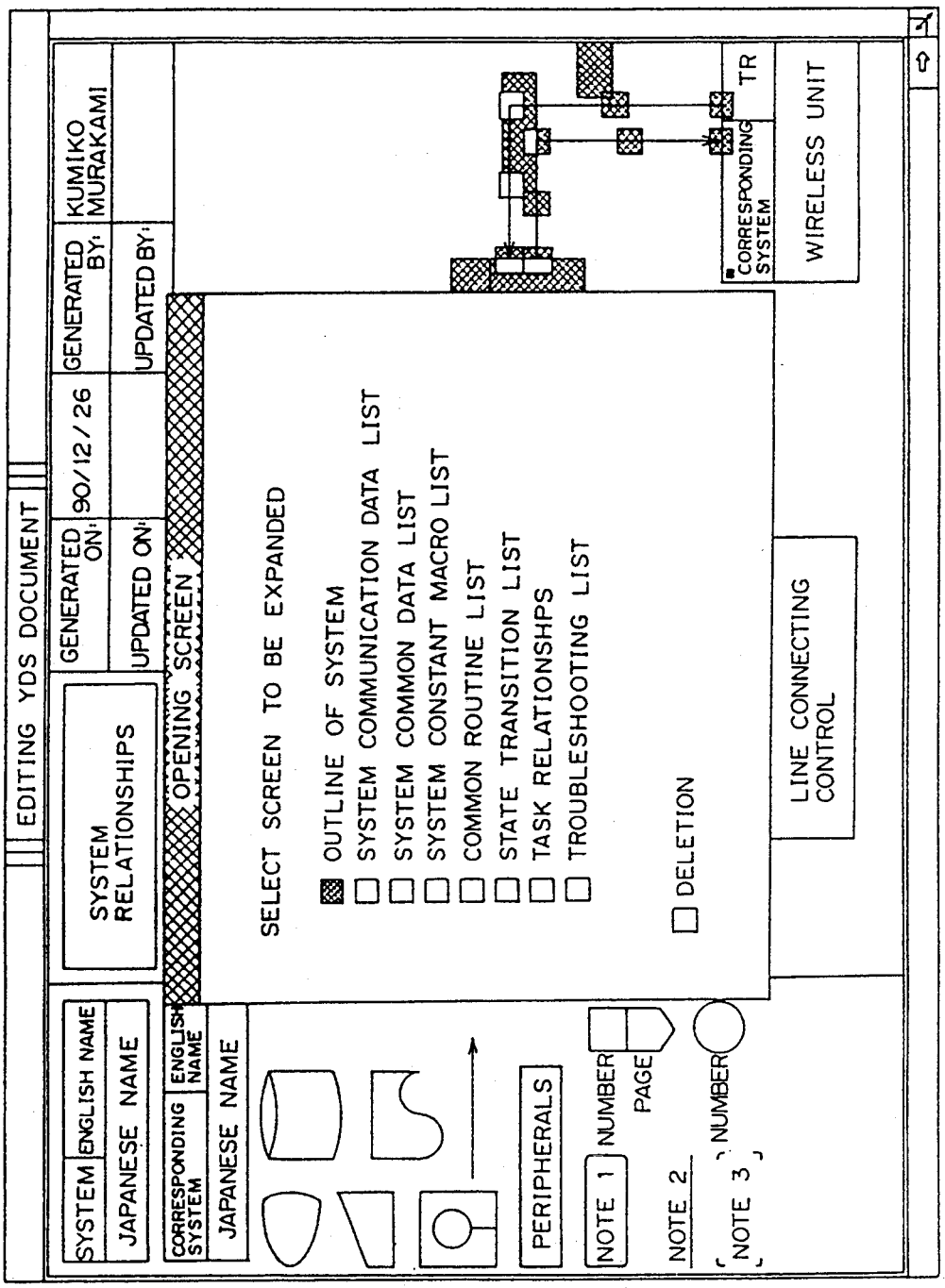
Figure 42D:
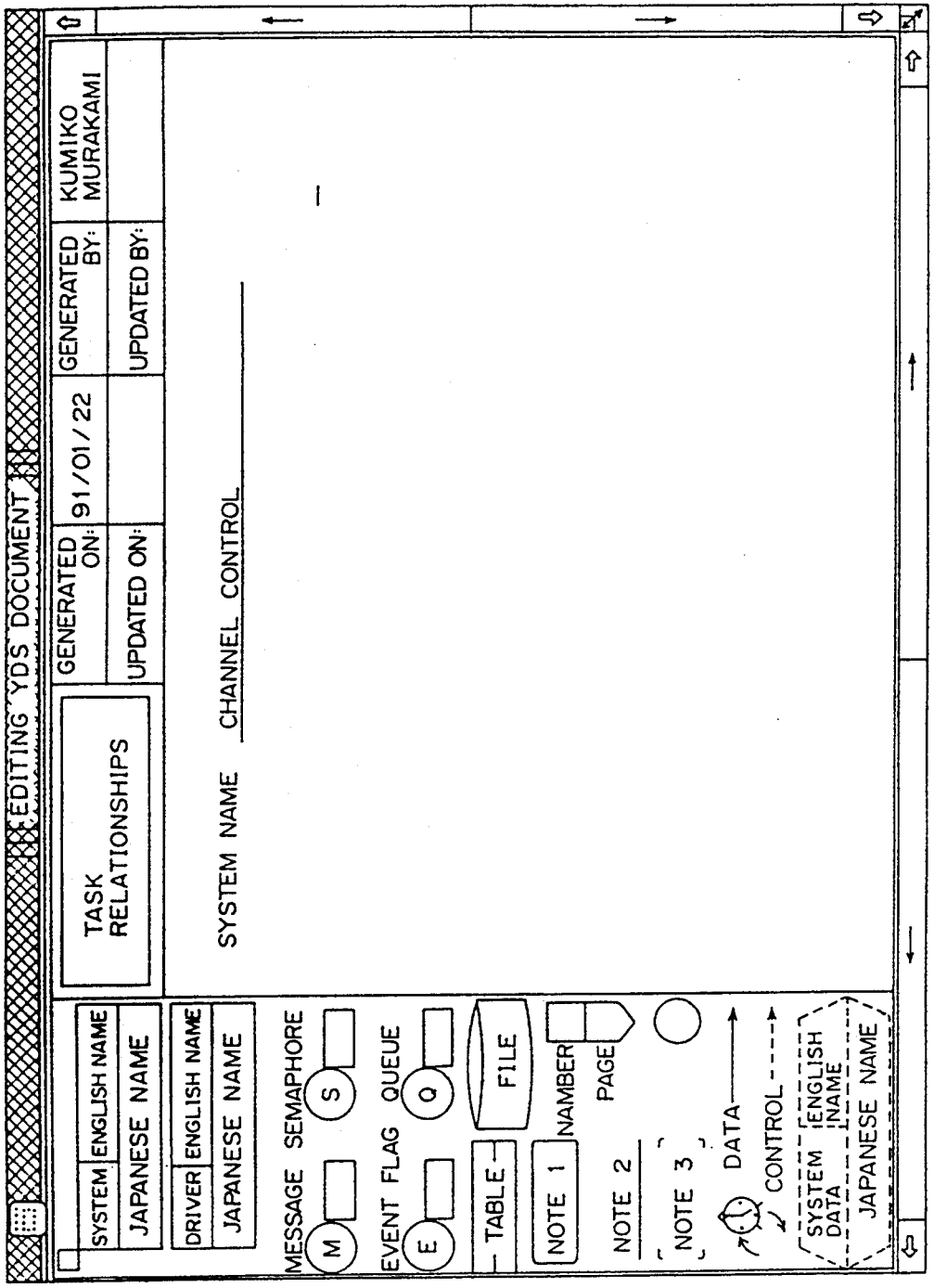

The designer 18 is performing an editing operation through the design editor screen (FIG. 42A). Here, system relationships are illustrated. Assume that the designer details the system (designed parts) of a "channel control". The designer selects with a mouse a system box of the designed parts to be detailed (S420). The selected system box is displayed as inverted (FIG. 42B). Then, the linked-detailing support unit 13 checks the detailing condition (S422), and outputs an error message indicating that the designed parts cannot be detailed (S424). If the designed parts can be detailed, the detailing editor activation menu is selected to display a list of the names of the design editors through which the system is detailed in S424 and S425 (FIG. 42C). From the list, the designer 18 selects with a mouse, etc. the name of the design editor to be activated (S426). If a task relationship table is selected, the linked-detailing support unit 13 sets the attribute value to be taken over (S427, S428), activates the design editor, that is, the design editor for the task relationship table (S429), and display the table (FIG. 42D). The system name "channel control" is taken over to the design editor activation screen.

Figure 43:
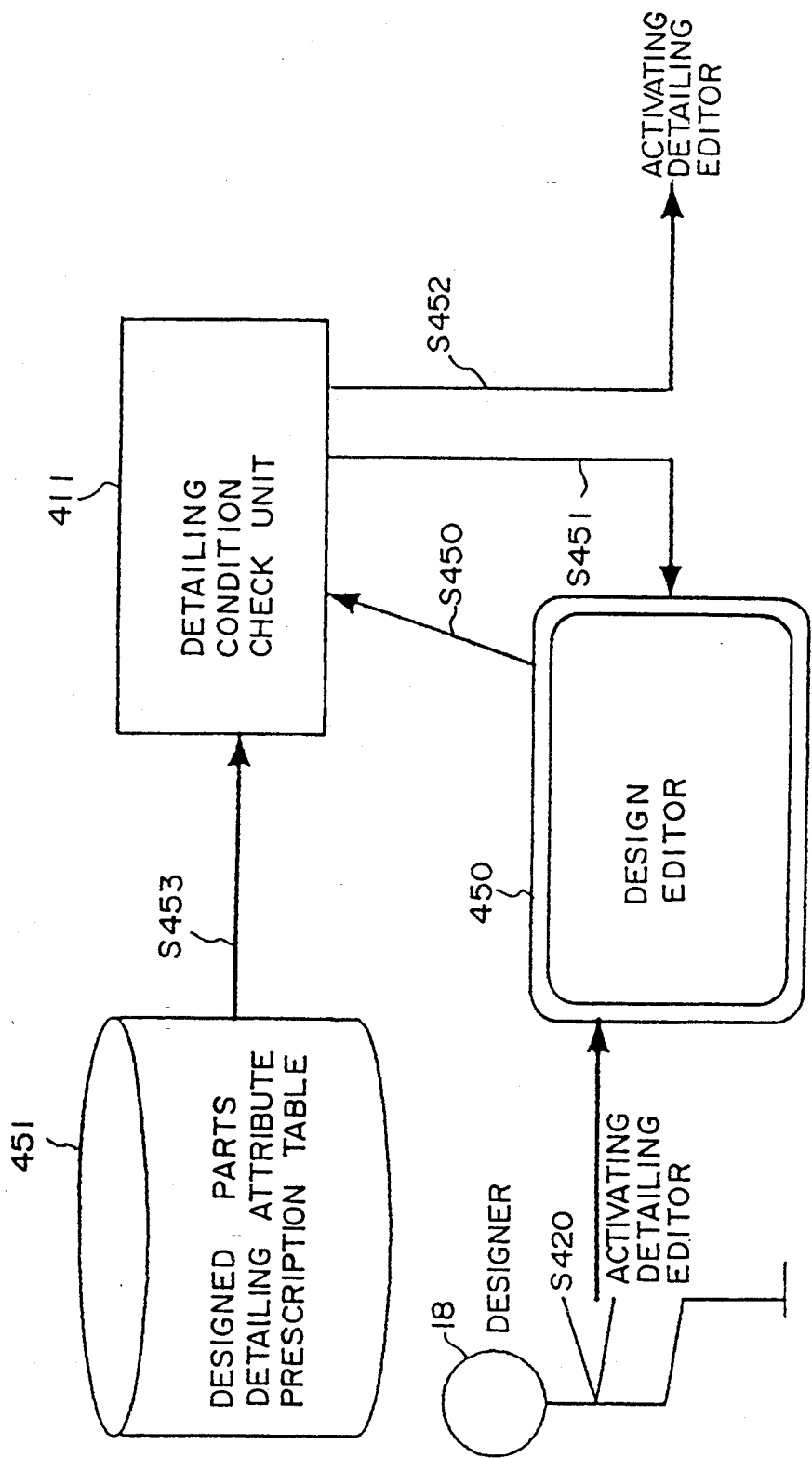
FIG. 43 shows the principle of the detailing condition check method.

FIG. 43 shows the principle of the detailing condition check method.

Assume that the designer 18 issues a request for detailing a designed document while editing it through a design editor. A design editor 450 activates the detailing condition check unit 411 (S450). The detailing condition check unit 411 is provided with a designed parts detailing attribute prescription table 451 for prescribing the types of the attributes necessary in the detailing operation, and refers to it (S453) to check whether or not all the necessary designed parts attributes for the entities of the requested designed parts are described (S422). When designed parts not described yet exist, it is determined that the detailing condition is not satisfied (No in S423), the design part attributes not described must be clarified, an error message indicating that the designed parts cannot be detailed (S424), is issued, and then control is returned to the design editor 450 (S451). When the designed parts can be detailed (Yes in S423), control is transferred to the activation of the design editor (S452).

Figure 44:
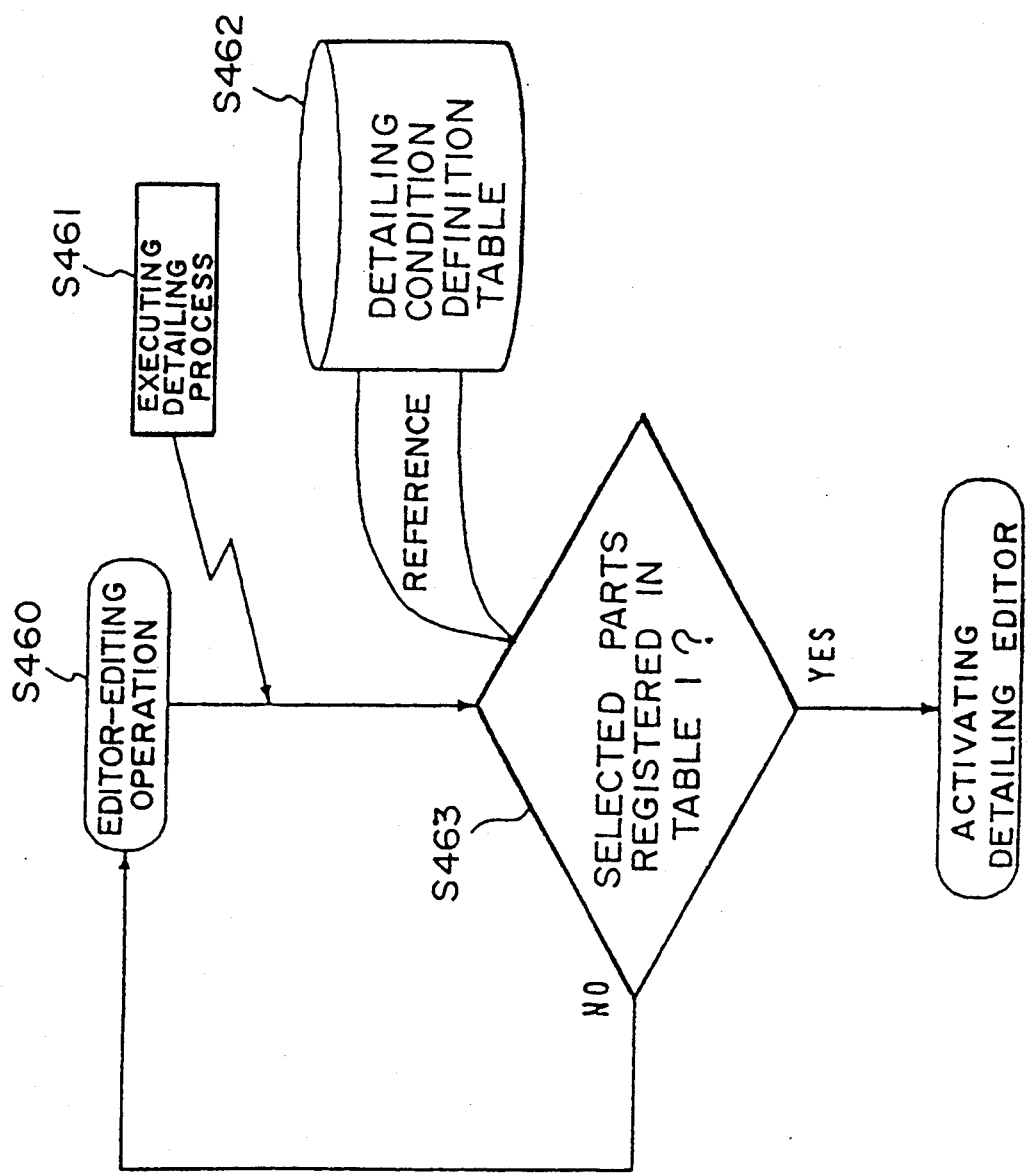
FIG. 44 is an operational flowchart for explaining the detailing condition check method.

FIG. 44 is an operational flowchart for explaining the detailing condition check method.

Assume that the designer 18 executes a detailing operation (S461) during an editing operation through the design editor (S460). At this time, the designer 18 refers to the designed parts information in the detailing condition definition table (S462) to check whether or not the designed parts are defined to be detailed (S463). If not registered so (No), control is returned to the editing operation through the editor (S460). If the designed parts are registered (Yes), control is transferred to the detailing editor activating unit (S464), and the detailing process is actually executed.

Figure 45:
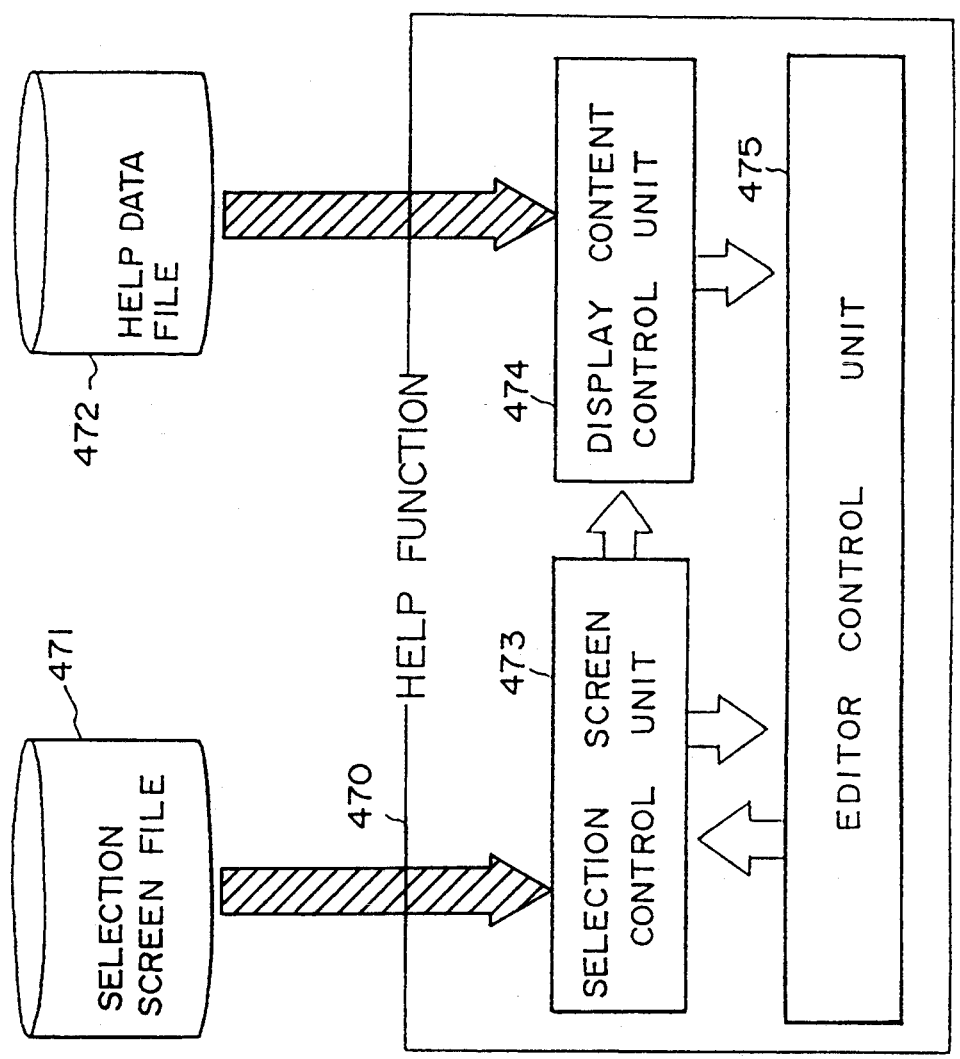
FIG. 45 shows the principle of the help function.

Finally, the design know-how support unit 410 in the linked-detailing support unit 13 is described below. FIG. 45 shows the principle of the help function.

The design know-how support unit 410 comprises a HELP function unit 470, a selection screen file 471, and a HELP data file 472. The HELP function unit 470 comprises a selection screen control unit 473, a display content control unit 474, and an editor control unit 475.

The selection screen file 471 stores the menu data such as the HELP function menu to be displayed for the editor, the selection screen for confirming the termination of a process, etc. The HELP data file 472 stores the data of the HELP function to be displayed (mouse event data for displaying editor-inputted level image, keyboard event data, entry manual data, etc.).

The selection screen control unit 473 is activated at the request from the designer 18 for the linked-detailing support, retrieves the selection menu data of various HELP functions displayed for the editor by the selection screen file 471, and provides them for the editor control unit 475. When the designer 18 selects a function from the displayed HELP function menu, the selection screen control unit 473 sends identifying data to the displays content control unit 474 upon which the display contents are determined according to the data received from the editor control unit 475.

The display content control unit 474 selects from the HELP data file 472 the HELP data to be displayed for the editor according to the data received from the selection screen control unit 473, and sends the data to the editor control unit 475.

The editor control unit 475 displays the data for the editor according to the data received from the selection screen control unit 473 and the display content control unit 474. If the selection screen display unit 473 issues a request for displaying the HELP function menu or the selection screen, the selected result is transmitted to the selection screen display unit.

Figure 46:
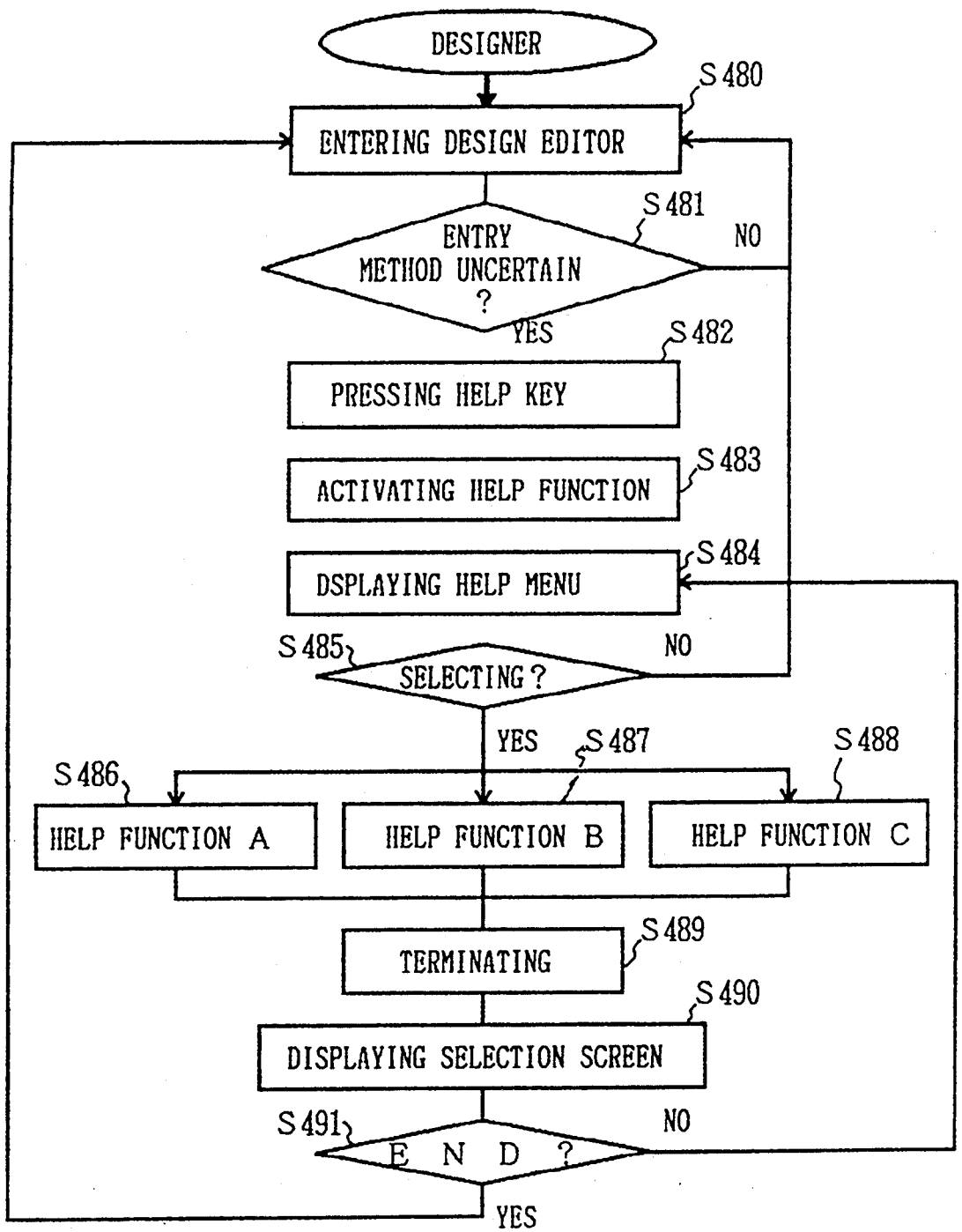
FIG. 46 is an operational flowchart for explaining the help function.

FIG. 46 is a flowchart for explaining the operation of the design know-how support unit 410.

The designer 18 enters data through a design editor (S480). At this time, if the entry method is known (No in S481), the entry can be continued through the design editor. If it becomes uncertain (Yes in S481), the HELP key is pressed (S482) to issue a request for the system support. This activates the HELP function unit 470 (S483). First, the selection screen control unit refers to the selection screen file 471, and sends the HELP function menu data to be displayed to the editor control unit 475. The editor control unit 475 displays the HELP menu for the editor (S484). If the designer does not select any item from the menu (No in S485), control is returned to the design editor entry process (S480). If the designer selects any item from the menu (Yes in S485), the selection result is transmitted from the editor control unit 475 to the selection screen control unit 473, and the selection screen control unit 473 transmits the data to the display content control unit 474. According to the data, the display content control unit 474 determines the HELP function to be displayed, and selects from the HELP data file 472 the HELP data to be displayed, transmits them as data to the editor control unit 475. Then, the editor control unit 475 displays them for the editor. For example, the contents of the HELP functions A, B, and C are displayed respectively (S486, S487, and S488).

After the HELP screen is displayed (S489), the selection screen is displayed (S490). When the designer selects the termination in the selection screen (Yes in S491), control is returned to the design editor entry process (S480). If the designer does not select the termination (No in S491), control is returned to display the HELP menu S484.

Figure 47:
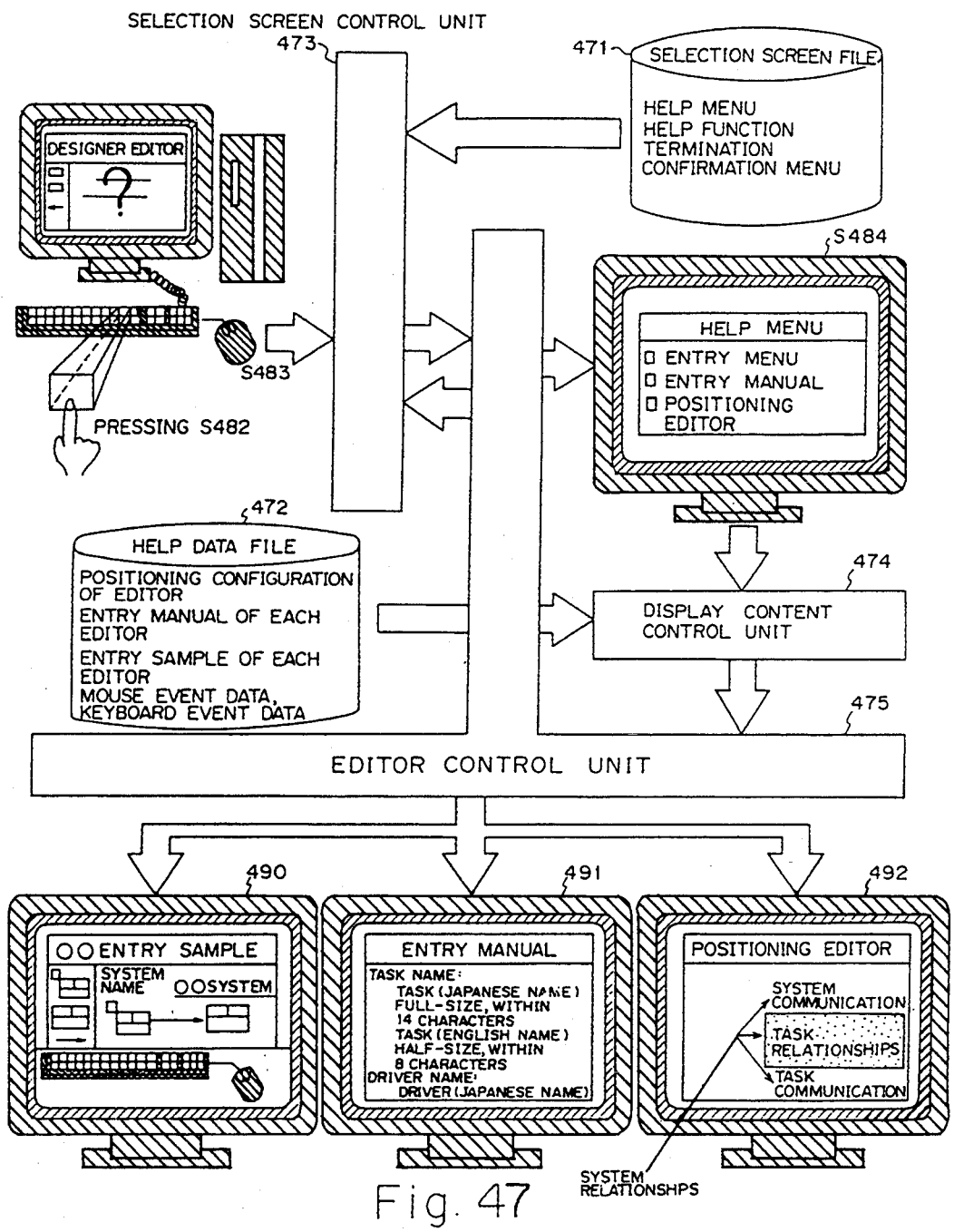
FIG. 47 is a view for explaining an embodiment of the help function.

FIG. 47 shows an embodiment of the HELP function.

If the entry method becomes uncertain while a designed document is generated through a design editor, the designer 18 presses a HELP key (S482). This activates the selection screen control unit 473, the selection screen control unit 473 performs its process, and the editor control unit 475 displays the HELP menu (S484). When the designer 18 selects an item in the menu, the editor control unit 475 displays the contents of the HELP menus through the display content control unit 474. Three types of HELP menus are shown in FIG. 47.

A HELP screen 490 is a display sample when "an entry sample" is selected from the HELP menu. To explain the method of manipulating an entry through a design editor, the display content control unit 474 refers to the mouse event data and the keyboard event data for the design editor from the HELP data file 472. Then, it notifies the editor of the entry image of the design editor through the actual manipulation. As displayed in the screen 490, the editor in the entry sample is divided into parts: the upper and lower sections. The upper section is a design editor, and displays a mouse and keyboard in the lower sections. According to the entry through the design editor at the upper section, the key or the button pressed in the mouse or the keyboard at the lower section can be inverted. Thus, the manipulation method is described by the actual entry image.

A HELP screen 491 is a display sample when "entry manual" is selected from the HELP menu. To explain the entry contents of the design editor, the display content control unit 474 refers to the entry manual data for the design editor from the HELP data file 472. Then, it transmits the data to the editor control unit 475 to display the design editor entry manual for the editor. The manual data to be displayed have the contents similar to the actual manual as described briefly.

A HELP screen 492 is a display sample when "positioning an editor" is selected from the HELP menu. To explain the positioning of the design editor, the display content control unit 474 refers to the editor configuration data for the design editor from the HELP data file 472, and transmits them as the data inverted at the editor portion currently being operated to the editor control unit 475. The editor control unit 475 displays the data for the editor. In the editor configuration, the relationship between the linked design editors is graphically indicated.

What is claimed is:

1. A software design support apparatus in a computer system having an interaction management means for managing an interaction between said apparatus and a designer, and a design document file means for storing a design document, said apparatus comprising:

level prescribing means for dividing a software design operation, to be performed in a stepwise refinement of said software design operation, into a plurality of levels and for providing a design guidance for each of said levels through said interaction management means;

design editor means provided for each of said levels prescribed by said level prescribing means, for performing a designing operation on a selected one of said levels through said interaction management means;

linked-detailing means for linking a plurality of software design refining processes in accordance with said levels prescribed by said level prescribing means in the designing operation performed by said design editor means; and design document managing means for automatically generating, as history information hierarchically structured according to each of said levels prescribed by said level prescribing means, design documents and program parts obtained as a result of the designing operation performed by said design editor means, and for storing said design documents and said program parts in said design document file means.

2. The design support device according to claim 1, wherein said design editor means further describes design parts for said design documents at each of said levels, and said apparatus further comprising:

design data base storing means for storing a design data base used to extract, register and update only information satisfying specific conditions stored in said design document file means, and design information inconsistency correction support means for keeping consistent descriptions about said design parts described for said design documents at each of said levels prescribed by said level prescribing means.

3. The software design support apparatus according to claim 2, wherein said level prescribing means assigns to each said level a plurality of specification information groups and design parts groups and comprises:

first display means for displaying the design guidance provided to said selected level, inputted corresponding specification information and said design parts, and second display means for presenting said specification information at a level lower than a level of said design pads where specific design parts are refined.

4. The software design support apparatus according to claim 2, wherein said design editor means assigns a design editor to a specification information prescribed for each said level, activates said design editor corresponding to said specification information selected and inputted, lists design editor names necessary to define said selected and inputted design parts, and activates said design editor selected and inputted.

5. The software design support apparatus according to claim 2, wherein said design editor means comprises:

means for automatically checking design information on completion of an editing operation in response to said design information, means for checking said design information at a request from a designer for a check during said editing operation through said design editor, and means for automatically checking inputted data during the manipulation of a specific input in the editing operation through said design editor.

6. The software design support apparatus according to claim 5, wherein said checking means in said design editor means automatically checks the inconsistency in the relationships among said design parts described by said design editor means and entries to be made on completion of an editing operation through said design editor, checks at the request of a designer during an editing operation through said design editor the inconsistency in the relationships among said design parts described by said design editor means and said entries to be made, checks the inconsistency in the type or instruction restrictions on design parts and relationships among said design parts during an inputting operation by a designer through said design editor, and automatically checks the inconsistency in the relationships between two specific parts.

7. The software design support apparatus according to claim 2, wherein said design document managing means comprises:

state registering means for registering, in said design document file means, information as to whether said design document is being edited or has been edited when a request for storing said design document in said design document file means is issued, and display means for displaying said registered state when a design document list managed under history information is displayed.

8. The software design support apparatus according to claim 7, wherein said design data base storing means determines data base registration conditions according to a state of said state registering means.

9. The software design support apparatus according to claim 2, wherein said design editor means further comprises:

means for determining, at a request for refining said program parts, the type of said design parts described by said design editor means, and for activating a corresponding editor to perform a refining operation.

10. The software design support apparatus according to claim 2, comprising:

means for activating an editor having, for module parts in said design parts described by said design editor means, an inputted data description area, a procedure description area, and an output data description area each being reserved as an independent display area in an editor screen, and for performing a refining operation for each description.

11. The software design support apparatus according to claim 10, wherein said editor includes:

module parts editor activating means for extracting input and output data of a corresponding module stored by said design data base storing means as specification information associated with a structured chart representing the interface among modules and the input and output of common data, displaying read common data in the input interface area, written common data in the output interface area, and other called modules in the procedure area, and reflecting in a module parts editor the relationships related to said module parts defined in a designing operation in the upstream and registered in said design data base when a corresponding module parts editor is activated to perform an editing operation during the detailing process.

12. The software design support apparatus according to claim 10, wherein said module parts editor activating means extracts the relationships related to said module parts registered by said design data base storing means at a higher order abstract level when said editor is activated, and reflects them in said input interface area, said output interface area, and said procedure description area in said module parts editor.

13. The software design support apparatus according to claim 2, wherein said level prescribing means divides said software design operation into said levels according to a thinking process of human beings, said levels comprising a concept level, a processor configuration level, a task level, a module configuration level, and a module level, to prescribe the abstractness of usage.

14. The software design support apparatus according to claim 2, wherein said level prescribing means prescribes a plurality of specification information groups for each said level, said specification information comprising a task configuration level, a sequence of tasks, a summary of tasks, a configuration of tasks, a transition of the state in a processor, and a common data format, maintains said information in a table, and presents said information at the request of a designer for guidance.

15. The software design support apparatus according to claim 2, wherein
said level prescribing means prescribes a plurality of design parts to be determined at each said level by a designer, said design parts comprising a task, common data, and a mail box as parts information at said task configuration level, prescribes the relationships among specific design parts, said relationships comprising a read from a task to common data and a read from said common data and said task as the relationships between a task at said task configuration level and common data, and gives guidance to a designer about design parts to be determined by said designer and about the relationships among design parts.

16. The software design support apparatus according to claim 2, wherein
said level prescribing means prescribes the dependence between specification information and design parts information, and gives guidance to a designer about the activation of said design editor in said design editor means.

17. The software design support apparatus according to claim 2, wherein
said linked-detailing means presents a designer with items to be described in a refining operation when said designer performs a refining operation according to the transition of said levels prescribed by said level prescribing means, activates a design editor for describing said items, checks whether or not the conditions for activating said design editor exist, guides how to perform a refining operation, and supports according to the transition of said level a refining operation in designing software.

18. The software design support apparatus according to claim 2, wherein
said design document managing means includes state registering means for registering the determination in units whether an editing operation is being performed or completed and is provided with a self managing mode for indicating the state of a designing and editing operation performed by a designer on each document to be design, a mutual managing mode for indicating the state of a designing operation among a plurality of designers, and a total managing mode for indicating the state of a total designing operation including the job of an administrator of each said level.

19. The software design support apparatus according to claim 18, wherein
said design data base storing means determines data base registration conditions according to the state of said state registering means.

20. The software design support apparatus according to claim 2, wherein
said design information inconsistency correction support means extracts all design documents involved in correction from said design data base when the design documents registered in said design data base are corrected through said design editor, performs one of the following functions: informs that correction is required for all of them, directly activates a design editor of a design document requiring correction, indicates through one of a high intensity display and an inverse-color display a graphic symbol of a design part to be designed among the design documents to be corrected, automatically corrects documents after a designer's approval as long as the correction is performed by the replacement of character strings, and further guarantees the consistency in the entities of the design parts prescribed over a plurality of documents, thereby reducing the errors caused during a designing operation.

21. The software design support apparatus according to claim 1, wherein
said level prescribing means assigns to each said level a plurality of specification information groups and design parts groups and comprises:
first display means for displaying the design guidance provided to said selected level, inputted corresponding specification information and design parts, and
second display means for presenting said specification information at a level lower than a level of said design parts where specific design parts are refined.

22. The software design support apparatus according to claim 1, wherein
said design editor means assigns a design editor to a specification information prescribed for each said level, activates said design editor corresponding to said specification information selected and inputted, lists design editor names necessary to define said selected and inputted design parts, and activates said design editor selected and inputted.

23. The software design support apparatus according to claim 1, wherein
said design editor means comprises:
means for automatically checking design information on completion of an editing operation in response to said design information,
means for checking said design information at a request from a designer for a check during said editing operation through said design editor, and
means for automatically checking inputted data during the manipulation of a specific input in the editing operation through said design editor.

24. The software design support apparatus according to claim 23, wherein
said checking means in said design editor means automatically checks the inconsistency in the relationships among design parts further described by said design editor means and entries to be made on completion of an editing operation through said design editor, checks at the request of a designer during an editing operation through said design editor the inconsistency in the relationships among said design parts described by said design editor means and said entries to be made, checks the inconsistency in the type or instruction restrictions on said design parts and relationships among said design parts during an inputting operation by a designer through said design editor, and automatically checks the inconsistency in the relationships between two specific said design parts.

25. The software design support apparatus according to claim 1, wherein
said design document managing means comprises:
state registering means for registering, in said design document file means, information as to whether said design document is being edited or has been edited when a request for storing said design document in said design document file means is issued, and display means for displaying said registered state when a design document list managed under history information is displayed.

26. The software design support apparatus according to claim 25, wherein said design data base storing means determines data base registration conditions according to a state of said state registering means.

27. The software design support apparatus according to claim 1, wherein said design editor means comprises:
means for determining, at a request for detailing program parts, a type of design parts described by said design editor means, and for activating a corresponding editor to perform a refining operation.

28. The software design support apparatus according to claim 1, comprising:
means for activating an editor having, for module parts in said design parts described by said design editor means, an inputted data description area, a procedure description area, and an output data description area each being reserved as an independent display area in an editor screen, and for performing a refining operation for each description.

29. The software design support apparatus according to claim 1, wherein
said level prescribing means divides said software design operation into said levels according to a thinking process of human beings, said levels comprising a concept level, a processor configuration level, a task level, a module configuration level, and a module level, to prescribe the abstractness of usage.

30. The software design support apparatus according to claim 1, wherein
said level prescribing means prescribes a plurality of specification information groups for each said level, said specification information comprising a task configuration level, a sequence of tasks, a summary of tasks, a configuration of tasks, a transition of the state in a processor, and a common data format, maintains said information in a table, and presents said information at the request of a designer for guidance.

31. The software design support apparatus according to claim 1,
said level prescribing means prescribes a plurality of design parts to be determined at each said level by a designer, said design parts comprising a task, common data, and a mail box as parts information at said task configuration level, prescribes the relationships among specific design parts, said relationships comprising a read from a task to common data and a read from said common data and said task as the relationships between a task at said task configuration level and common data, and gives guidance to a designer about design parts to be determined by said designer and about the relationships among design parts.

32. The software design support apparatus according to claim 1, wherein
said level prescribing means prescribes the dependence between specification information and design parts information, and gives guidance to a designer about the activation of said design editor in said design editor means.

33. The software design support apparatus according to claim 1, wherein
said linked-detailing means presents a designer with items to be described in a refining operation when said designer performs a refining operation according to the transition of said levels prescribed by said level prescribing means, activates a design editor for describing said items, checks whether or not the conditions for activating said design editor exist, guides how to perform a refining operation, and supports according to the transition of said level a refining operation in designing software.

34. The software design support apparatus according to claim 1, wherein
said design document managing means includes state registering means for registering the determination in units whether an editing operation is being performed or completed and is provided with a self managing mode for indicating the state of a designing and editing operation performed by a designer on each document to be designed, a mutual managing mode for indicating the state of a designing operation among a plurality of designers, and a total managing mode for indicating the state of a total designing operation including the job of an administrator of each said level.

35. The software design support apparatus according to claim 34, wherein
said design data base storing means determines data base registration conditions according to the state of said state registering means.

36. The software design support apparatus according to claim 1, wherein
said design information inconsistency correction support means extracts all design documents involved in correction from said design data base when the design documents registered in said design data base are corrected through said design editor, performs one of the following functions: informs that correction is required for all of them, directly activates a design editor of a design document requiring correction, indicates through one of a high intensity display and an inverse-color display a graphic symbol of a design part to be designed among the design documents to be corrected, automatically corrects documents after a designer's approval as long as the correction is performed by the replacement of character strings, and further guarantees the consistency in the entities of the design parts described over a plurality of documents, thereby reducing the errors caused during a designing operation.

* * * * *

UNITED STATES PATENT AND TRADEMARK OFFICE
CERTIFICATE OF CORRECTION

PATENT NO. : 5,430,873
DATED : July 4, 1995
INVENTOR(S) : Abe et al.

It is certified that error appears in the above-indentified patent and that said Letters Patent is hereby corrected as shown below:

\*Col. 4, line 3, change "of" to --or--.
\*Col. 6, line 19, change "featured" to --features.
Col. 7, line 48, delete "(1)";
    line 50, change "shown" to --show--.
\*Col. 10, line 50, change "selects" to --select--.
Col. 11, line 54, change "to far in" to --so far in the--.
\*Col. 13, line 38, change "The" to --the--;
    line 48, after "disks" add --.--
    \*line 49, change "designed" to --Designed--.
\*Col. 20, line 57, change "a" to --an--.
\*Col. 27, line 35, change "of" to --or--.
\*Col. 31, line 38, change "an" to --a--.
\*Col. 34, line 55, change "he" to --the--.
Col. 39, line 16, change "pads" to --parts--.

Signed and Sealed this

Third Day of October, 1995

Attest:

BRUCE LEHMAN

Attesting Officer

Commissioner of Patents and Trademarks